United States Patent
Gross et al.

(10) Patent No.: US 11,339,088 B2
(45) Date of Patent: May 24, 2022

(54) FRACTURE RESISTANT STRESS PROFILES IN GLASSES

(71) Applicant: CORNING INCORPORATED, Corning, NY (US)

(72) Inventors: Timothy Michael Gross, Corning, NY (US); Xiaoju Guo, Painted Post, NY (US); Jason Thomas Harris, Horseheads, NY (US); Peter Joseph Lezzi, Corning, NY (US); Alexandra Lai Ching Kao Andrews Mitchell, Ithaca, NY (US); Pascale Oram, Hammondsport, NY (US); Kevin Barry Reiman, Horseheads, NY (US); Rostislav Vatchev Roussev, Painted Post, NY (US); Ljerka Ukrainczyk, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 278 days.

(21) Appl. No.: 16/434,750

(22) Filed: Jun. 7, 2019

(65) Prior Publication Data
US 2019/0375679 A1  Dec. 12, 2019

Related U.S. Application Data

(60) Provisional application No. 62/699,306, filed on Jul. 17, 2018, provisional application No. 62/682,672, filed on Jun. 8, 2018.

(51) Int. Cl.
| | | |
|---|---|---|
| *B32B 15/04* | (2006.01) | |
| *B32B 17/06* | (2006.01) | |
| *C03C 21/00* | (2006.01) | |
| *C03C 3/085* | (2006.01) | |
| *C03C 3/091* | (2006.01) | |
| *C03C 3/097* | (2006.01) | |

(52) U.S. Cl.
CPC ............ *C03C 21/002* (2013.01); *C03C 3/085* (2013.01); *C03C 3/091* (2013.01); *C03C 3/097* (2013.01)

(58) Field of Classification Search
CPC .................................................... C03C 21/002
USPC ........................................ 428/409, 410, 426
See application file for complete search history.

(56) References Cited

U.S. PATENT DOCUMENTS

| | | | |
|---|---|---|---|
| 8,312,739 B2 | 11/2012 | Lee et al. | |
| 8,561,429 B2 | 10/2013 | Allan et al. | |
| 8,854,623 B2 | 10/2014 | Fontaine et al. | |
| 9,908,810 B2 | 3/2018 | Amin et al. | |

(Continued)

FOREIGN PATENT DOCUMENTS

| | | |
|---|---|---|
| CN | 105948536 A | 9/2016 |
| TW | 201617294 A | 5/2016 |
| WO | 2015/127483 A2 | 8/2015 |

OTHER PUBLICATIONS

Gehrke et al; "Effect of Corrosive Media On Crack Growth of Model Glasses and Commercial Silicate Glasses," Glastech. Ber., 63 255-265 (1990).

(Continued)

*Primary Examiner* — Lauren R Colgan
(74) *Attorney, Agent, or Firm* — Kevin M. Johnson

(57) ABSTRACT

Glass-based articles comprise stress profiles providing improved fracture resistance. The glass-based articles herein provide high fracture resistance after multiple drops.

8 Claims, 22 Drawing Sheets

(56) References Cited

U.S. PATENT DOCUMENTS

| | | | |
|---|---|---|---|
| 2015/0030834 A1* | 1/2015 | Morey | C03C 3/091 428/220 |
| 2015/0239775 A1* | 8/2015 | Amin | C03C 3/091 428/220 |
| 2015/0368153 A1 | 12/2015 | Pesansky et al. | |
| 2016/0122239 A1* | 5/2016 | Amin | C03C 21/002 428/220 |
| 2016/0122240 A1* | 5/2016 | Oram | C03C 21/002 428/220 |
| 2016/0376187 A1* | 12/2016 | Gross | B32B 9/045 361/679.01 |
| 2017/0291849 A1 | 10/2017 | Dejneka et al. | |
| 2017/0295657 A1* | 10/2017 | Gross | C03C 3/097 |
| 2017/0305786 A1 | 10/2017 | Roussev et al. | |
| 2018/0072618 A1 | 3/2018 | Hu et al. | |
| 2019/0033144 A1 | 1/2019 | Andrews et al. | |
| 2019/0161386 A1 | 5/2019 | Gross et al. | |
| 2019/0161390 A1 | 5/2019 | Gross et al. | |
| 2019/0202735 A1 | 7/2019 | Oram et al. | |

OTHER PUBLICATIONS

Gehrke et al; "Fatigue Limit and Crack Arrest in Alkali-Containing Silicate Glasses," J. Mater. Sci., 26 5445-5455 (1991).

Guin et al; "Crack Growth Threshold in Soda Lime Silicate Glass: Role of Hold-Time," J. Non-Cryst Solids, 316 12-20 (2003).

Hirao et al; "Microhardness Of $SiO_2$ Glass in Various Environments," J. Am. Ceram. Soc. 70 [7] (1987) 497-502.

Wiederhorn et al; "Crack Growth in Soda-Lime-Silicate Glass Near the Static Fatigue Limit," J. Am. Ceram. Soc., 85 [9] 2287-2292 (2011).

Wiederhorn et al; "Stress Corrosion and Static Fatigue of Glass," J. Am. Ceram. Soc., 53 [10] 543-548(1970).

Wiederhorn, "Influence of Water Vapor On Crack Propagation in Soda-Lime Glass," J. Am. Ceram. Soc., 50 [8] 407-414 (1967).

Invitation To Pay Additional Fees of the European International Searching Authority; PCT/US2019/036009; dated Oct. 7, 2019; 13 pgs.

International Search Report and Written Opinion of the International Searching Authority; PCT/US19/036009; dated Feb. 28, 2020; 21 Pages; European Patent Office.

\* cited by examiner

FRACTURE RESISTANT STRESS PROFILES IN GLASSES

CROSS-REFERENCE TO RELATED APPLICATIONS

This application claims the benefit of priority of U.S. Provisional Application Ser. No. 62/699,306 filed on Jul. 17, 2018 and U.S. Provisional Application Ser. No. 62/682,672 filed on Jun. 8, 2018, the content of each of which is relied upon and incorporated herein by reference in its entirety.

BACKGROUND

Field

The present specification generally relates to stress profiles for fracture resistant stress profiles in glass articles. More specifically, the present specification is directed to stress profiles for glasses, which may be lithium-containing, that may be utilized in electronic devices.

Technical Background

The mobile nature of portable devices, such as smart phones, tablets, portable media players, personal computers, and cameras, makes these devices particularly vulnerable to accidental dropping on hard surfaces, such as the ground. These devices typically incorporate cover glasses, which may become damaged upon impact with hard surfaces. In many of these devices, the cover glasses function as display covers, and may incorporate touch functionality, such that use of the devices is negatively impacted when the cover glasses are damaged.

There are two major failure modes of cover glass when the associated portable device is dropped on a hard surface. One of the modes is flexure failure, which is caused by bending of the glass when the device is subjected to dynamic load from impact with the hard surface. The other mode is sharp contact failure, which is caused by introduction of damage to the glass surface. Impact of the glass with rough hard surfaces, such as asphalt, granite, etc., can result in sharp indentations in the glass surface. These indentations become failure sites in the glass surface from which cracks may develop and propagate.

It has been a continuous effort for glass makers and handheld device manufacturers to improve the resistance of handheld devices to failure. It is also desirable that portable devices be as thin as possible. Accordingly, in addition to strength, it is also desired that glasses to be used as cover glass in portable devices be made as thin as possible. Thus, in addition to increasing the strength of the cover glass, it is also desirable for the glass to have mechanical characteristics that allow it to be formed by processes that are capable of making thin glass articles, such as thin glass sheets.

Accordingly, a need exists for glasses that can be strengthened, such as by ion exchange, and that have the mechanical properties that allow them to be formed as thin glass articles.

SUMMARY

Aspects of the disclosure pertain to glass-based articles and methods for their manufacture and use. Glass-based articles herein exhibit high fracture resistance. In particular, the glass-based articles herein provide high fracture resistance after multiple drops.

In an aspect, a glass-based article comprises: a glass-based substrate comprising opposing first and second surfaces defining a substrate thickness (t), wherein t is greater than or equal to 0.4 mm and less than or equal to 1.3 mm; a stress slope at DOC that is 1.5 MPa/micron or less; and a stress profile comprising: a depth of compression (DOC) that is greater than or equal to 0.15t; and an absolute value of stress integral in one compression zone that is in the range of from 4 MPa*mm to 20 MPa*mm.

According to aspect (1), a glass-based article is provided. The glass-based article comprises: a glass-based substrate comprising opposing first and second surfaces defining a substrate thickness (t), wherein t is greater than or equal to 0.4 mm and less than or equal to 1.3 mm; and a stress profile comprising: a depth of compression (DOC) that is greater than or equal to 0.15t; a stress slope at DOC that is 1.5 MPa/micron or less; and an absolute value of stress integral in one compression zone that is in the range of from 4 MPa*mm to 20 MPa*mm.

According to aspect (2), the glass-based article of the preceding aspect is provided, comprising a peak compressive stress (CS) greater than or equal to 500 MPa.

According to aspect (3), the glass-based article of any preceding aspect is provided, comprising a compressive stress at a knee ($CS_k$) greater than or equal to 70 MPa.

According to aspect (4), the glass-based article of any preceding aspect is provided, wherein the DOC is located at a depth of 95 microns or deeper.

According to aspect (5), a glass-based article is provided. The glass-based article comprises: a glass-based substrate comprising opposing first and second surfaces defining a substrate thickness (t); a central composition at the center of the glass-based article comprising lithium; and a compressive stress layer extending from a surface of the glass-based article to a depth of compression (DOC); wherein the glass-based article comprises a peak compressive stress (CS) greater than or equal to 500 MPa, a thickness (t) of less than or equal to 0.73 mm, a compressive stress at a knee ($CS_k$) greater than or equal to 140 MPa, and a DOC/t greater than 0.17.

According to aspect (6), the glass-based article of any preceding aspect is provided, wherein DOC/t is greater than or equal to 0.18.

According to aspect (7), the glass-based article of any preceding aspect is provided, wherein the peak CS is greater than or equal to 600 MPa.

According to aspect (8), the glass-based article of any preceding aspect is provided, wherein the peak CS is greater than or equal to 720 MPa.

According to aspect (9), the glass-based article of any preceding aspect is provided, wherein the peak CS is greater than or equal to 800 MPa.

According to aspect (10), a glass-based article is provided. The glass-based article comprises: a glass-based substrate comprising opposing first and second surfaces defining a substrate thickness (t); a central composition at the center of the glass-based article comprising lithium; and a compressive stress layer extending from a surface of the glass-based article to a depth of compression (DOC); wherein the glass-based article comprises a peak compressive stress (CS) greater than or equal to 970 MPa, a compressive stress at a knee ($CS_k$) greater than or equal to 90 MPa, and a DOC/t greater than or equal to 0.17.

According to aspect (11), the glass-based article of the preceding aspect is provided, wherein DOC/t is greater than or equal to 0.18.

According to aspect (12), the glass-based article of any of aspects (10) to the preceding aspect is provided, wherein the peak CS is greater than or equal to 1020 MPa.

According to aspect (13), the glass-based article of any of aspects (10) to the preceding aspect is provided, wherein the peak CS is greater than or equal to 1060 MPa.

According to aspect (14), the glass-based article of any of aspects (10) to the preceding aspect is provided, wherein a depth of layer of a spike ($DOL_{sp}$) is greater than or equal to 0.01t.

According to aspect (15), the glass-based article of any of aspects (10) to the preceding aspect is provided, wherein a depth of layer of a spike ($DOL_{sp}$) is greater than or equal to 7 µm.

According to aspect (16), the glass-based article of any of aspects (10) to the preceding aspect is provided, wherein a depth of layer of a spike ($DOL_{sp}$) is greater than or equal to 7.8 µm.

According to aspect (17), the glass-based article of any of aspects (10) to the preceding aspect is provided, wherein the $CS_k$ is greater than or equal to 100 MPa.

According to aspect (18), the glass-based article of any of aspects (10) to the preceding aspect is provided, wherein the $CS_k$ is greater than or equal to 110 MPa.

According to aspect (19), a glass-based article is provided. The glass-based article comprises: a glass-based substrate comprising opposing first and second surfaces defining a substrate thickness (t); a central composition at the center of the glass-based article comprising lithium; and a compressive stress layer extending from a surface of the glass article to a depth of compression (DOC), wherein the glass-based article comprises a peak compressive stress (CS) greater than or equal to 970 MPa, a compressive stress at a knee ($CS_k$) greater than or equal to 80 MPa, a DOC/t greater than or equal to 0.17, and a depth of layer of a spike ($DOL_{sp}$) greater than or equal to 0.012t.

According to aspect (20), a glass-based article is provided. The glass-based article comprises: a glass-based substrate comprising opposing first and second surfaces defining a substrate thickness (t); a central composition at the center of the glass-based article comprising lithium; and a compressive stress layer extending from a surface of the glass article to a depth of compression (DOC), wherein the glass-based article comprises a peak compressive stress (CS) greater than or equal to 970 MPa, a compressive stress at a knee ($CS_k$) greater than or equal to 50 MPa, a DOC/t greater than or equal to 0.17, and a depth of layer of a spike ($DOL_{sp}$) greater than or equal to 0.02t.

According to aspect (21), the glass-based article of any of aspects (19) to the preceding aspect is provided, wherein the $DOL_{sp}$ is greater than or equal to 10 µm.

According to aspect (22), the glass-based article of any of aspects (19) to the preceding aspect is provided, wherein the $DOL_{sp}$ is greater than or equal to 10.5 µm.

According to aspect (23), the glass-based article of any of aspects (19) to the preceding aspect is provided, wherein the $DOL_{sp}$ is greater than or equal to 11 µm.

According to aspect (24), the glass-based article of any of the preceding aspects is provided, wherein a peak central tension (PT) of the glass-based article is greater than or equal to 68 MPa.

According to aspect (25), the glass-based article of any of the preceding aspects is provided, wherein a peak central tension (PT) of the glass-based article is greater than or equal to 70 MPa.

According to aspect (26), the glass-based article of any of the preceding aspects is provided, wherein a peak central tension (PT) of the glass-based article is greater than or equal to 73 MPa.

According to aspect (27), the glass-based article of any of the preceding aspects is provided, wherein t is less than or equal to 0.7 mm.

According to aspect (28), the glass-based article of any of the preceding aspects is provided, wherein t is less than or equal to 0.65 mm.

According to aspect (29), a glass-based article is provided. The glass-based article comprises: a glass-based substrate comprising opposing first and second surfaces defining a substrate thickness (t); a central composition at the center of the glass-based article comprising lithium; and a compressive stress layer extending from a surface of the glass article to a depth of compression (DOC), wherein the glass-based article comprises a peak compressive stress (CS) greater than or equal to 500 MPa, a depth of layer of a spike ($DOL_{sp}$) greater than or equal to 0.008·t, a stress profile including a low slope region with an average absolute value of a slope less than or equal to 0.2 MPa/µm, the low slope region is located in the compressive stress layer and extends for at least 10 µm, and the average compressive stress in the low slope region is greater than or equal to 80 MPa.

According to aspect (30), the glass-based article of the preceding aspect is provided, wherein the average compressive stress in the low slope region is greater than or equal to 90 MPa.

According to aspect (31), the glass-based article of any of aspects (29) to the preceding aspect is provided, wherein the average compressive stress in the low slope region is greater than or equal to 100 MPa.

According to aspect (32), the glass-based article of any of aspects (29) to the preceding aspect is provided, wherein the average absolute value of the slope in the low slope region is less than or equal to 0.25 MPa/µm.

According to aspect (33), the glass-based article of any of aspects (29) to the preceding aspect is provided, wherein the low slope region starts at a depth greater than or equal to 0.01t.

According to aspect (34), the glass-based article of any of aspects (29) to the preceding aspect is provided, wherein the low slope region starts at a depth greater than or equal to 0.012t.

According to aspect (35), the glass-based article of any of aspects (29) to the preceding aspect is provided, wherein the low slope region starts at a depth greater than or equal to 0.015t.

According to aspect (36), the glass-based article of any of aspects (29) to the preceding aspect is provided, wherein the low slope region extends to a depth of less than or equal to 0.02t.

According to aspect (37), the glass-based article of any of aspects (29) to (34) is provided, wherein the low slope region extends to a depth of less than or equal to 0.15t.

According to aspect (38), the glass-based article of any of aspects (29) to the preceding aspect is provided, wherein the low slope region extends to a depth of less than or equal to 0.12t.

According to aspect (39), the glass-based article of any of aspects (29) to the preceding aspect is provided, wherein the low slope region extends to a depth of less than or equal to 0.1t.

According to aspect (40), the glass-based article of any of aspects (29) to the preceding aspect is provided, wherein the low slope region extends to a depth of less than or equal to 0.09t.

According to aspect (41), the glass-based article of any of aspects (29) to the preceding aspect is provided, wherein the peak CS is greater than or equal to 600 MPa.

According to aspect (42), the glass-based article of any of aspects (29) to the preceding aspect is provided, wherein the peak CS is greater than or equal to 700 MPa.

According to aspect (43), the glass-based article of any of aspects (29) to the preceding aspect is provided, wherein the peak CS is greater than or equal to 750 MPa.

According to aspect (44), a glass-based article is provided. The glass-based article comprises: a glass-based substrate comprising opposing first and second surfaces defining a substrate thickness (t); a central composition at the center of the glass-based article comprising lithium; and a compressive stress layer extending from a surface of the glass article to a depth of compression (DOC), wherein the glass-based article comprises a peak compressive stress (CS) greater than or equal to 500 MPa, a depth of layer of a spike ($DOL_{sp}$) greater than or equal to 0.008t, a stress profile comprising a negative curvature region where a second derivative of stress as a function of depth is negative, the negative curvature region is located in the compressive stress layer, and a maximum absolute value of the second derivative in the negative curvature region is greater than or equal to 0.003 MPa/$\mu m^2$.

According to aspect (45), the glass-based article of aspect (44) is provided, wherein the maximum absolute value of the second derivative in the negative curvature region is greater than or equal to 0.005 MPa/$\mu m^2$.

According to aspect (46), the glass-based article of any of aspects (44) to the preceding aspect is provided, wherein the maximum absolute value of the second derivative in the negative curvature region is greater than or equal to 0.007 MPa/$\mu m^2$.

According to aspect (47), the glass-based article of any of aspects (44) to the preceding aspect is provided, wherein the maximum absolute value of the second derivative in the negative curvature region is greater than or equal to 0.009 MPa/$\mu m^2$.

According to aspect (48), the glass-based article of any of aspects (44) to the preceding aspect is provided, wherein the product of the thickness t and the maximum absolute value of the second derivative in the negative curvature region is greater than or equal to 19 GPa.

According to aspect (49), the glass-based article of any of aspects (44) to the preceding aspect is provided, wherein the product of the thickness t and the maximum absolute value of the second derivative in the negative curvature region is greater than or equal to 32 GPa.

According to aspect (50), the glass-based article of any of aspects (44) to the preceding aspect is provided, wherein the product of the thickness t and the maximum absolute value of the second derivative in the negative curvature region is greater than or equal to 45 GPa.

According to aspect (51), the glass-based article of any of aspects (44) to the preceding aspect is provided, wherein the product of the thickness t and the maximum absolute value of the second derivative in the negative curvature region is greater than or equal to 57 GPa.

According to aspect (52), the glass-based article of any of aspects (44) to the preceding aspect is provided, wherein the maximum absolute value of the second derivative in the negative curvature region occurs at a depth greater than or equal to 0.01t.

According to aspect (53), the glass-based article of any of aspects (44) to the preceding aspect is provided, wherein the maximum absolute value of the second derivative in the negative curvature region occurs at a depth greater than or equal to 0.012t.

According to aspect (54), the glass-based article of any of aspects (44) to the preceding aspect is provided, wherein the maximum absolute value of the second derivative in the negative curvature region occurs at a depth greater than or equal to 0.015t.

According to aspect (55), the glass-based article of any of aspects (44) to the preceding aspect is provided, wherein the maximum absolute value of the second derivative in the negative curvature region occurs at a depth greater than or equal to 0.02t.

According to aspect (56), the glass-based article of any of aspects (44) to the preceding aspect is provided, wherein the maximum absolute value of the second derivative in the negative curvature region occurs at a depth greater than or equal to 0.04t.

According to aspect (57), the glass-based article of any of aspects (44) to the preceding aspect is provided, wherein the maximum absolute value of the second derivative in the negative curvature region occurs at a depth greater than or equal to 0.05t.

According to aspect (58), the glass-based article of any of aspects (44) to the preceding aspect is provided, wherein the maximum absolute value of the second derivative in the negative curvature region occurs at a depth greater than or equal to 0.06t.

According to aspect (59), the glass-based article of any of aspects (44) to the preceding aspect is provided, wherein the maximum absolute value of the second derivative in the negative curvature region occurs at a depth greater than or equal to 0.07t.

According to aspect (60), the glass-based article of any of aspects (44) to the preceding aspect is provided, wherein the maximum absolute value of the second derivative in the negative curvature region occurs at a depth less than or equal to 0.2t.

According to aspect (61), the glass-based article of any of aspects (44) to the preceding aspect is provided, wherein the maximum absolute value of the second derivative in the negative curvature region occurs at a depth less than or equal to 0.17t.

According to aspect (62), the glass-based article of any of aspects (44) to the preceding aspect is provided, wherein the maximum absolute value of the second derivative in the negative curvature region occurs at a depth less than or equal to 0.14t.

According to aspect (63), the glass-based article of any of aspects (44) to the preceding aspect is provided, wherein the maximum absolute value of the second derivative in the negative curvature region occurs at a depth less than or equal to 0.11t.

According to aspect (64), the glass-based article of any of aspects (44) to the preceding aspect is provided, wherein the maximum absolute value of the second derivative in the negative curvature region occurs at a depth less than or equal to 0.1t.

According to aspect (65), the glass-based article of any of aspects (44) to the preceding aspect is provided, wherein the peak CS is greater than or equal to 600 MPa.

According to aspect (66), the glass-based article of any of aspects (44) to the preceding aspect is provided, wherein the peak CS is greater than or equal to 700 MPa.

According to aspect (67), the glass-based article of any of aspects (44) to the preceding aspect is provided, wherein the peak CS is greater than or equal to 750 MPa.

According to aspect (68), the glass-based article of any of the preceding aspects is provided, wherein a ratio of the molar concentration of $Li_2O$ to the molar concentration of $Na_2O$ at the center of the glass-based article is less than or equal to 2.0.

According to aspect (69), the glass-based article of any of the preceding aspects is provided, wherein a ratio of the molar concentration of $Li_2O$ to the molar concentration of $Na_2O$ at the center of the glass-based article is less than or equal to 1.9.

According to aspect (70), the glass-based article of any of the preceding aspects is provided, wherein a ratio of the molar concentration of $Li_2O$ to the molar concentration of $Na_2O$ at the center of the glass-based article is less than or equal to 1.8.

According to aspect (71), the glass-based article of any of the preceding aspects is provided, wherein a ratio of the molar concentration of $Li_2O$ to the molar concentration of $Na_2O$ at the center of the glass-based article is less than or equal to 1.6.

According to aspect (72), the glass-based article of any of the preceding aspects is provided, wherein a ratio of the molar concentration of $Li_2O$ to the molar concentration of $Na_2O$ at the center of the glass-based article is less than or equal to 1.4.

According to aspect (73), the glass-based article of any of the preceding aspects is provided, wherein the $Li_2O$ concentration at the center of the glass-based article is less than or equal to 12 mol %.

According to aspect (74), the glass-based article of any of the preceding aspects is provided, wherein the $Li_2O$ concentration at the center of the glass-based article is less than or equal to 11 mol %.

According to aspect (75), the glass-based article of any of the preceding aspects is provided, wherein the $Li_2O$ concentration at the center of the glass-based article is less than or equal to 10 mol %.

According to aspect (76), the glass-based article of any of the preceding aspects is provided, wherein the $Li_2O$ concentration at the center of the glass-based article is less than or equal to 9.5 mol %.

According to aspect (77), the glass-based article of any of the preceding aspects is provided, wherein the $Li_2O$ concentration at the center of the glass-based article is less than or equal to 9 mol %.

According to aspect (78), the glass-based article of any of the preceding aspects is provided, wherein the $Li_2O$ concentration at the center of the glass-based article is less than or equal to 8.5 mol %.

According to aspect (79), the glass-based article of any of the preceding aspects is provided, wherein the $Li_2O$ concentration at the center of the glass-based article is less than or equal to 8 mol %.

According to aspect (80), the glass-based article of any of the preceding aspects is provided, wherein a fracture toughness of a glass comprising the central composition is greater than or equal to 0.7 MPa*sqrt(m).

According to aspect (81), the glass-based article of any of the preceding aspects is provided, wherein a fracture toughness of a glass comprising the central composition is greater than or equal to 0.75 MPa*sqrt(m).

According to aspect (82), the glass-based article of any of the preceding aspects is provided, wherein a fracture toughness of a glass comprising the central composition is greater than or equal to 0.77 MPa*sqrt(m).

According to aspect (83), the glass-based article of any of the preceding aspects is provided, wherein a fracture toughness of a glass comprising the central composition is less than or equal to 1.3 MPa*sqrt(m).

According to aspect (84), the glass-based article of any of the preceding aspects is provided, wherein a fracture toughness of a glass comprising the central composition is less than or equal to 1.2 MPa*sqrt(m).

According to aspect (85), the glass-based article of any of the preceding aspects is provided, wherein a fracture toughness of a glass comprising the central composition is less than or equal to 1.1 MPa*sqrt(m).

According to aspect (86), the glass-based article of any of the preceding aspects is provided, wherein a fracture toughness of a glass comprising the central composition is less than or equal to 0.95 MPa*sqrt(m).

According to aspect (87), the glass-based article of any of the preceding aspects is provided, wherein a fracture toughness of a glass comprising the central composition is less than or equal to 0.9 MPa*sqrt(m).

According to aspect (88), a glass-based article is provided. The glass-based article comprises: a glass-based substrate comprising opposing first and second surfaces defining a substrate thickness (t); a central composition at the center of the glass-based article comprising lithium and sodium, and a $Li_2O/Na_2O$ molar ratio of greater than or equal to 0.65 and less than or equal to 1.2; and a fracture toughness corresponding to the central composition in the range of greater than or equal to 0.7 MPa*sqrt(m) to less than or equal to 1.3 MPa*sqrt(m).

According to aspect (89), the glass-based article of aspect (88) is provided, comprising a compressive stress layer extending from a surface of the glass article to a depth of compression (DOC) that is 0.17 t or more.

According to aspect (90), the glass-based article of any of aspects (88) to the preceding aspect is provided, comprising a peak compressive stress (CS) in the range of greater than or equal to 500 MPa to 1200 MPa.

According to aspect (91), the glass-based article of any of aspects (88) to the preceding aspect is provided, comprising a compressive stress at a knee ($CS_k$) in the range of greater than or equal to 80 MPa to 160 MPa.

According to aspect (92), the glass-based article of any of aspects (88) to the preceding aspect is provided, comprising a peak tension (PT) of greater than or equal to 68 MPa.

According to aspect (93), the glass-based article of any of aspects (88) to the preceding aspect is provided, wherein a depth of layer of a spike ($DOL_{sp}$) is greater than 0.007t.

According to aspect (94), the glass-based article of any of aspects (88) to the preceding aspect is provided, comprising a stress profile comprising a negative curvature region, wherein a second derivative of stress as a function of depth is negative, the negative curvature region is located in a compressive stress layer, and a maximum absolute value of the second derivative in the negative curvature region being greater than or equal to 0.003 MPa/$\mu m^2$.

According to aspect (95), the glass-based article of any of aspects (88) to the preceding aspect is provided, wherein a $LiO_2$ concentration of the central composition is less than or equal to 8.5 mol %.

According to aspect (96), the glass-based article of any of aspects (88) to the preceding aspect is provided, wherein t is in the range of 0.5 mm to 0.8 mm.

According to aspect (97), a glass-based article is provided. The glass-based article comprises: a glass-based substrate comprising opposing first and second surfaces defining a substrate thickness (t); a central composition at the center of the glass-based article comprising lithium and a $Li_2O/Na_2O$ molar ratio of greater than or equal to 0.65 and less than or equal to 1.2; and a stress profile comprising a negative curvature region, wherein a second derivative of stress as a function of depth is negative, the negative curvature region is located in a compressive stress layer, and a maximum absolute value of the second derivative in the negative curvature region being greater than or equal to 0.003 MPa/$\mu m^2$.

According to aspect (98), the glass-based article of aspect (97) is provided, comprising one or more of the following: a compressive stress layer extending from a surface of the glass article to a depth of compression (DOC) that is 0.17 t or more; a peak compressive stress (CS) in the range of from 500 MPa to 1200 MPa; a compressive stress at a knee ($CS_k$) in the range of from 80 MPa to 160 MPa; a peak tension (PT) of greater than or equal to 68 MPa; a depth of layer of a spike ($DOL_{sp}$) is greater than or equal to 0.007t; a $LiO_2$ concentration of the central composition that is less than or equal to 8.5 mol %; and t in the range of from 0.5 mm to 0.8 mm.

According to aspect (99), a consumer electronic product is provided. The consumer electronic product comprising: a housing comprising a front surface, a back surface, and side surfaces; electrical components provided at least partially within the housing, the electrical components comprising at least a controller, a memory, and a display, the display being provided at or adjacent the front surface of the housing; and a cover disposed over the display; wherein at least a portion of at least one of the housing and the cover comprises the glass-based article of one of the preceding claims.

According to aspect (100), a method of increasing probability of survival after multiple drops of a glass-based article onto one or more hard surfaces is provided. The method comprises: exposing to an ion exchange treatment a glass-based substrate comprising opposing first and second surfaces defining a substrate thickness (t) to form a glass-based article with a stress profile comprising a knee, the glass-based article comprising: a central composition at the center of the glass-based article comprising lithium and a $Li_2O/Na_2O$ molar ratio of greater than or equal to 0.65 and less than or equal to 1.2; an alkali metal oxide comprising a non-zero concentration that varies from the first surface to a depth of layer (DOL) with respect to the alkali metal oxide; and a fracture toughness corresponding to the central composition in the range of greater than or equal to 0.7 MPa*sqrt(m) to less than or equal to 1.3 MPa*sqrt(m).

According to aspect (101), the method of aspect (100) is provided, wherein the glass-based article comprising a compressive stress layer extending from a surface of the glass article to a depth of compression (DOC) that is 0.17 t or more.

According to aspect (102), the method of any of aspects (100) to the preceding aspect is provided, wherein the glass-based article comprises a peak compressive stress (CS) in the range of greater than or equal to 500 MPa to 1200 MPa.

According to aspect (103), the method of any of aspects (100) to the preceding aspect is provided, wherein the glass-based article comprises a compressive stress at the knee ($CS_k$) in the range of greater than or equal to 80 MPa to 160 MPa.

According to aspect (104), the method of any of aspects (100) to the preceding aspect is provided, wherein the glass-based article comprises a peak tension (PT) of greater than or equal to 68 MPa.

According to aspect (105), the method of any of aspects (100) to the preceding aspect is provided, wherein the DOL of the glass-based article is greater than 0.007t.

According to aspect (106), the method of any of aspects (100) to the preceding aspect is provided, wherein the stress profile comprises a negative curvature region, wherein a second derivative of stress as a function of depth is negative, the negative curvature region is located in a compressive stress layer, and a maximum absolute value of the second derivative in the negative curvature region being greater than or equal to 0.003 MPa/$\mu m^2$.

According to aspect (107), the method of any of aspects (100) to the preceding aspect is provided, wherein a $LiO_2$ concentration of the central composition is less than or equal to 8.5 mol %.

According to aspect (108), the method of any of aspects (100) to the preceding aspect is provided, wherein the central composition comprises a $Li_2O/Na_2O$ molar ratio less than or equal to 1.2.

According to aspect (109), the method of any of aspects (100) to the preceding aspect is provided, wherein t is in the range of 0.5 mm to 0.8 mm.

According to aspect (110), a glass-based article is provided. The glass-based article is made according to the method of any of aspects (100) to the preceding aspect.

According to some embodiments, a stress profile for a lithium-containing glass-based article is provided that exhibits high fracture resistance.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
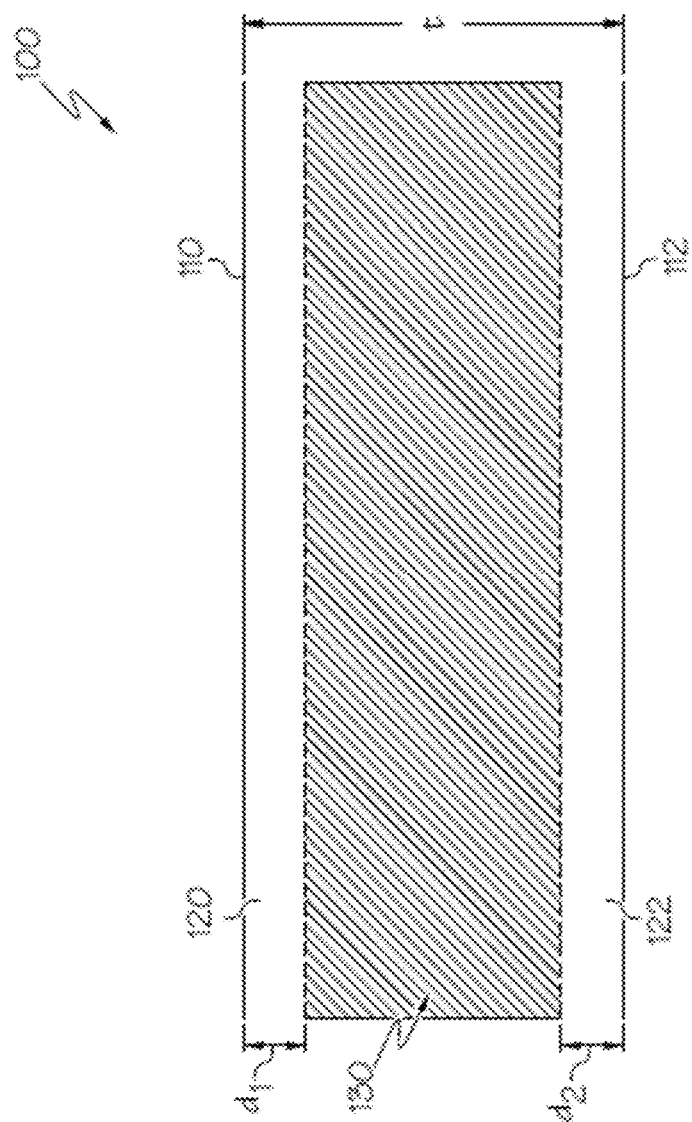
FIG. 1 schematically depicts a cross section of a glass having compressive stress layers on surfaces thereof according to embodiments disclosed and described herein.

Before describing several exemplary embodiments, it is to be understood that the disclosure is not limited to the details of construction or process steps set forth in the following disclosure. The disclosure provided herein is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment, or to only one embodiment. Furthermore, the particular features, structures, materials, or characteristics may be combined in any suitable manner in one or more embodiments.

Definitions and Measurement Techniques

The terms "glass-based article" and "glass-based substrates" are used to include any object made wholly or partly of glass, including glass-ceramics (including an amorphous phase and a crystalline phase). Laminated glass-based articles include laminates of glass and non-glass materials, laminates of glass and crystalline materials. Glass-based substrates according to one or more embodiments can be selected from soda-lime silicate glass, alkali-alumino silicate glass, alkali-containing borosilicate glass, alkali-containing aluminoborosilicate glass, and alkali-containing glass-ceramics.

A "base composition" is a chemical make-up of a substrate prior to any ion exchange (IOX) treatment. That is, the base composition is undoped by any ions from IOX. A composition at the center of a glass-based article that has been IOX treated is typically the same as the base composition when IOX treatment conditions are such that ions supplied for IOX do not diffuse into the center of the substrate. In one or more embodiments, a central composition at the center of the glass article comprises the base composition.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

Unless otherwise specified, all compositions described herein are expressed in terms of mole percent (mol %) on an oxide basis.

A "stress profile" is stress as a function of thickness across of a glass-based article. A compressive stress region extends from a first surface to a depth of compression (DOC) of the article, where the article is under compressive stress. A central tension region extends from the DOC to include the region where the article is under tensile stress.

As used herein, depth of compression (DOC) refers to the depth at which the stress within the glass-based article changes from compressive to tensile stress. At the DOC, the stress crosses from a positive (compressive) stress to a negative (tensile) stress and thus exhibits a stress value of zero. According to the convention normally used in mechanical arts, compression is expressed as a negative (<0) stress and tension is expressed as a positive (>0) stress. Throughout this description, however, positive values of stress are compressive stress (CS), which are expressed as a positive or absolute value—i.e., as recited herein, CS=|CS|.

Additionally, negative values of stress are tensile stress. But when used with the term "tensile", stress or central tension (CT) may be expressed as a positive value, i.e., CT=|CT|. Central tension (CT) refers to tensile stress in a central region or a central tension region of the glass-based article. Maximum central tension (maximum CT or $CT_{max}$) occurs in the central tension region nominally at 0.5·t, where t is the article thickness, which allows for variation from exact center of the location of the maximum tensile stress. Peak tension (PT) refers to maximum tension measured, which may or may not be at the center of the article.

A "knee" of a stress profile is a depth of an article where the slope of the stress profile transitions from steep to gradual. The knee may refer to a transition area over a span of depths where the slope is changing.

A non-zero metal oxide concentration that varies from the first surface to a depth of layer (DOL) with respect to the metal oxide or that varies along at least a substantial portion of the article thickness (t) indicates that a stress has been generated in the article as a result of ion exchange. The variation in metal oxide concentration may be referred to herein as a metal oxide concentration gradient. The metal oxide that is non-zero in concentration and varies from the first surface to a DOL or along a portion of the thickness may be described as generating a stress in the glass-based article. The concentration gradient or variation of metal oxides is created by chemically strengthening a glass-based substrate in which a plurality of first metal ions in the glass-based substrate is exchanged with a plurality of second metal ions.

As used herein, the terms "depth of exchange", "depth of layer" (DOL), "chemical depth of layer", and "depth of chemical layer" may be used interchangeably, describing in general the depth at which ion exchange facilitated by an ion exchange process (IOX) takes place for a particular ion. DOL refers to the depth within a glass-based article (i.e., the distance from a surface of the glass-based article to its interior region) at which an ion of a metal oxide or alkali metal oxide (e.g., the metal ion or alkali metal ion) diffuses into the glass-based article where the concentration of the ion reaches a minimum value, as determined by Glow Discharge—Optical Emission Spectroscopy (GD-OES)). In some embodiments, the DOL is given as the depth of exchange of the slowest-diffusing or largest ion introduced by an ion exchange (IOX) process.

Unless otherwise specified, CT and CS are expressed herein in MegaPascals (MPa), thickness is express in millimeters and DOC and DOL are expressed in microns (micrometers, or μm).

Compressive stress (including surface/peak CS, $CS_{max}$) and $DOL_{sp}$ are measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

Compressive stress at the knee $CS_k$ may be measured by a method according to U.S. Ser. No. 16/015,776, filed Jun. 22, 2018 to the assignee, which is incorporated herein by reference.

The maximum central tension (CT) or peak tension (PT) and stress retention values are measured using a scattered light polariscope (SCALP) technique known in the art. The Refracted near-field (RNF) method or SCALP may be used to measure the stress profile and the depth of compression (DOC). When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of from 1 Hz to 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

General Overview of Properties of Glass-Based Articles

Glass-based articles herein have stress profiles that are designed to increase probability of survival after multiple drops onto hard surfaces. High fracture toughness offers new higher levels of fracture resistance when combined with these advantageous stress profiles. The stress profiles include increased compressive stresses, for example, high peak compressive stress (CS) and high knee stress ($CS_k$), separately or in combination with other parameters. High depth of compression (DOC) and high spike depth of layer ($DOL_{sp}$), separately or in combination with other parameters, are also achieved. Peak tension (PT) of desired values are also obtained. In addition, the stress profiles may include a negative curvature region in a compressive stress layer, identified by having a negative second derivative, which contributes to the ability of the glass-based articles to survive multiple drops.

Reference will now be made in detail to lithium aluminosilicate glasses and stress profiles therefore according to various embodiments. Alkali aluminosilicate glasses have good ion exchangeability, and chemical strengthening processes have been used to achieve high strength and high toughness properties in alkali aluminosilicate glasses. Sodium aluminosilicate glasses are highly ion exchangeable glasses with high glass formability and quality. Lithium aluminosilicate glasses are highly ion exchangeable glasses with high glass quality. The substitution of $Al_2O_3$ into the silicate glass network increases the interdiffusivity of monovalent cations during ion exchange. By chemical strengthening in a molten salt bath (e.g., $KNO_3$ or $NaNO_3$), glasses with high strength, high toughness, and high indentation cracking resistance can be achieved. The stress profiles achieved through chemical strengthening may have a variety of shapes that increase the drop performance, strength, toughness, and other attributes of the glass articles.

Therefore, lithium aluminosilicate glasses with good physical properties, chemical durability, and ion exchangeability have drawn attention for use as cover glass. Through different ion exchange processes, greater central tension (CT), depth of compression (DOC), and high compressive stress (CS) can be achieved. The stress profiles described herein provide increased fracture resistance for lithium containing glass articles.

In embodiments of glass compositions described herein, the concentration of constituent components (e.g., $SiO_2$, $Al_2O_3$, $Li_2O$, and the like) are given in mole percent (mol %) on an oxide basis, unless otherwise specified. It should be understood that any of the variously recited ranges of one component may be individually combined with any of the variously recited ranges for any other component.

Disclosed herein are stress profiles for use with lithium aluminosilicate glass compositions. The stress profiles exhibit increased fracture resistance. With reference to FIG. 1, the glass has a first region under compressive stress (e.g., first and second compressive stress layers 120, 122 in FIG. 1) extending from the surface to a depth of compression (DOC) of the glass and a second region (e.g., central region 130 in FIG. 1) under a tensile stress or central tension (CT) extending from the DOC into the central or interior region of the glass.

The compressive stress (CS) has a maximum or peak value, which typically occurs at the surface of the glass (but such need not be the case as the peak may occur at a depth from the surface of the glass), and the CS varies with distance d from the surface according to a function. Referring again to FIG. 1, the first compressive stress layer 120 extends from first surface 110 to a depth $d_1$ and a second compressive stress layer 122 extends from second surface 112 to a depth $d_2$. Together, these segments define a compression or CS of glass 100.

The compressive stress of both major surfaces (110, 112 in FIG. 1) is balanced by stored tension in the central region (130) of the glass.

In the glass-based articles, there is an alkali metal oxide having a non-zero concentration that varies from one or both of first and second surfaces to a depth of layer (DOL) with respect to the metal oxide. A stress profile is generated due to the non-zero concentration of the metal oxide(s) that varies from the first surface. The non-zero concentration may vary along a portion of the article thickness. In some embodiments, the concentration of the alkali metal oxide is non-zero and varies, both along a thickness range from about 0·t to about 0.3·t. In some embodiments, the concentration of the alkali metal oxide is non-zero and varies along a thickness range from about 0·t to about 0.35·t, from about 0·t to about 0.4·t, from about 0·t to about 0.45·t, from about 0·t to about 0.48·t, or from about 0·t to about 0.50·t. The variation in concentration may be continuous along the above-referenced thickness ranges. Variation in concentration may include a change in metal oxide concentration of about 0.2 mol % or more along a thickness segment of about 100 micrometers. The change in metal oxide concentration may be about 0.3 mol % or more, about 0.4 mol % or more, or about 0.5 mol % or more along a thickness segment of about 100 micrometers. This change may be measured by known methods in the art including microprobe.

In some embodiments, the variation in concentration may be continuous along thickness segments in the range from about 10 micrometers to about 30 micrometers. In some embodiments, the concentration of the alkali metal oxide decreases from the first surface to a value between the first surface and the second surface and increases from the value to the second surface.

The concentration of alkali metal oxide may include more than one metal oxide (e.g., a combination of $Na_2O$ and $K_2O$). In some embodiments, where two metal oxides are utilized and where the radius of the ions differ from one or another, the concentration of ions having a larger radius is greater than the concentration of ions having a smaller radius at shallow depths, while at deeper depths, the concentration of ions having a smaller radius is greater than the concentration of ions having larger radius.

In one or more embodiments, the alkali metal oxide concentration gradient extends through a substantial portion of the thickness t of the article. In some embodiments, the concentration of the metal oxide may be about 0.5 mol % or greater (e.g., about 1 mol % or greater) along the entire thickness of the first and/or second section, and is greatest at a first surface and/or a second surface 0·t and decreases substantially constantly to a value between the first and second surfaces. At that value, the concentration of the metal oxide is the least along the entire thickness t; however the concentration is also non-zero at that point. In other words, the non-zero concentration of that particular metal oxide extends along a substantial portion of the thickness t (as described herein) or the entire thickness t. The total concentration of the particular metal oxide in the glass-based article may be in the range from about 1 mol % to about 20 mol %.

The concentration of the alkali metal oxide may be determined from a baseline amount of the metal oxide in the glass-based substrate ion exchanged to form the glass-based article.

In one or more embodiments, the glass-based article comprises a fracture toughness corresponding to the central composition of greater than or equal to 0.7 MPa*sqrt(m), for example, greater than or equal to 0.75 MPa*sqrt(m), or 0.77 MPa*sqrt(m); and/or a fracture toughness corresponding to the central composition of less than or equal to 1.3 MPa*sqrt(m), for example less than or equal to 1.2 MPa*sqrt(m), 1.1 MPa*sqrt(m), 0.95 MPa*sqrt(m), or 0.9 MPa*sqrt(m); and all values and subranges therebetween.

In combination with the fracture toughness, the glass-based articles may possess one or a combination of the following features: a peak compressive stress (CS) that is greater than or equal to 500 MPa, 550 MPa, 600 MPa, 650 MPa, 700 MPa, 750 MPa, 800 MPa, 850 MPa, 900 MPa, 950 MPa, 1000 MPa, 1050 MPa, 1100 MPa, 1150 MPa, or 1200 MPa, including all values and subranges therebetween; a compressive stress at a knee ($CS_k$) that is greater than or equal to 80 MPa, 85 MPa, 90 MPa, 95 MPa, 100 MPa, 105 MPa, 110 MPa, 115 MPa, 120 MPa, 125 MPa, 130 MPa, 135 MPa, 140 MPa, 145 MPa, 150 MPa, 155 MPa, 160 MPa, including all values and subranges therebetween; a peak tension (PT) that is greater than or equal to 68 MPa, 69 MPa, 70 MPa, 71 MPa, 72 MPa, 73 MPa, 74 MPa, 75 MPa, 77 MPa, 79 MPa, 80 MPa, 82 MPa, 84 MPa, 86 MPa, or 88 MPa, including all values and subranges therebetween; a depth of compression (DOC) that is greater than or equal to 0.13t, 0.14t, 0.15t, 0.16t, 0.17t, 0.18t, 0.19t, 0.20t, 0.21t, 0.22t, and/or less than or equal to 0.30t, 0.29t, 0.28t, 0.27t, 0.26t, 0.25t, 0.24t, 0.23t, including all values and subranges therebetween; a spike depth of layer ($DOL_{sp}$) that is greater than or equal to 0.007t, 0.008t, 0.009t, or 0.01t, including all values and subranges therebetween and/or at a depth from a surface of 7 microns or more, 7.8 microns or more, 8 microns or more, 8.5 microns or more, 9 microns or more, 9.5 microns or more, 10 microns or more, 10.5 microns or more, or 11 microns or more, including all values and subranges therebetween; comprises a stress profile comprising a negative curvature region wherein a second derivative of stress as a function of depth is negative, the negative curvature region is located in a compressive stress layer, and one or more of the following characteristics: a maximum absolute value of the second derivative in the negative curvature region being greater than or equal to 0.003 MPa/$\mu m^2$, 0.005 MPa/$\mu m^2$, 0.007 MPa/$\mu m^2$, or 0.009 MPa/$\mu m^2$; and/or being located at depth that is greater than or equal to 0.01t, 0.012t, 0.015t, 0.02t, 0.04t, 0.05t, 0.06t, 0.07t, including all values and subranges therebetween; and/or being located at a depth of less than 0.2t, 0.17t, 0.14t, 0.11t, or 0.1t, including all values and subranges therebetween; and/or a product of t and the maximum absolute value of the negative second derivative is greater than or equal to 19 GigaPascales (GPa), 32 GPa, 45 GPa, or 57 GPa; a stress profile including a low slope region having one or more of the following characteristics: an average absolute value of a slope of less than or equal to 0.2 MPa/$\mu m$; and/or the average compressive stress in the low slope region is greater than or equal to 80 MPa, 90 MPa, or 100 MPa, including all values and subranges therebetween, including in one or more embodiments, the low slope region is located in the compressive stress layer and extends for 10 $\mu m$ or more and/or the low slope region starts at a depth that is greater than or equal to 0.01t, 0.12t, 0.15t, 0.2t, including all values and subranges therebetween; and/or being located at a depth of less than 0.2t, 0.15t, 0.12t, 0.1t, or 0.09 t including all values and subranges therebetween; t in the range of 0.5 mm to 0.8 mm, and all values and subranges therebetween; and/or t may be 0.8 mm or less, 0.75 mm or less, 0.73 mm or less, 0.70 mm or less, 0.65 mm or less, 0.6 mm or less, 0.55 mm or less, 0.4 mm or less, 0.3 mm or less, or 0.2 mm or less; a $Li_2O/Na_2O$ molar ratio that is less than or equal to 2.0, 1.9, 1.8, 1.6, 1.4, 1.2 at the center of the glass-based article; the $Li_2O/Na_2O$ molar ratio is greater than or equal to 0.65 and less than or equal to 1.2; or greater than or equal to 0.70 and less than or equal to 1.1; or greater than or equal to 0.75 and less than or equal to 1.5; or greater than or equal to 0.75 and less than or equal to 1.25; or greater than or equal to 0.8 and less than or equal to 1.1, or greater than or equal to 0.85 and less than or equal to 1.05, or greater than or equal to 0.9 and less than or equal to 1; and a $Li_2O$ molar concentration that is less than or equal to 12 mol %, 11 mol %, 10 mol %, 9.5 mol %, 9 mol %, 8.5 mol %, or 8 mol %, at the center of the glass-based article.

In one or more embodiments, the glass-based article comprises a peak compressive stress (CS) that is greater than or equal to 500 MPa, 550 MPa, 600 MPa, 650 MPa, 700 MPa, 750 MPa, 800 MPa, 850 MPa, 900 MPa, 950 MPa, 1000 MPa, 1050 MPa, 1100 MPa, 1150 MPa, or 1200 MPa, including all values and subranges therebetween.

In combination with the peak CS, the glass-based articles may possess one or a combination of the following features: a fracture toughness corresponding to the central composition of greater than or equal to 0.7 MPa*sqrt(m), 0.75 MPa*sqrt(m), or 0.77 MPa*sqrt(m); and/or a fracture toughness corresponding to the central composition of less than or equal to 1.3 MPa*sqrt(m), 1.2 MPa*sqrt(m), 1.1 MPa*sqrt(m), 0.95 MPa*sqrt(m), or 0.9 MPa*sqrt(m); and all values and subranges therebetween; a compressive stress at a knee ($CS_k$) that is greater than or equal to 80 MPa, 85 MPa, 90 MPa, 95 MPa, 100 MPa, 105 MPa, 110 MPa, 115 MPa, 120 MPa, 125 MPa, 130 MPa, 135 MPa, 140 MPa, 145 MPa, 150 MPa, 155 MPa, 160 MPa, including all values and subranges therebetween; a peak tension (PT) that is greater than or equal to 68 MPa, 69 MPa, 70 MPa, 71 MPa, 72 MPa, or 73 MPa, 74 MPa, 75 MPa, 77 MPa, 79 MPa, 80 MPa, 82 MPa, 84 MPa, 86 MPa, or 88 MPa, including all values and subranges therebetween; a depth of compression (DOC) that is greater than or equal to 0.13t, 0.14t, 0.15t, 0.16t, 0.17t, 0.18t, 0.19t, 0.20t, 0.21t, 0.22t, and/or less than or equal to 0.30t, 0.29t, 0.28t, 0.27t, 0.26t, 0.25t, 0.24t, 0.23t, including all values and subranges therebetween; a spike depth of layer ($DOL_{sp}$) that is greater than or equal to 0.007t, 0.008t, 0.009t, or 0.01t, including all values and subranges therebetween and/or at a depth from a surface of 7 microns or more, 7.8 microns or more, 8 microns or more, 8.5 microns or more, 9 microns or more, 9.5 microns or more, 10 microns or more, 10.5 microns or more, or 11 microns or more, including all values and subranges therebetween; comprises a stress profile comprising a negative curvature region wherein a second derivative of stress as a function of depth is negative, the negative curvature region is located in a compressive stress layer, and one or more of the following characteristics: a maximum absolute value of the second derivative in the negative curvature region being greater than or equal to 0.003 MPa/$\mu m^2$, 0.005 MPa/$\mu m^2$, 0.007 MPa/$\mu m^2$, or 0.009 MPa/$\mu m^2$; and/or being located at depth that is greater than or equal to 0.01t, 0.012t, 0.015t, 0.02t, 0.04t, 0.05t, 0.06t, 0.07t, including all values and subranges therebetween; and/or being located at a depth of less than 0.2t, 0.17t, 0.14t, 0.11t, or 0.1t, including all values and subranges therebetween; and/or a product oft and the maximum absolute value of the negative second derivative is greater than or equal to 19 GPa, 32 GPa, 45 GPa, or 57 GPa; a stress profile including a low slope region having one or more of the following characteristics: an average absolute value of a slope of less than or equal to 0.2 MPa/$\mu m$; and/or the average compressive stress in the low slope region is greater than or equal to 80 MPa, 90 MPa, or 100 MPa, including all values and subranges therebetween, including in one or more embodiments, the low slope region is located in the compressive stress layer and extends for 10 $\mu m$ or more and/or the low slope region starts at a depth that is greater than or equal to 0.01t, 0.012t, 0.015t, 0.02t, including all values and subranges therebetween; and/or being located at a depth of less than 0.2t, 0.15t, 0.12t, 0.1t, or 0.09 t including all values and subranges therebetween; t in the range of 0.5 mm to 0.8 mm, and all values and subranges therebetween; and/or t may be 0.8 mm or less, 0.75 mm or less, 0.73 mm or less, 0.70 mm or less, 0.65 mm or less, 0.6 mm or less, 0.55 mm or less, 0.4 mm or less, 0.3 mm or less, or 0.2 mm or less; a $Li_2O/Na_2O$ molar ratio that is less than or equal to 2.0, 1.9, 1.8, 1.6, 1.4, 1.2 at the center of the glass-based article; the $Li_2O/Na_2O$ molar ratio is greater than or equal to 0.65 and less than or equal to 1.2; or greater than or equal to 0.70 and less than or equal to 1.1; or greater than or equal to 0.75 and less than or equal to 1.5; or greater than or equal to 0.75 and less than or equal to 1.25; or greater than or equal to 0.8 and less than or equal to 1.1, or greater than or equal to 0.85 and less than or equal to 1.05, or greater than or equal to 0.9 and less than or equal to 1; and a $Li_2O$ molar concentration that is less than or equal to 12 mol %, 11 mol %, 10 mol %, 9.5 mol %, 9 mol %, 8.5 mol %, or 8 mol %, at the center of the glass-based article.

In one or more embodiments, the glass-based article comprises a compressive stress at a knee ($CS_k$) that is greater than or equal to 80 MPa, 85 MPa, 90 MPa, 95 MPa, 100 MPa, 105 MPa, 110 MPa, 115 MPa, 120 MPa, 125 MPa, 130 MPa, 135 MPa, 140 MPa, 145 MPa, 150 MPa, 155 MPa, 160 MPa, including all values and subranges therebetween. In one or more embodiments, the glass-based article comprises a compressive stress at a knee ($CS_k$) that is greater than or equal to 50 MPa, 55 MPa, 60 MPa, 65 MPa, 70 MPa, 75 MPa, 80 MPa, 85 MPa, 90 MPa, 95 MPa, 100 MPa, 105 MPa, 110 MPa, 115 MPa, 120 MPa, 125 MPa, 130 MPa, 135

MPa, 140 MPa, 145 MPa, 150 MPa, 155 MPa, 160 MPa, including all values and subranges therebetween.

In combination with the $CS_k$, the glass-based articles may possess one or a combination of the following features: a fracture toughness corresponding to the central composition of greater than or equal to 0.7 MPa*sqrt(m), 0.75 MPa*sqrt(m), or 0.77 MPa*sqrt(m); and/or a fracture toughness corresponding to the central composition of less than or equal to 1.3 MPa*sqrt(m), 1.2 MPa*sqrt(m), 1.1 MPa*sqrt(m), 0.95 MPa*sqrt(m), or 0.9 MPa*sqrt(m); and all values and subranges therebetween; a peak compressive stress (CS) that is greater than or equal to 500 MPa, 550 MPa, 600 MPa, 650 MPa, 700 MPa, 750 MPa, 800 MPa, 850 MPa, 900 MPa, 950 MPa, 1000 MPa, 1050 MPa, 1100 MPa, 1150 MPa, or 1200 MPa, including all values and subranges therebetween; a peak tension (PT) that is greater than or equal to 68 MPa, 69 MPa, 70 MPa, 71 MPa, 72 MPa, or 73 MPa, 74 MPa, 75 MPa, 77 MPa, 79 MPa, 80 MPa, 82 MPa, 84 MPa, 86 MPa, or 88 MPa, including all values and subranges therebetween; a depth of compression (DOC) that is greater than or equal to 0.13t, 0.14t, 0.15t, 0.16t, 0.17t, 0.18t, 0.19t, 0.20t, 0.21t, 0.22t, and/or less than or equal to 0.30t, 0.29t, 0.28t, 0.27t, 0.26t, 0.25t, 0.24t, 0.23t, including all values and subranges therebetween; a spike depth of layer ($DOL_{sp}$) that is greater than or equal to 0.007t, 0.008t, 0.009t, or 0.01t, including all values and subranges therebetween and/or at a depth from a surface of 7 microns or more, 7.8 microns or more, 8 microns or more, 8.5 microns or more, 9 microns or more, 9.5 microns or more, 10 microns or more, 10.5 microns or more, or 11 microns or more, including all values and subranges therebetween; comprises a stress profile comprising a negative curvature region wherein a second derivative of stress as a function of depth is negative, the negative curvature region is located in a compressive stress layer, and one or more of the following characteristics: a maximum absolute value of the second derivative in the negative curvature region being greater than or equal to 0.003 MPa/$\mu m^2$, 0.005 MPa/$\mu m^2$, 0.007 MPa/$\mu m^2$, or 0.009 MPa/$\mu m^2$; and/or being located at depth that is greater than or equal to 0.01t, 0.012t, 0.015t, 0.02t, 0.04t, 0.05t, 0.06t, 0.07t, including all values and subranges therebetween; and/or being located at a depth of less than 0.2t, 0.17t, 0.14t, 0.11t, or 0.1t, including all values and subranges therebetween; and/or a product of t and the maximum absolute value of the negative second derivative is greater than or equal to 19 GPa, 32 GPa, 45 GPa, or 57 GPa; a stress profile including a low slope region having one or more of the following characteristics: an average absolute value of a slope of less than or equal to 0.2 MPa/$\mu m$; and/or the average compressive stress in the low slope region is greater than or equal to 80 MPa, 90 MPa, or 100 MPa, including all values and subranges therebetween, including in one or more embodiments, the low slope region is located in the compressive stress layer and extends for 10 $\mu m$ or more and/or the low slope region starts at a depth that is greater than or equal to 0.01t, 0.012t, 0.015t, 0.02t, including all values and subranges therebetween; and/or being located at a depth of less than 0.2t, 0.15t, 0.12t, 0.1t, or 0.09 t including all values and subranges therebetween; t in the range of 0.5 mm to 0.8 mm, and all values and subranges therebetween; and/or t may be 0.8 mm or less, 0.75 mm or less, 0.73 mm or less, 0.70 mm or less, 0.65 mm or less, 0.6 mm or less, 0.55 mm or less, 0.4 mm or less, 0.3 mm or less, or 0.2 mm or less; a $Li_2O/Na_2O$ molar ratio that is less than or equal to 2.0, 1.9, 1.8, 1.6, 1.4, 1.2 at the center of the glass-based article; the $Li_2O/Na_2O$ molar ratio is greater than or equal to 0.65 and less than or equal to 1.2; or greater than or equal to 0.70 and less than or equal to 1.1; or greater than or equal to 0.75 and less than or equal to 1.5; or greater than or equal to 0.75 and less than or equal to 1.25; or greater than or equal to 0.8 and less than or equal to 1.1, or greater than or equal to 0.85 and less than or equal to 1.05, or greater than or equal to 0.9 and less than or equal to 1; and a $Li_2O$ molar concentration is less than or equal to 12 mol %, 11 mol %, 10 mol %, 9.5 mol %, 9 mol %, 8.5 mol %, or 8 mol %, at the center of the glass-based article.

In one or more embodiments, the glass-based article comprises a peak tension (PT) that is greater than or equal to 68 MPa, 69 MPa, 70 MPa, 71 MPa, 72 MPa, or 73 MPa, 74 MPa, 75 MPa, 77 MPa, 79 MPa, 80 MPa, 82 MPa, 84 MPa, 86 MPa, or 88 MPa, including all values and subranges therebetween.

In combination with the peak CT, the glass-based articles may possess one or a combination of the following features: a fracture toughness corresponding to the central composition of greater than or equal to 0.7 MPa*sqrt(m), 0.75 MPa*sqrt(m), or 0.77 MPa*sqrt(m); and/or a fracture toughness corresponding to the central composition of less than or equal to 1.3 MPa*sqrt(m), 1.2 MPa*sqrt(m), 1.1 MPa*sqrt(m), 0.95 MPa*sqrt(m), or 0.9 MPa*sqrt(m); and all values and subranges therebetween; a peak compressive stress (CS) that is greater than or equal to 500 MPa, 550 MPa, 600 MPa, 650 MPa, 700 MPa, 750 MPa, 800 MPa, 850 MPa, 900 MPa, 950 MPa, 1000 MPa, 1050 MPa, 1100 MPa, 1150 MPa, or 1200 MPa, including all values and subranges therebetween; a compressive stress at a knee ($CS_k$) that is greater than or equal to 80 MPa, 85 MPa, 90 MPa, 95 MPa, 100 MPa, 105 MPa, 110 MPa, 115 MPa, 120 MPa, 125 MPa, 130 MPa, 135 MPa, 140 MPa, 145 MPa, 150 MPa, 155 MPa, 160 MPa, including all values and subranges therebetween; a depth of compression (DOC) that is greater than or equal to 0.13t, 0.14t, 0.15t, 0.16t, 0.17t, 0.18t, 0.19t, 0.20t, 0.21t, 0.22t, and/or less than or equal to 0.30t, 0.29t, 0.28t, 0.27t, 0.26t, 0.25t, 0.24t, 0.23t, including all values and subranges therebetween; a spike depth of layer ($DOL_{sp}$) that is greater than or equal to 0.007t, 0.008t, 0.009t, or 0.01t, including all values and subranges therebetween and/or at a depth from a surface of 7 microns or more, 7.8 microns or more, 8 microns or more, 8.5 microns or more, 9 microns or more, 9.5 microns or more, 10 microns or more, 10.5 microns or more, or 11 microns or more, including all values and subranges therebetween; comprises a stress profile comprising a negative curvature region wherein a second derivative of stress as a function of depth is negative, the negative curvature region is located in a compressive stress layer, and one or more of the following characteristics: a maximum absolute value of the second derivative in the negative curvature region being greater than or equal to 0.003 MPa/$\mu m^2$, 0.005 MPa/$\mu m^2$, 0.007 MPa/$\mu m^2$, or 0.009 MPa/$\mu m^2$; and/or being located at depth that is greater than or equal to 0.01t, 0.012t, 0.015t, 0.02t, 0.04t, 0.05t, 0.06t, 0.07t, including all values and subranges therebetween; and/or being located at a depth of less than 0.2t, 0.17t, 0.14t, 0.11t, or 0.1t, including all values and subranges therebetween; and/or a product of t and the maximum absolute value of the negative second derivative is greater than or equal to 19 GPa, 32 GPa, 45 GPa, or 57 GPa; a stress profile including a low slope region having one or more of the following characteristics: an average absolute value of a slope of less than or equal to 0.2 MPa/$\mu m$; and/or the average compressive stress in the low slope region is greater than or equal to 80 MPa, 90 MPa, or 100 MPa, including all values and subranges therebetween, including in one or more embodiments, the low slope region is located in the compressive stress layer and extends for 10 µm or more and/or the low slope region starts at a depth that is greater than or equal to 0.01t, 0.012t, 0.015t, 0.02t, including all values and subranges therebetween; and/or being located at a depth of less than 0.2t, 0.15t, 0.12t, 0.1t, or 0.09 t including all values and subranges therebetween; t in the range of 0.5 mm to 0.8 mm, and all values and subranges therebetween; and/or t may be 0.8 mm or less, 0.75 mm or less, 0.73 mm or less, 0.70 mm or less, 0.65 mm or less, 0.6 mm or less, 0.55 mm or less, 0.4 mm or less, 0.3 mm or less, or 0.2 mm or less; a $Li_2O/Na_2O$ molar ratio that is less than or equal to 2.0, 1.9, 1.8, 1.6, 1.4, 1.2 at the center of the glass-based article; the $Li_2O/Na_2O$ molar ratio is greater than or equal to 0.65 and less than or equal to 1.2; or greater than or equal to 0.70 and less than or equal to 1.1; or greater than or equal to 0.75 and less than or equal to 1.5; or greater than or equal to 0.75 and less than or equal to 1.25; or greater than or equal to 0.8 and less than or equal to 1.1, or greater than or equal to 0.85 and less than or equal to 1.05, or greater than or equal to 0.9 and less than or equal to 1; and a $Li_2O$ molar concentration that is less than or equal to 12 mol %, 11 mol %, 10 mol %, 9.5 mol %, 9 mol %, 8.5 mol %, or 8 mol %, at the center of the glass-based article.

In one or more embodiments, the glass-based article comprises a depth of compression (DOC) that is greater than or equal to 0.13t, 0.14t, 0.15t, 0.16t, 0.17t, 0.18t, 0.19t, 0.20t, 0.21t, 0.22t, and/or less than or equal to 0.30t, 0.29t, 0.28t, 0.27t, 0.26t, 0.25t, 0.24t, 0.23t, including all values and subranges therebetween.

In combination with the DOC, the glass-based articles may possess one or a combination of the following features: a fracture toughness corresponding to the central composition of greater than or equal to 0.7 MPa*sqrt(m), 0.75 MPa*sqrt(m), or 0.77 MPa*sqrt(m); and/or a fracture toughness corresponding to the central composition of less than or equal to 1.3 MPa*sqrt(m), 1.2 MPa*sqrt(m), 1.1 MPa*sqrt(m), 0.95 MPa*sqrt(m), or 0.9 MPa*sqrt(m); and all values and subranges therebetween; a peak compressive stress (CS) that is greater than or equal to 500 MPa, 550 MPa, 600 MPa, 650 MPa, 700 MPa, 750 MPa, 800 MPa, 850 MPa, 900 MPa, 950 MPa, 1000 MPa, 1050 MPa, 1100 MPa, 1150 MPa, or 1200 MPa, including all values and subranges therebetween; a compressive stress at a knee ($CS_k$) that is greater than or equal to 80 MPa, 85 MPa, 90 MPa, 95 MPa, 100 MPa, 105 MPa, 110 MPa, 115 MPa, 120 MPa, 125 MPa, 130 MPa, 135 MPa, 140 MPa, 145 MPa, 150 MPa, 155 MPa, 160 MPa, including all values and subranges therebetween; a peak tension (PT) that is greater than or equal to 68 MPa, 69 MPa, 70 MPa, 71 MPa, 72 MPa, or 73 MPa, 74 MPa, 75 MPa, 77 MPa, 79 MPa, 80 MPa, 82 MPa, 84 MPa, 86 MPa, or 88 MPa, including all values and subranges therebetween; a spike depth of layer ($DOL_{sp}$) that is greater than or equal to 0.007t, 0.008t, 0.009t, or 0.01t, including all values and subranges therebetween and/or at a depth from a surface of 7 microns or more, 7.8 microns or more, 8 microns or more, 8.5 microns or more, 9 microns or more, 9.5 microns or more, 10 microns or more, 10.5 microns or more, or 11 microns or more, including all values and subranges therebetween; comprises a stress profile comprising a negative curvature region wherein a second derivative of stress as a function of depth is negative, the negative curvature region is located in a compressive stress layer, and one or more of the following characteristics: a maximum absolute value of the second derivative in the negative curvature region being greater than or equal to 0.003 MPa/µm², 0.005 MPa/µm², 0.007 MPa/µm², or 0.009 MPa/µm²; and/or being located at depth that is greater than or equal to 0.01t, 0.012t, 0.015t, 0.02t, 0.04t, 0.05t, 0.06t, 0.07t, including all values and subranges therebetween; and/or being located at a depth of less than 0.2t, 0.17t, 0.14t, 0.11t, or 0.1t, including all values and subranges therebetween; and/or a product oft and the maximum absolute value of the negative second derivative is greater than or equal to 19 GPa, 32 GPa, 45 GPa, or 57 GPa; a stress profile including a low slope region having one or more of the following characteristics: an average absolute value of a slope of less than or equal to 0.2 MPa/µm; and/or the average compressive stress in the low slope region is greater than or equal to 80 MPa, 90 MPa, or 100 MPa, including all values and subranges therebetween, including in one or more embodiments, the low slope region is located in the compressive stress layer and extends for 10 µm or more and/or the low slope region starts at a depth that is greater than or equal to 0.01t, 0.012t, 0.015t, 0.02t, including all values and subranges therebetween; and/or being located at a depth of less than 0.2t, 0.15t, 0.12t, 0.1t, or 0.09 t including all values and subranges therebetween; t in the range of 0.5 mm to 0.8 mm, and all values and subranges therebetween; and/or t may be 0.8 mm or less, 0.75 mm or less, 0.73 mm or less, 0.70 mm or less, 0.65 mm or less, 0.6 mm or less, 0.55 mm or less, 0.4 mm or less, 0.3 mm or less, or 0.2 mm or less; a $Li_2O/Na_2O$ molar ratio that is less than or equal to 2.0, 1.9, 1.8, 1.6, 1.4, 1.2 at the center of the glass-based article; the $Li_2O/Na_2O$ molar ratio is greater than or equal to 0.65 and less than or equal to 1.2; or greater than or equal to 0.70 and less than or equal to 1.1; or greater than or equal to 0.75 and less than or equal to 1.5; or greater than or equal to 0.75 and less than or equal to 1.25; or greater than or equal to 0.8 and less than or equal to 1.1, or greater than or equal to 0.85 and less than or equal to 1.05, or greater than or equal to 0.9 and less than or equal to 1; and a $Li_2O$ molar concentration that is less than or equal to 12 mol %, 11 mol %, 10 mol %, 9.5 mol %, 9 mol %, 8.5 mol %, or 8 mol %, at the center of the glass-based article.

In one or more embodiments, the glass-based article comprises a spike depth of layer ($DOL_{sp}$) that is greater than or equal to 0.007t, 0.008t, 0.009t, or 0.01t, including all values and subranges therebetween and/or at a depth from a surface of 7 microns or more, 7.8 microns or more, 8 microns or more, 8.5 microns or more, 9 microns or more, 9.5 microns or more, 10 microns or more, 10.5 microns or more, or 11 microns or more, including all values and subranges therebetween. In one or more embodiments, the glass-based article comprises a spike depth of layer ($DOL_{sp}$) that is greater than or equal to 0.012t, 0.014t, 0.016t, 0.018t, or 0.02t, including all values and subranges therebetween.

In combination with the $DOL_{sp}$, the glass-based articles may possess one or a combination of the following features: a fracture toughness corresponding to the central composition of greater than or equal to 0.7 MPa*sqrt(m), 0.75 MPa*sqrt(m), or 0.77 MPa*sqrt(m); and/or a fracture toughness corresponding to the central composition of less than or equal to 1.3 MPa*sqrt(m), 1.2 MPa*sqrt(m), 1.1 MPa*sqrt(m), 0.95 MPa*sqrt(m), or 0.9 MPa*sqrt(m); and all values and subranges therebetween; a peak compressive stress (CS) that is greater than or equal to 500 MPa, 550 MPa, 600 MPa, 650 MPa, 700 MPa, 750 MPa, 800 MPa, 850 MPa, 900 MPa, 950 MPa, 1000 MPa, 1050 MPa, 1100 MPa, 1150 MPa, or 1200 MPa, including all values and subranges therebetween; a compressive stress at a knee ($CS_k$) that is greater than or equal to 80 MPa, 85 MPa, 90 MPa, 95 MPa, 100 MPa, 105 MPa, 110 MPa, 115 MPa, 120 MPa, 125 MPa, 130 MPa, 135 MPa, 140 MPa, 145 MPa, 150 MPa, 155 MPa, 160 MPa, including all values and subranges therebetween; a peak tension (PT) that is greater than or equal to 68 MPa, 69 MPa, 70 MPa, 71 MPa, 72 MPa, or 73 MPa, 74

MPa, 75 MPa, 77 MPa, 79 MPa, 80 MPa, 82 MPa, 84 MPa, 86 MPa, or 88 MPa, including all values and subranges therebetween; a depth of compression (DOC) that is greater than or equal to 0.13t, 0.14t, 0.15t, 0.16t, 0.17t, 0.18t, 0.19t, 0.20t, 0.21t, 0.22t, and/or less than or equal to 0.30t, 0.29t, 0.28t, 0.27t, 0.26t, 0.25t, 0.24t, 0.23t, including all values and subranges therebetween; comprises a stress profile comprising a negative curvature region wherein a second derivative of stress as a function of depth is negative, the negative curvature region is located in a compressive stress layer, and one or more of the following characteristics: a maximum absolute value of the second derivative in the negative curvature region being greater than or equal to 0.003 MPa/$\mu m^2$, 0.005 MPa/$\mu m^2$, 0.007 MPa/$\mu m^2$, or 0.009 MPa/$\mu m^2$; and/or being located at depth that is greater than or equal to 0.01t, 0.012t, 0.015t, 0.02t, 0.04t, 0.05t, 0.06t, 0.07t, including all values and subranges therebetween; and/or being located at a depth of less than 0.2t, 0.17t, 0.14t, 0.11t, or 0.1t, including all values and subranges therebetween; and/or a product of t and the maximum absolute value of the negative second derivative is greater than or equal to 19 GPa, 32 GPa, 45 GPa, or 57 GPa; a stress profile including a low slope region having one or more of the following characteristics: an average absolute value of a slope of less than or equal to 0.2 MPa/$\mu m$; and/or the average compressive stress in the low slope region is greater than or equal to 80 MPa, 90 MPa, or 100 MPa, including all values and subranges therebetween, including in one or more embodiments, the low slope region is located in the compressive stress layer and extends for 10 $\mu m$ or more and/or the low slope region starts at a depth that is greater than or equal to 0.01t, 0.012t, 0.015t, 0.02t, including all values and subranges therebetween; and/or being located at a depth of less than 0.2t, 0.15t, 0.12t, 0.1t, or 0.09 t including all values and subranges therebetween; t in the range of 0.5 mm to 0.8 mm, and all values and subranges therebetween; and/or t may be 0.8 mm or less, 0.75 mm or less, 0.73 mm or less, 0.70 mm or less, 0.65 mm or less, 0.6 mm or less, 0.55 mm or less, 0.4 mm or less, 0.3 mm or less, or 0.2 mm or less; a $Li_2O/Na_2O$ molar ratio that is less than or equal to 2.0, 1.9, 1.8, 1.6, 1.4, 1.2 at the center of the glass-based article; the $Li_2O/Na_2O$ molar ratio is greater than or equal to 0.65 and less than or equal to 1.2; or greater than or equal to 0.70 and less than or equal to 1.1; or greater than or equal to 0.75 and less than or equal to 1.5; or greater than or equal to 0.75 and less than or equal to 1.25; or greater than or equal to 0.8 and less than or equal to 1.1, or greater than or equal to 0.85 and less than or equal to 1.05, or greater than or equal to 0.9 and less than or equal to 1; and a $Li_2O$ molar concentration that is less than or equal to 12 mol %, 11 mol %, 10 mol %, 9.5 mol %, 9 mol %, 8.5 mol %, or 8 mol %, at the center of the glass-based article.

In one or more embodiments, the glass-based article comprises a stress profile comprising a negative curvature region wherein a second derivative of stress as a function of depth is negative, the negative curvature region is located in a compressive stress layer, and one or more of the following characteristics: a maximum absolute value of the second derivative in the negative curvature region being greater than or equal to 0.003 MPa/$\mu m^2$, 0.005 MPa/$\mu m^2$, 0.007 MPa/$\mu m^2$, or 0.009 MPa/$\mu m^2$; and/or being located at depth that is greater than or equal to 0.01t, 0.012t, 0.015t, 0.02t, 0.04t, 0.05t, 0.06t, 0.07t, including all values and subranges therebetween; and/or being located at a depth of less than 0.2t, 0.17t, 0.14t, 0.11t, or 0.1t, including all values and subranges therebetween; and/or a product of t and the maximum absolute value of the negative second derivative is greater than or equal to 19 GPa, 32 GPa, 45 GPa, or 57 GPa.

In combination with the maximum absolute value of the second derivative in the negative curvature region and/or its depth and/or its product of second derivative and glass thickness, the glass-based articles may possess one or a combination of the following features: a fracture toughness corresponding to the central composition of greater than or equal to 0.7 MPa*sqrt(m), 0.75 MPa*sqrt(m), or 0.77 MPa*sqrt(m); and/or a fracture toughness corresponding to the central composition of less than or equal to 1.3 MPa*sqrt(m), 1.2 MPa*sqrt(m), 1.1 MPa*sqrt(m), 0.95 MPa*sqrt(m), or 0.9 MPa*sqrt(m); and all values and subranges therebetween; a peak compressive stress (CS) that is greater than or equal to 500 MPa, 550 MPa, 600 MPa, 650 MPa, 700 MPa, 750 MPa, 800 MPa, 850 MPa, 900 MPa, 950 MPa, 1000 MPa, 1050 MPa, 1100 MPa, 1150 MPa, or 1200 MPa, including all values and subranges therebetween; a compressive stress at a knee ($CS_k$) that is greater than or equal to 80 MPa, 85 MPa, 90 MPa, 95 MPa, 100 MPa, 105 MPa, 110 MPa, 115 MPa, 120 MPa, 125 MPa, 130 MPa, 135 MPa, 140 MPa, 145 MPa, 150 MPa, 155 MPa, 160 MPa, including all values and subranges therebetween; a peak tension (PT) that is greater than or equal to 68 MPa, 69 MPa, 70 MPa, 71 MPa, 72 MPa, or 73 MPa, 74 MPa, 75 MPa, 77 MPa, 79 MPa, 80 MPa, 82 MPa, 84 MPa, 86 MPa, or 88 MPa, including all values and subranges therebetween; a depth of compression (DOC) that is greater than or equal to 0.13t, 0.14t, 0.15t, 0.16t, 0.17t, 0.18t, 0.19t, 0.20t, 0.21t, 0.22t, and/or less than or equal to 0.30t, 0.29t, 0.28t, 0.27t, 0.26t, 0.25t, 0.24t, 0.23t, including all values and subranges therebetween; a spike depth of layer ($DOL_{sp}$) that is greater than or equal to 0.007t, 0.008t, 0.009t, or 0.01t, including all values and subranges therebetween and/or at a depth from a surface of 7 microns or more, 7.8 microns or more, 8 microns or more, 8.5 microns or more, 9 microns or more, 9.5 microns or more, 10 microns or more, 10.5 microns or more, or 11 microns or more, including all values and subranges therebetween; a stress profile including a low slope region having one or more of the following characteristics: an average absolute value of a slope of less than or equal to 0.2 MPa/$\mu m$; and/or the average compressive stress in the low slope region is greater than or equal to 80 MPa, 90 MPa, or 100 MPa, including all values and subranges therebetween, including in one or more embodiments, the low slope region is located in the compressive stress layer and extends for 10 $\mu m$ or more and/or the low slope region starts at a depth that is greater than or equal to 0.01t, 0.012t, 0.015t, 0.02t, including all values and subranges therebetween; and/or being located at a depth of less than 0.2t, 0.15t, 0.12t, 0.1t, or 0.09 t including all values and subranges therebetween; t in the range of 0.5 mm to 0.8 mm, and all values and subranges therebetween; and/or t may be 0.8 mm or less, 0.75 mm or less, 0.73 mm or less, 0.70 mm or less, 0.65 mm or less, 0.6 mm or less, 0.55 mm or less, 0.4 mm or less, 0.3 mm or less, or 0.2 mm or less; a $Li_2O/Na_2O$ molar ratio that is less than or equal to 2.0, 1.9, 1.8, 1.6, 1.4, 1.2 at the center of the glass-based article; the $Li_2O/Na_2O$ molar ratio is greater than or equal to 0.65 and less than or equal to 1.2; or greater than or equal to 0.70 and less than or equal to 1.1; or greater than or equal to 0.75 and less than or equal to 1.5; or greater than or equal to 0.75 and less than or equal to 1.25; or greater than therebetween or equal to 0.8 and less than or equal to 1.1, or greater than or equal to 0.85 and less than or equal to 1.05, or greater than or equal to 0.9 and less than or equal to 1; and a $Li_2O$ molar concentration that is less than or equal to 12 mol %, 11 mol %, 10 mol %, 9.5 mol %, 9 mol %, 8.5 mol %, or 8 mol %, at the center of the glass-based article.

In one or more embodiments, the glass-based article comprises a stress profile including a low slope region having one or more of the following characteristics: an average absolute value of a slope of less than or equal to 0.2 MPa/μm; and/or the average compressive stress in the low slope region is greater than or equal to 80 MPa, 90 MPa, or 100 MPa, including all values and subranges therebetween. In one or more embodiments, the low slope region is located in the compressive stress layer and extends for 10 μm or more. In one or more embodiments, the low slope region starts at a depth that is greater than or equal to 0.01t, 0.012t, 0.015t, 0.02t, including all values and subranges therebetween; and/or being located at a depth of less than 0.2t, 0.15t, 0.12t, 0.1t, or 0.09 t including all values and subranges therebetween.

In combination with the low slope region characteristics, the glass-based articles may possess one or a combination of the following features: a fracture toughness corresponding to the central composition of greater than or equal to 0.7 MPa*sqrt(m), 0.75 MPa*sqrt(m), or 0.77 MPa*sqrt(m); and/or a fracture toughness corresponding to the central composition of less than or equal to 1.3 MPa*sqrt(m), 1.2 MPa*sqrt(m), 1.1 MPa*sqrt(m), 0.95 MPa*sqrt(m), or 0.9 MPa*sqrt(m); and all values and subranges therebetween; a peak compressive stress (CS) that is greater than or equal to 500 MPa, 550 MPa, 600 MPa, 650 MPa, 700 MPa, 750 MPa, 800 MPa, 850 MPa, 900 MPa, 950 MPa, 1000 MPa, 1050 MPa, 1100 MPa, 1150 MPa, or 1200 MPa, including all values and subranges therebetween; a compressive stress at a knee ($CS_k$) that is greater than or equal to 80 MPa, 85 MPa, 90 MPa, 95 MPa, 100 MPa, 105 MPa, 110 MPa, 115 MPa, 120 MPa, 125 MPa, 130 MPa, 135 MPa, 140 MPa, 145 MPa, 150 MPa, 155 MPa, 160 MPa, including all values and subranges therebetween; a peak tension (PT) that is greater than or equal to 68 MPa, 69 MPa, 70 MPa, 71 MPa, 72 MPa, or 73 MPa, 74 MPa, 75 MPa, 77 MPa, 79 MPa, 80 MPa, 82 MPa, 84 MPa, 86 MPa, or 88 MPa, including all values and subranges therebetween; a depth of compression (DOC) that is greater than or equal to 0.13t, 0.14t, 0.15t, 0.16t, 0.17t, 0.18t, 0.19t, 0.20t, 0.21t, 0.22t, and/or less than or equal to 0.30t, 0.29t, 0.28t, 0.27t, 0.26t, 0.25t, 0.24t, 0.23t, including all values and subranges therebetween; a spike depth of layer ($DOL_{sp}$) that is greater than or equal to 0.007t, 0.008t, 0.009t, or 0.01t, including all values and subranges therebetween and/or at a depth from a surface of 7 microns or more, 7.8 microns or more, 8 microns or more, 8.5 microns or more, 9 microns or more, 9.5 microns or more, 10 microns or more, 10.5 microns or more, or 11 microns or more, including all values and subranges therebetween; comprises a stress profile comprising a negative curvature region wherein a second derivative of stress as a function of depth is negative, the negative curvature region is located in a compressive stress layer, and one or more of the following characteristics: a maximum absolute value of the second derivative in the negative curvature region being greater than or equal to 0.003 MPa/μm$^2$, 0.005 MPa/μm$^2$, 0.007 MPa/μm$^2$, or 0.009 MPa/μm$^2$; and/or being located at depth that is greater than or equal to 0.01t, 0.012t, 0.015t, 0.02t, 0.04t, 0.05t, 0.06t, 0.07t, including all values and subranges therebetween; and/or being located at a depth of less than 0.2t, 0.17t, 0.14t, 0.11t, or 0.1t, including all values and subranges therebetween; and/or a product oft and the maximum absolute value of the negative second derivative is greater than or equal to 19 GPa, 32 GPa, 45 GPa, or 57 GPa; t in the range of 0.5 mm to 0.8 mm, and all values and subranges therebetween; and/or t may be 0.8 mm or less, 0.75 mm or less, 0.73 mm or less, 0.70 mm or less, 0.65 mm or less, 0.6 mm or less, 0.55 mm or less, 0.4 mm or less, 0.3 mm or less, or 0.2 mm or less; a $Li_2O/Na_2O$ molar ratio that is less than or equal to 2.0, 1.9, 1.8, 1.6, 1.4, 1.2 at the center of the glass-based article; the $Li_2O/Na_2O$ molar ratio is greater than or equal to 0.65 and less than or equal to 1.2; or greater than or equal to 0.70 and less than or equal to 1.1; or greater than or equal to 0.75 and less than or equal to 1.5; or greater than or equal to 0.75 and less than or equal to 1.25; or greater than or equal to 0.8 and less than or equal to 1.1, or greater than or equal to 0.85 and less than or equal to 1.05, or greater than or equal to 0.9 and less than or equal to 1; and a $Li_2O$ molar concentration that is less than or equal to 12 mol %, 11 mol %, 10 mol %, 9.5 mol %, 9 mol %, 8.5 mol %, or 8 mol %, at the center of the glass-based article.

In one or more embodiments, the glass-based article comprises t in the range of 0.5 mm to 0.8 mm, and all values and subranges therebetween; and/or t may be 0.8 mm or less, 0.75 mm or less, 0.73 mm or less, 0.70 mm or less, 0.65 mm or less, 0.6 mm or less, 0.55 mm or less, 0.4 mm or less, 0.3 mm or less, or 0.2 mm or less.

In combination with t, the glass-based articles may possess one or a combination of the following features: a fracture toughness corresponding to the central composition of greater than or equal to 0.7 MPa*sqrt(m), 0.75 MPa*sqrt(m), or 0.77 MPa*sqrt(m); and/or a fracture toughness corresponding to the central composition of less than or equal to 1.3 MPa*sqrt(m), 1.2 MPa*sqrt(m), 1.1 MPa*sqrt(m), 0.95 MPa*sqrt(m), or 0.9 MPa*sqrt(m); and all values and subranges therebetween; a peak compressive stress (CS) that is greater than or equal to 500 MPa, 550 MPa, 600 MPa, 650 MPa, 700 MPa, 750 MPa, 800 MPa, 850 MPa, 900 MPa, 950 MPa, 1000 MPa, 1050 MPa, 1100 MPa, 1150 MPa, or 1200 MPa, including all values and subranges therebetween; a compressive stress at a knee ($CS_k$) that is greater than or equal to 80 MPa, 85 MPa, 90 MPa, 95 MPa, 100 MPa, 105 MPa, 110 MPa, 115 MPa, 120 MPa, 125 MPa, 130 MPa, 135 MPa, 140 MPa, 145 MPa, 150 MPa, 155 MPa, 160 MPa, including all values and subranges therebetween; a peak tension (PT) that is greater than or equal to 68 MPa, 69 MPa, 70 MPa, 71 MPa, 72 MPa, or 73 MPa, 74 MPa, 75 MPa, 77 MPa, 79 MPa, 80 MPa, 82 MPa, 84 MPa, 86 MPa, or 88 MPa, including all values and subranges therebetween; a depth of compression (DOC) that is greater than or equal to 0.13t, 0.14t, 0.15t, 0.16t, 0.17t, 0.18t, 0.19t, 0.20t, 0.21t, 0.22t, and/or less than or equal to 0.30t, 0.29t, 0.28t, 0.27t, 0.26t, 0.25t, 0.24t, 0.23t, including all values and subranges therebetween; a spike depth of layer ($DOL_{sp}$) that is greater than or equal to 0.007t, 0.008t, 0.009t, or 0.01t, including all values and subranges therebetween and/or at a depth from a surface of 7 microns or more, 7.8 microns or more, 8 microns or more, 8.5 microns or more, 9 microns or more, 9.5 microns or more, 10 microns or more, 10.5 microns or more, or 11 microns or more, including all values and subranges therebetween; comprises a stress profile comprising a negative curvature region wherein a second derivative of stress as a function of depth is negative, the negative curvature region is located in a compressive stress layer, and one or more of the following characteristics: a maximum absolute value of the second derivative in the negative curvature region being greater than or equal to 0.003 MPa/μm$^2$, 0.005 MPa/μm$^2$, 0.007 MPa/μm$^2$, or 0.009 MPa/μm$^2$; and/or being located at depth that is greater than or equal to 0.01t, 0.012t, 0.015t, 0.02t, 0.04t, 0.05t, 0.06t, 0.07t, including all values and subranges therebetween; and/or being located at a depth of less than 0.2t, 0.17t, 0.14t, 0.11t, or 0.1t, including all values and subranges therebetween; and/or a product of t and the maximum absolute value of the negative second derivative is greater than or equal to 19 GPa, 32 GPa, 45 GPa, or 57 GPa; a stress profile including a low slope region having one or more of the following characteristics: an average absolute value of a slope of less than or equal to 0.2 MPa/μm; and/or the average compressive stress in the low slope region is greater than or equal to 80 MPa, 90 MPa, or 100 MPa, including all values and subranges therebetween, including in one or more embodiments, the low slope region is located in the compressive stress layer and extends for 10 μm or more and/or the low slope region starts at a depth that is greater than or equal to 0.01t, 0.012t, 0.015t, 0.02t, including all values and subranges therebetween; and/or being located at a depth of less than 0.2t, 0.15t, 0.12t, 0.1t, or 0.09 t including all values and subranges therebetween; a $Li_2O$/$Na_2O$ molar ratio that is less than or equal to 2.0, 1.9, 1.8, 1.6, 1.4, 1.2 at the center of the glass-based article; the $Li_2O$/$Na_2O$ molar ratio is greater than or equal to 0.65 and less than or equal to 1.2; or greater than or equal to 0.70 and less than or equal to 1.1; or greater than or equal to 0.75 and less than or equal to 1.5; or greater than or equal to 0.75 and less than or equal to 1.25; or greater than or equal to 0.8 and less than or equal to 1.1, or greater than or equal to 0.85 and less than or equal to 1.05, or greater than or equal to 0.9 and less than or equal to 1; and a $Li_2O$ molar concentration that is less than or equal to 12 mol %, 11 mol %, 10 mol %, 9.5 mol %, 9 mol %, 8.5 mol %, or 8 mol %, at the center of the glass-based article.

In one or more embodiments, the glass-based article comprises a $Li_2O$/$Na_2O$ molar ratio that is less than or equal to 2.0, 1.9, 1.8, 1.6, 1.4, 1.2 at the center of the glass-based article. In some embodiments, the $Li_2O$/$Na_2O$ molar ratio is greater than or equal to 0.65 and less than or equal to 1.2; or greater than or equal to 0.70 and less than or equal to 1.1; or greater than or equal to 0.75 and less than or equal to 1.5; or greater than or equal to 0.75 and less than or equal to 1.25; or greater than or equal to 0.8 and less than or equal to 1.1, or greater than or equal to 0.85 and less than or equal to 1.05, or greater than or equal to 0.9 and less than or equal to 1.

In combination with $Li_2O$/$Na_2O$ molar ratio, the glass-based articles may possess one or a combination of the following features: a fracture toughness corresponding to the central composition of greater than or equal to 0.7 MPa*sqrt(m), 0.75 MPa*sqrt(m), or 0.77 MPa*sqrt(m); and/or a fracture toughness corresponding to the central composition of less than or equal to 1.3 MPa*sqrt(m), 1.2 MPa*sqrt(m), 1.1 MPa*sqrt(m), 0.95 MPa*sqrt(m), or 0.9 MPa*sqrt(m); and all values and subranges therebetween; a peak compressive stress (CS) that is greater than or equal to 500 MPa, 550 MPa, 600 MPa, 650 MPa, 700 MPa, 750 MPa, 800 MPa, 850 MPa, 900 MPa, 950 MPa, 1000 MPa, 1050 MPa, 1100 MPa, 1150 MPa, or 1200 MPa, including all values and subranges therebetween; a compressive stress at a knee ($CS_k$) that is greater than or equal to 80 MPa, 85 MPa, 90 MPa, 95 MPa, 100 MPa, 105 MPa, 110 MPa, 115 MPa, 120 MPa, 125 MPa, 130 MPa, 135 MPa, 140 MPa, 145 MPa, 150 MPa, 155 MPa, 160 MPa, including all values and subranges therebetween; a peak tension (PT) that is greater than or equal to 68 MPa, 69 MPa, 70 MPa, 71 MPa, 72 MPa, or 73 MPa, 74 MPa, 75 MPa, 77 MPa, 79 MPa, 80 MPa, 82 MPa, 84 MPa, 86 MPa, or 88 MPa, including all values and subranges therebetween; a depth of compression (DOC) that is greater than or equal to 0.13t, 0.14t, 0.15t, 0.16t, 0.17t, 0.18t, 0.19t, 0.20t, 0.21t, 0.22t, and/or less than or equal to 0.30t, 0.29t, 0.28t, 0.27t, 0.26t, 0.25t, 0.24t, 0.23t, including all values and subranges therebetween; a spike depth of layer ($DOL_{sp}$) that is greater than or equal to 0.007t, 0.008t, 0.009t, or 0.01t, including all values and subranges therebetween and/or at a depth from a surface of 7 microns or more, 7.8 microns or more, 8 microns or more, 8.5 microns or more, 9 microns or more, 9.5 microns or more, 10 microns or more, 10.5 microns or more, or 11 microns or more, including all values and subranges therebetween; comprises a stress profile comprising a negative curvature region wherein a second derivative of stress as a function of depth is negative, the negative curvature region is located in a compressive stress layer, and one or more of the following characteristics: a maximum absolute value of the second derivative in the negative curvature region being greater than or equal to 0.003 MPa/μm², 0.005 MPa/μm², 0.007 MPa/μm², or 0.009 MPa/μm²; and/or being located at depth that is greater than or equal to 0.01t, 0.012t, 0.015t, 0.02t, 0.04t, 0.05t, 0.06t, 0.07t, including all values and subranges therebetween; and/or being located at a depth of less than 0.2t, 0.17t, 0.14t, 0.11t, or 0.1t, including all values and subranges therebetween; and/or a product oft and the maximum absolute value of the negative second derivative is greater than or equal to 19 GPa, 32 GPa, 45 GPa, or 57 GPa; a stress profile including a low slope region having one or more of the following characteristics: an average absolute value of a slope of less than or equal to 0.2 MPa/μm; and/or the average compressive stress in the low slope region is greater than or equal to 80 MPa, 90 MPa, or 100 MPa, including all values and subranges therebetween, including in one or more embodiments, the low slope region is located in the compressive stress layer and extends for 10 μm or more and/or the low slope region starts at a depth that is greater than or equal to 0.01t, 0.012t, 0.015t, 0.02t, including all values and subranges therebetween; and/or being located at a depth of less than 0.2t, 0.15t, 0.12t, 0.1t, or 0.09 t including all values and subranges therebetween; t in the range of 0.5 mm to 0.8 mm, and all values and subranges therebetween; and/or t may be 0.8 mm or less, 0.75 mm or less, 0.73 mm or less, 0.70 mm or less, 0.65 mm or less, 0.6 mm or less, 0.55 mm or less, 0.4 mm or less, 0.3 mm or less, or 0.2 mm or less; and a $Li_2O$ molar concentration that is less than or equal to 12 mol %, 11 mol %, 10 mol %, 9.5 mol %, 9 mol %, 8.5 mol %, or 8 mol %, at the center of the glass-based article.

In one or more embodiments, the glass-based article comprises a $Li_2O$ molar concentration that is less than or equal to 12 mol %, 11 mol %, 10 mol %, 9.5 mol %, 9 mol %, 8.5 mol %, or 8 mol %, at the center of the glass-based article.

In combination with $Li_2O$ molar concentration, the glass-based articles may possess one or a combination of the following features: a fracture toughness corresponding to the central composition of greater than or equal to 0.7 MPa*sqrt(m), 0.75 MPa*sqrt(m), or 0.77 MPa*sqrt(m); and/or a fracture toughness corresponding to the central composition of less than or equal to 1.3 MPa*sqrt(m), 1.2 MPa*sqrt(m), 1.1 MPa*sqrt(m), 0.95 MPa*sqrt(m), or 0.9 MPa*sqrt(m); and all values and subranges therebetween; a peak compressive stress (CS) that is greater than or equal to 500 MPa, 550 MPa, 600 MPa, 650 MPa, 700 MPa, 750 MPa, 800 MPa, 850 MPa, 900 MPa, 950 MPa, 1000 MPa, 1050 MPa, 1100 MPa, 1150 MPa, or 1200 MPa, including all values and subranges therebetween; a compressive stress at a knee ($CS_k$) that is greater than or equal to 80 MPa, 85 MPa, 90 MPa, 95 MPa, 100 MPa, 105 MPa, 110 MPa, 115 MPa, 120 MPa, 125 MPa, 130 MPa, 135 MPa, 140 MPa, 145 MPa, 150 MPa, 155 MPa, 160 MPa, including all values and subranges therebetween; a peak tension (PT) that is greater than or equal to 68 MPa, 69 MPa, 70 MPa, 71 MPa, 72 MPa, or 73 MPa, 74 MPa, 75 MPa, 77 MPa, 79 MPa, 80 MPa, 82 MPa, 84 MPa, 86 MPa, or 88 MPa, including all values and subranges therebetween; a depth of compression (DOC) that is greater than or equal to 0.13t, 0.14t, 0.15t, 0.16t, 0.17t, 0.18t, 0.19t, 0.20t, 0.21t, 0.22t, and/or less than or equal to 0.30t, 0.29t, 0.28t, 0.27t, 0.26t, 0.25t, 0.24t, 0.23t, including all values and subranges therebetween; a spike depth of layer ($DOL_{sp}$) that is greater than or equal to 0.007t, 0.008t, 0.009t, or 0.01t, including all values and subranges therebetween and/or at a depth from a surface of 7 microns or more, 7.8 microns or more, 8 microns or more, 8.5 microns or more, 9 microns or more, 9.5 microns or more, 10 microns or more, 10.5 microns or more, or 11 microns or more, including all values and subranges therebetween; comprises a stress profile comprising a negative curvature region wherein a second derivative of stress as a function of depth is negative, the negative curvature region is located in a compressive stress layer, and one or more of the following characteristics: a maximum absolute value of the second derivative in the negative curvature region being greater than or equal to 0.003 MPa/μm$^2$, 0.005 MPa/μm$^2$, 0.007 MPa/μm$^2$, or 0.009 MPa/μm$^2$; and/or being located at depth that is greater than or equal to 0.01t, 0.012t, 0.015t, 0.02t, 0.04t, 0.05t, 0.06t, 0.07t, including all values and subranges therebetween; and/or being located at a depth of less than 0.2t, 0.17t, 0.14t, 0.11t, or 0.1t, including all values and subranges therebetween; and/or a product oft and the maximum absolute value of the negative second derivative is greater than or equal to 19 GPa, 32 GPa, 45 GPa, or 57 GPa; a stress profile including a low slope region having one or more of the following characteristics: an average absolute value of a slope of less than or equal to 0.2 MPa/μm; and/or the average compressive stress in the low slope region is greater than or equal to 80 MPa, 90 MPa, or 100 MPa, including all values and subranges therebetween, including in one or more embodiments, the low slope region is located in the compressive stress layer and extends for 10 μm or more and/or the low slope region starts at a depth that is greater than or equal to 0.01t, 0.012t, 0.015t, 0.02t, including all values and subranges therebetween; and/or being located at a depth of less than 0.2t, 0.15t, 0.12t, 0.1t, or 0.09 t including all values and subranges therebetween; t in the range of 0.5 mm to 0.8 mm, and all values and subranges therebetween; and/or t may be 0.8 mm or less, 0.75 mm or less, 0.73 mm or less, 0.70 mm or less, 0.65 mm or less, 0.6 mm or less, 0.55 mm or less, 0.4 mm or less, 0.3 mm or less, or 0.2 mm or less; a $Li_2O/Na_2O$ molar ratio that is less than or equal to 2.0, 1.9, 1.8, 1.6, 1.4, 1.2 at the center of the glass-based article; and the $Li_2O/Na_2O$ molar ratio is greater than or equal to 0.65 and less than or equal to 1.2; or greater than or equal to 0.70 and less than or equal to 1.1; or greater than or equal to 0.75 and less than or equal to 1.5; or greater than or equal to 0.75 and less than or equal to 1.25; or greater than or equal to 0.8 and less than or equal to 1.1, or greater than or equal to 0.85 and less than or equal to 1.05, or greater than or equal to 0.9 and less than or equal to 1.

In embodiments, a stress profile in the Li-containing glass article has a high surface CS, a high knee stress $CS_k$, and high depth of compression DOC. The DOC may be represented as a fraction of the thickness t of the glass article, such as greater than or equal to 0.15t, or greater than or equal to 0.18t. In some embodiments, these properties are produced using a glass composition with a high fracture toughness ($K_{IC}$), such as a $K_{IC}$ greater than or equal to 0.77 MPa m$^{1/2}$. Such stress profiles are particularly suited to smaller thicknesses, such as 0.7 mm and lower, where existing profiles had a $CS_k$ less than or equal to 110 MPa when combined with a CS over 800 MPa, a DOC above 0.18t, and a spike depth of layer $DOL_{sp}$ of 7.5 μm or more. Additionally, in some cases the composition of the glass at the center of the glass article exhibits a $Li_2O/Na_2O$ molar ratio less than or equal to 1.2. The composition at the center of the glass article approximates the composition of the glass before being ion exchanged, as substantially no or no ions exchange at the center of the glass article.

In embodiments, the stress profile includes a $CS_k$ greater than or equal to 125 MPa simultaneously with high values of DOC/t, CS, and $DOL_{sp}$. In embodiments, the stress profile may have a $CS_k$ greater than or equal to 140 MPa, such as greater than or equal to 150 MPa, greater than or equal to 160 MPa, or greater than or equal to 170 MPa. In some embodiments, higher $CS_k$ values may provide a robust product even with slightly lower values for the magnitude of CS, DOL, and DOC/t. In some embodiments, the peak tension (PT) in the stress profile may be greater than or equal to 70 MPa, such as greater than or equal to 75 MPa, or greater than or equal to 80 MPa, or 74 MPa, 75 MPa, 77 MPa, 79 MPa, 80 MPa, 82 MPa, 84 MPa, 86 MPa, or 88 MPa. In some embodiments, the PT in the stress profile is less than or equal to 90 MPa, such as less than or equal to 95 MPa, or less than or equal to 100 MPa. In some embodiments, the PT less than or equal to $$110 \frac{MPa}{\sqrt{t}},$$

such as less than or equal to $$100 \frac{MPa}{\sqrt{t}},$$

less than or equal to $$95 \frac{MPa}{\sqrt{t}},$$

less than or equal to $$90 \frac{MPa}{\sqrt{t}},$$

less than or equal to $$80 \frac{MPa}{\sqrt{t}},$$

or less than or equal to $$77 \frac{MPa}{\sqrt{t}},$$

where t is the thickness of the glass articles in mm.

Stress profiles having high $CS_k$ and other desirable attributes could potentially be obtained in Na-containing glasses by two-step ion exchange in baths with different ratios of Na and K. However, in such cases the ion exchange is long, on the order of days, and the fracture toughness of the glass composition is lower, such as below 0.73 or below 0.68. Thus, lithium containing glass is preferred for achieving the desired stress profiles.

In embodiments, the stress profile in a Li-containing glass has a surface CS greater than or equal to 970 MPa, a $CS_k$ greater than or equal to 50 MPa, and a DOC greater than or equal to 150 μm and/or a DOC/t greater than or equal to 0.18. In some embodiments, the CS is greater than or equal to 1000 MPa, such as greater than or equal to 1030 MPa. In some embodiments, the $CS_k$ is greater than or equal to 70 MPa, such as greater than or equal to 80 MPa, greater than or equal to 90 MPa, greater than or equal to 100 MPa, or greater than or equal to 110 MPa. In some embodiments, the DOC/t is greater than or equal to 0.19. In some embodiments, the stress profile has a $DOL_{sp}$ from greater than or equal to 7 μm to less than or equal to 9.5 μm. In some embodiments, the $DOL_{sp}$ from greater than or equal to 9.5 μm to less than or equal to 14 μm. In some embodiments, peak tension PT of the stress profile is greater than or equal to 50 MPa, such as greater than or equal to 60 MPa, greater than or equal to 70 MPa, or greater than or equal to 76 MPa, 74 MPa, 75 MPa, 77 MPa, 79 MPa, 80 MPa, 82 MPa, 84 MPa, 86 MPa, or 88 MPa. In some embodiments, the PT is less than or equal to 90 MPa, such as less than or equal to 95 MPa, or less than or equal to 100 MPa. In some embodiments, the PT is less than or equal to $$110\frac{MPa}{\sqrt{t}},$$

such as less than or equal to $$100\frac{MPa}{\sqrt{t}},$$

less than or equal to $$95\frac{MPa}{\sqrt{t}},$$

less than or equal to $$90\frac{MPa}{\sqrt{t}},$$

less than or equal to $$80\frac{MPa}{\sqrt{t}},$$

or less than or equal to $$77\frac{MPa}{\sqrt{t}},$$

where t is the thickness of the glass articles in mm.

In embodiments, a stress profile for a lithium-containing glass article has a peak CS greater than or equal to 400 MPa, a $DOL_{sp}$ from greater than or equal to 3.5 μm to less than or equal to 15 μm, a peak tension PT greater than or equal to 73 MPa, 74 MPa, 75 MPa, 77 MPa, 79 MPa, 80 MPa, 82 MPa, 84 MPa, 86 MPa, or 88 MPa, a DOC/t greater than or equal to 0.18, a $Li_2O/Na_2O$ molar concentration ratio at the center of the glass article less than or equal to 1.6, and where when a tension region of the stress profile is fitted with a power-law profile, the power p describing the profile is less than or equal to 2.0. In some embodiments, the power p describing the profile is less than or equal to 2.05, such as less than or equal to 1.95, or less than or equal to 1.9. In some embodiments, DOC/t is greater than or equal to 0.19. In some embodiments, the PT is less than or equal to $$110\frac{MPa}{\sqrt{t}},$$

such as less than or equal to $$100\frac{MPa}{\sqrt{t}},$$

less than or equal to $$95\frac{MPa}{\sqrt{t}},$$

less than or equal to $$90\frac{MPa}{\sqrt{t}},$$

less than or equal to $$80\frac{MPa}{\sqrt{t}},$$

or less than or equal to $$77\frac{MPa}{\sqrt{t}},$$

where t is the thickness of the glass articles in mm. In some embodiments, the $Li_2O/Na_2O$ molar concentration ratio at the center of the glass article is greater than or equal to 0.6, such as greater than or equal to 0.7, or greater than or equal to 0.8.

In embodiments, the molar concentration of $Li_2O$ at the center of the glass article is less than or equal to 9.5 mol %, such as less than or equal to 9 mol %, less than or equal to 8.5 mol %, or less than or equal to 8.2 mol %. In some embodiments, the molar concentration of $Na_2O$ at the center of the glass article is less than or equal to 10 mol %, such as less than or equal to 9.5 mol %, less than or equal to 9.0 mol %, or less than or equal to 8.5 mol %. As discussed above, the composition at the center of the glass article corresponds to the composition of the glass before ion exchange. These compositions allow a preferred ion diffusivity to be achieved, compatibility with a fusion forming process, and the ability to achieve a high DOC.

In embodiments, a stress profile for a lithium-containing glass article has a peak CS greater than or equal to 400 MPa, a $DOL_{sp}$ from greater than or equal to 3.5 µm to less than or equal to 15 µm, a $CS_k$ greater than or equal to 65 MPa, a DOC greater than or equal to 150 µm and/or DOC/t greater than or equal to 0.19, and a negative curvature region in the stress profile where the second derivative of the stress as a function of depth is negative, the negative curvature region is located in the compressive stress layer, a peak in the absolute value of the negative second derivative in the negative curvature region occurs at a depth from greater than or equal to 10 µm to less than or equal 0.18t, and the peak in the absolute value of the negative second derivative in the negative curvature region is greater than or equal to 3000 MPa/mm². In some embodiments, the peak in the absolute value of the negative second derivative in the negative curvature region occurs at a depth greater than or equal to 20 µm, such as greater than or equal to 30 µm, or greater than or equal to 40 µm. In some embodiments, the peak in the absolute value of the negative second derivative in the negative curvature region is less than or equal to 50000 MPa/mm². In some embodiments, the peak in the absolute value of the negative second derivative in the negative curvature region is greater than or equal to 4000 MPa/mm², such as greater than or equal to 5000 MPa/mm², greater than or equal to 6000 MPa/mm², or greater than or equal to 8000 MPa/mm². In some embodiments, the peak in the absolute value of the negative second derivative in the negative curvature region is greater than or equal to $4500/t^2$ MPa/mm², such as greater than or equal to $5500\ t^2$ MPa/mm², greater than or equal to $6600/t^2$ MPa/mm², greater than or equal to $8000/t^2$ MPa/mm², or greater than or equal to $12000/t^2$ MPa/mm². In some embodiments, the peak CS is greater than or equal to 700 MPa, such as greater than or equal to 750 MPa. In some embodiments, the $CS_k$ is greater than or equal to 65 MPa, such as greater than or equal to 75 MPa, or greater than or equal to 85 MPa. In some embodiments, the DOC is greater than or equal to 160 µm. In some embodiments, the DOC/t is greater than or equal to 0.20.

In embodiments, the $Li_2O$ molar concentration at the center of the glass article is greater than or equal to 6.5 mol %. In some embodiments, the molar ratio of $Li_2O$ to $Na_2O$ at the center of the glass article is greater than or equal to 0.6, such as greater than or equal to 0.7. In some embodiments, the molar ratio of $Li_2O$ to $Na_2O$ at the center of the glass article is less than or equal to 1.2, such as less than or equal to 1.1, or less than or equal to 1.0. In some embodiments, the peak tension PT is greater than or equal to 65 MPa, such as greater than or equal to 68 MPa, greater than or equal to 71 MPa, or greater than or equal to 74 MPa, 75 MPa, 77 MPa, 79 MPa, 80 MPa, 82 MPa, 84 MPa, 86 MPa, or 88 MPa. In some embodiments, the PT is less than or equal to 100 MPa, such as less than or equal to 95 MPa, less than or equal to 90 MPa, less than or equal to 85 MPa, less than or equal to 82 MPa, or less than or equal to 80 MPa.

In embodiments, a glass article has a planar portion having a thickness t, the portion of the glass article has a compressive stress layer on an outer surface extending to a depth of compression. The compressive stress layer extends to a depth of compression DOC of greater than or equal to 0.1t, such as greater than or equal to 0.12t, greater than or equal to 0.15t, greater than or equal to 0.17t, greater than or equal to 0.18t, or greater than or equal to 0.19t. The glass article has a relatively shallow region representing a near-surface "spike" of compressive stress with a maximum compressive stress $CS_{max}$ of greater than or equal to 950 MPa, such as greater than or equal to 980 MPa, greater than or equal to 1000 MPa, greater than or equal to 1040 MPa, or greater than or equal to 1070 MPa. The glass article has a "spike depth of layer" $DOL_{sp}$ from greater than or equal to 3 µm to less than or equal to 30 µm. The glass article has a knee stress $CS_k$ of the stress profile greater than or equal to 50 MPa, such as greater than or equal to 60 MPa, greater than or equal to 70 MPa, greater than or equal to 80 MPa, greater than or equal to 90 MPa, or greater than or equal to 100 MPa. The spike region is characterized as generally having substantially higher CS compared to the deeper portion of the compressive-stress layer.

Figure 2:
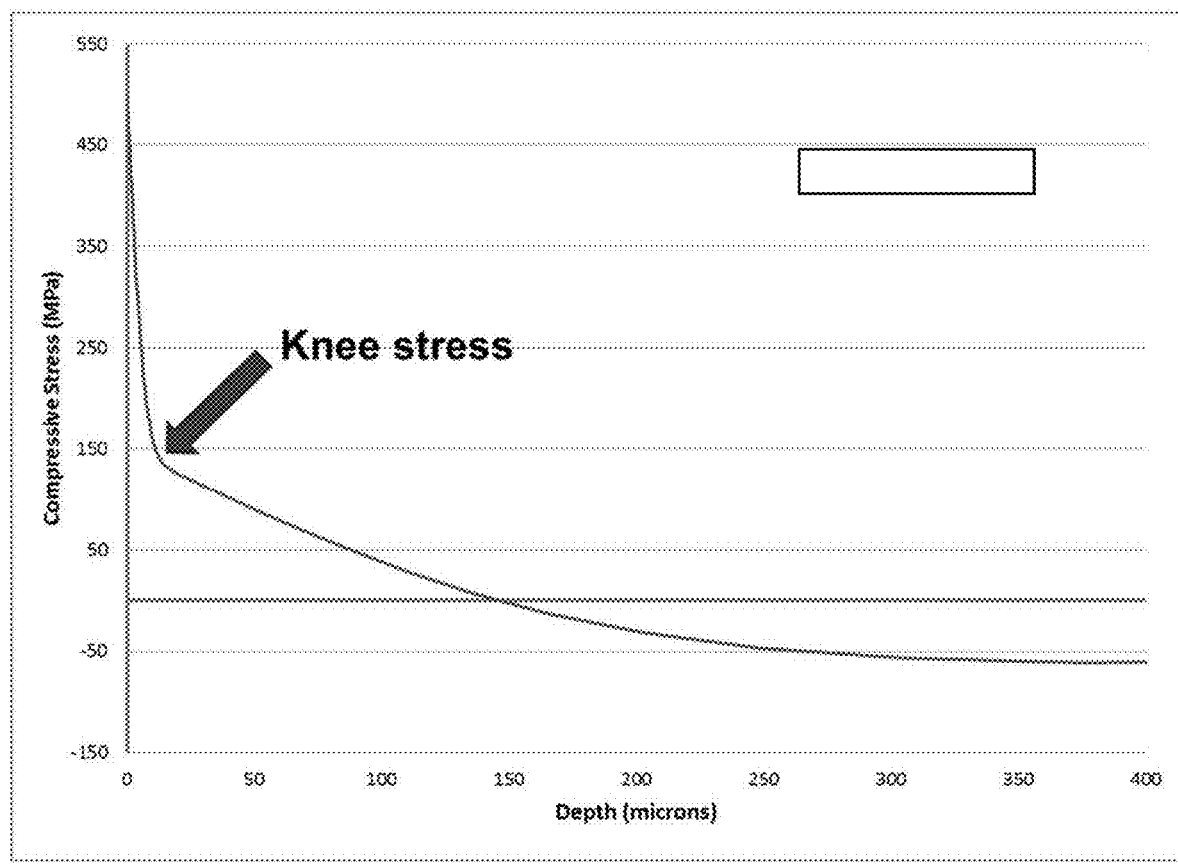
FIG. 2 is a schematic representation of a stress profile including a knee stress.

The knee stress $CS_k$ is defined as the value of compressive stress that the deeper portion of the CS profile extrapolates to at the depth $DOL_{sp}$. The depth of the spike $DOL_{sp}$ is reported as measured by a surface-stress meter by known methods utilizing the number of fringes in a prism-coupling angular-coupling spectrum that correspond to guided optical modes in said CS-spike region. When $DOL_{sp}$ is less than about 5.5 µm, the measurement wavelength may be less than 590 nm to enable measuring at least 2 such fringes in one polarization state. For example, the measurement wavelength may be 545 nm, or even 365 nm. If $DOL_{sp}$ is less than about 4 µm, $DOL_{sp}$ may be estimated accurately when the CS spike is the result of substantial enrichment of the near-surface layer in larger ions such as potassium (K) when compared to the smaller ions in the glass such as Na or Li. In that case $DOL_{sp}$ may be considered to be the depth where the concentration of such larger ions has dropped to a level where its further decay with depth can be considered negligible (e.g., dropped 90% of the way from the maximum K concentration to the baseline level occurring in the next 20 µm of depth). A schematic representation of a stress profile including a knee stress is provided in FIG. 2.

In some embodiments, the ratio DOC/t is less than or equal to 0.3, such as less than or equal to 0.28, less than or equal to 0.25, or less than or equal to 0.24.

In some embodiments, the glass article contains lithium, such that the concentration of $Li_2O$ at the center of the glass article is greater than 0.1 mol %. In some embodiments, the $Li_2O$ concentration at the center of the glass article is greater than or equal to 4 mol %, such as greater than or equal to 5 mol %, greater than or equal to 6 mol %, or greater than or equal to 7 mol %. In some embodiments, the $Li_2O$ concentration at the center of the glass article is less than or equal to 25 mol %, such as less than or equal to 20 mol %, less than or equal to 16 mol %, or less than or equal to 12 mol %. In some embodiments, a glass composition having the same composition as the center of the glass article has a fracture toughness ($K_{IC}$) that is greater than or equal to 0.77 MPa$\sqrt{m}$.

In some embodiments, a first ion exchange step may produce a stress profile characterized by a peak CS greater than or equal to 500 MPa, a $CS_k$ greater than or equal to 140 MPa, a $DOL_{sp}$ greater than or equal to 4 µm, a DOC/t ratio greater than or equal to 0.18, and a peak tension PT greater than or equal to 73 MPa, 74 MPa, 75 MPa, 77 MPa, 79 MPa, 80 MPa, 82 MPa, 84 MPa, 86 MPa, or 88 MPa. In some embodiments, the PT is less than or equal to $$77 \frac{MPa}{\sqrt{t}},$$

such as less than or equal to $$80 \frac{MPa}{\sqrt{t}},$$

less than or equal to $$90 \frac{MPa}{\sqrt{t}},$$

less than or equal to $$95 \frac{MPa}{\sqrt{t}},$$

less than or equal to $$100 \frac{MPa}{\sqrt{t}},$$

or less than or equal to $$110 \frac{MPa}{\sqrt{t}},$$

where the thickness t is measured in mm. In some embodiments, the $DOL_{sp}$ is greater than or equal to 4 μm, such as greater than or equal to 5 μm, greater than or equal to 6 μm, or greater than or equal to 7 μm. In some embodiments, the DOC/t ratio is greater than or equal to 0.18, such as greater than or equal to 0.185, greater than or equal to 0.19, or greater than or equal to 0.195. In some embodiments, the PT is greater than or equal to 73 MPa, 74 MPa, 75 MPa, 77 MPa, 79 MPa, 80 MPa, 82 MPa, 84 MPa, 86 MPa, or 88 MPa, such as greater than or equal to 78 MPa, greater than or equal to 83 MPa, or greater than or equal to 88 MPa.

In some embodiments, a second ion exchange step may produce a stress profile having a CS greater than or equal to 700 MPa, a $DOL_{sp}$ greater than or equal to 3.5 μm, a $CS_k$ greater than or equal to 110 MPa, a DOC/t greater than or equal to 0.18, and a PT greater than or equal to 73 MPa, 74 MPa, 75 MPa, 77 MPa, 79 MPa, 80 MPa, 82 MPa, 84 MPa, 86 MPa, or 88 MPa. In some embodiments, the CS is greater than or equal to 800 MPa. In some embodiments, the $DOL_{sp}$ is greater than or equal to 5 μm, such as greater than or equal to 6 μm, greater than or equal to 7 μm, or greater than or equal to 7.5 μm. In some embodiments, the $CS_k$ is greater than or equal to 115 MPa, such as greater than or equal to 120 MPa. In some embodiments, the DOC/t is greater than or equal to 0.185, such as greater than or equal to 0.19. In some embodiments, the PT is greater than or equal to 78 MPa, such as greater than or equal to 83 MPa. In some embodiments, the PT may be less than or equal to $$110 \frac{MPa}{\sqrt{t}},$$

such as less than or equal to $$100 \frac{MPa}{\sqrt{t}},$$

less than or equal to $$95 \frac{MPa}{\sqrt{t}},$$

less than or equal to $$90 \frac{MPa}{\sqrt{t}},$$

less than or equal to $$80 \frac{MPa}{\sqrt{t}},$$

or less than or equal to $$77 \frac{MPa}{\sqrt{t}},$$

In some embodiments, these examples may also be non-frangible.

In some embodiments, glass-based articles comprise: a glass-based substrate comprising opposing first and second surfaces defining a substrate thickness (t), wherein t is greater than or equal to 0.4 mm and less than or equal to 1.3 mm; a stress slope at DOC that is 1.5 MPa/micron or less; and a stress profile comprising: a depth of compression (DOC) that is greater than or equal to 0.15t; and an absolute value of stress integral in one compression zone that is in the range of from 4 MPa*mm to 20 MPa*mm.

The t being greater than or equal to 0.4 mm and less than or equal to 1.3 mm, the DOC that is greater than or equal to 0.15t; and the absolute value of stress integral in one compression zone that is in the range of from 4 MPa*mm to 20 MPa*mm may be combined with one or more of the following features:

DOC is greater than or equal to 0.16t, 0.17t, 0.18t, 0.19t, 0.195t, and/or less than or equal to 0.23t, or 0.22t, including all values and subranges therebetween;

DOC is greater than or equal to 95 microns, 110 microns, 120 microns, 130 microns, 150 microns, 160 microns, 165 microns, and/or less than or equal to 300 microns, 250 microns, or 200 microns, including all values and subranges therebetween;

a peak compressive stress (CS) that is greater than or equal to 400 MPa, 500 MPa, 600 MPa, 970 MPa, 1030 MPa and/or is less than or equal to 1200 MPa, including all values and subranges therebetween;

the stress slope at DOC is 1.4 MPa/micron or less, 1.3 MPa/micron or less, 1.25 MPa/micron or less, 1.14 MPa/micron or less, and/or is 0.4 MPa/micron or more, 0.5 MPa/micron or more, 0.6 MPa/micron or more, 0.65 MPa/ micron or more, 0.7 MPa/micron or more, 0.75 MPa/micron or more, or 0.8 MPa/micron or more, including all values and subranges therebetween;

a peak tension (PT) that is 55 MPa or more, 65 MPa or more, 72 MPa or more, 75 MPa or more, 78 MPa or more, or 80 MPa or more, 83 MPa or more, 74 MPa or more, 77 MPa or more, 79 MPa or more, 81 MPa, 82 MPa, 84 MPa, 86 MPa, or 88 MPa, including all values and subranges therebetween;

the PT (in MPa) is 110/sqrt(t) or less, where t is the thickness in mm, 102/sqrt(t) or less, 97/sqrt(t) or less, 92/sqrt(t) or less, including all values and subranges therebetween;

the absolute value of stress integral in one compression zone is 6 MPa*mm or more, 7 MPa*mm or more, 8 MPa*mm or more, and/or is 16 MPa*mm or less, 15 MPa*mm or less, 14 MPa*mm or less, including all values and subranges therebetween;

absolute value of stress integral in one compression zone divided by the thickness is 13 MPa or more, 14 MPa or more, or 15 MPa or more and/or is 20 MPa or less, 19 MPa or less, 18 MPa or less, 17 MPa or less, including all values and subranges therebetween;

absolute value of stress integral over a tension zone is 30 MPa*mm or less, 28 MPa*mm or less, 26 MPa*mm or less, and or is 13 MPa*mm or more, 15 MPa*mm or more, 17 MPa*mm or more, including all values and subranges therebetween;

a compressive stress region comprising two sub-regions wherein the average stress slope in the shallower sub-region is greater than the average stress slope in the deeper sub-region by at least a factor of 4, wherein the shallower sub-region has a depth $DOL_{sp}$ that is greater than 2 microns, wherein the deeper region extends from a depth greater than $DOL_{sp}$ to a depth at least 3 times greater than $DOL_{sp}$;

$DOL_{sp}$ is 3 microns or greater, 3.5 microns or greater, 4 microns or greater, including all values and subranges therebetween;

$DOL_{sp}$ is 0.003 t or more, 0.004 t or more, 0.005 t or more, 0.006 t or more, and/or 20 microns or less, 16 microns or less, 13 microns or less, 12 microns or less, 11 microns or less, and/or 0.026 t or less, 0.02 t or less, including all values and subranges therebetween;

a knee stress $CS_k$ at a depth in the range of from about $1.2DOL_{sp}$ and $1.5DOL_{sp}$ wherein $CS_k$ is 70 MPa or more, 80 MPa or more, 90 MPa or more, 100 MPa or more, 120 MPa or more, 130 MPa or more, 140 MPa or more, including all values and subranges therebetween;

a portion in the compressive-stress region having a negative second derivative for the absolute value of CS as a function of depth wherein the maximum absolute value of the second derivative is 0.003 MPa/micron$^2$ or more, 0.005 MPa/micron$^2$ or more, 0.007 MPa/micron$^2$ or more, 0.009 MPa/micron$^2$ or more;

a peak of absolute value of negative second derivative of CS occurring at a depth of 0.01 t or more, 0.015 t or more, 0.020 t or more, 0.040 t or more, 0.050 t or more, and/or at a depth of 0.2 t or less, or 0.17 t or less, including all values and subranges therebetween;

the product of the sheet thickness and the maximum of the negative second derivative of CS is 19 GPa or more, 32 GPa or more, 45 GPa or more, 57 GPa or more, including all values and subranges therebetween;

a central composition having a fracture toughness of 0.6 MPa*sqrt(m) or more, 0.7 MPa*sqrt(m) or more, 0.76 MPa*sqrt(m) or more, and/or 0.9 MPa*sqrt(m) or less, 0.83 MPa*sqrt(m) or less, including all values and subranges therebetween;

the central composition comprising 5 mol % Na$_2$O or more, or 7 mol % Na$_2$O or more, and/or 18 mol % Na$_2$O or less, including all values and subranges therebetween; and the central composition comprising 0.5 mol % K$_2$O or more, or 0.3 mol % K$_2$O or more, and/or 4 mol % K$_2$O or less, including all values and subranges therebetween.

The glass articles with the stress profiles described herein offer the advantage of overall improvement in fracture resistance when considering several failure modes simultaneously—overstress from drops on smooth hard surfaces (such as those suppressed by using a surface compression spike with a high CS and a DOL 7 μm or more), deep damage (such as depths of greater than or equal to about 90 μm) introduction with failure from tension (such as those suppressed by having an increased DOC), and damage introduction to intermediate depths (such as depths of greater than or equal to about 30 μm to less than or equal to about 90 μm) combined with simultaneous or subsequent bending (such as those suppressed by having a high compressive stress at intermediate and larger depths, obtained in some cases by profiles with a high DOC and negative second derivative of the compressive stress as a function of depth, or by profiles with increased $CS_k$ and high DOC at the same time). The stress profiles described herein also allow fast chemical strengthening (ion exchange) due at least in part to the lithium content in the glass before being ion exchanged, and the sodium for lithium ion exchange allows for the fast increase of DOC. In addition, a further increase in the speed of sodium ion diffusion is achieved when the Li$_2$O:Na$_2$O molar ratio of the glass composition is from greater than or equal to 0.3 to less than or equal to 1.5, such as from greater than or equal to 0.65 to less than or equal to 1.2; or greater than 0.70 and less than 1.1; or greater than 0.75 and less than 1.5; or greater than 0.75 and less than 1.25; or greater than 0.8 and less than 1.1, or greater than 0.85 and less than 1.05, or greater than 0.9 and less than 1.

The stress profiles disclosed herein may also be achieved with a lower cost of chemical strengthening (ion exchange). For example, a stress profile having relatively high surface CS, $DOL_{sp}$, $CS_k$, and DOC at the same time, in a Li-containing glass having high fracture toughness, obtained through a single ion exchange step, has an advantageously lower cost than a similar stress profile obtained through a 2-step ion exchange process.

In one or more embodiments, the stress profile of the glass-based article may include a spike region that includes an increased level of compressive stress. Such stress profiles are characterized by an increased $DOL_{sp}$ and increased surface CS, and may exhibit a reduced $CS_k$. These stress profiles exhibit improved resistance to flaw formation due to the increased amount of compressive stress in the spike region, as illustrated by increased multi-orientation drop performance onto rough surfaces. Without wishing to be bound by any particular theory, the increased area of the spike region is believed to prevent the formation of flaws in the glass-based articles, and may be a particularly pronounced effect for three-dimensionally shape articles and articles with reduced thickness. The beneficial effect associated with the increased spike region area appears to be so significant that that amount of compressive stress present at deeper depths in the glass-based article may be reduced and maintain the desired performance.

These "large spike area" profiles may be characterized by a $DOL_{sp}$ of at least 0.02 t where t is the thickness of the glass-based article and/or at least 10 µm, in conjunction with a $CS_k$ of at least 80 MPa, a peak compressive stress of at least 970 MPa, and a ratio of the depth of compression to the thickness of the article of at least 0.17. These characteristics of the stress profile may be further combined with any other stress profile attributes described herein. In one or more embodiments, the articles may have a $DOL_{sp}$ of at most 0.04t, a $DOL_{sp}$ of at most 0.036t, a $DOL_{sp}$ of at most 0.032t, a $DOL_{sp}$ of at most 0.03t, or a $DOL_{sp}$ of at most 0.028t. In one or more embodiments, the articles may have a $DOL_{sp}$ of at most 20 µm, a $DOL_{sp}$ of at most 19 µm, a $DOL_{sp}$ of at most 18 µm, a $DOL_{sp}$ of at most 17 µm, a $DOL_{sp}$ of at most 16 µm, a $DOL_{sp}$ of at most 15 µm, or a $DOL_{sp}$ of at most 14 µm. In one or more embodiments, the articles may have a $CS_k$ of greater than or equal to 50 MPa, greater than or equal to 55 MPa, greater than or equal to 60 MPa, greater than or equal to 65 MPa, greater than or equal to 70 MPa, greater than or equal to 75 MPa, greater than or equal to 80 MPa, greater than or equal to 85 MPa, greater than or equal to 90 MPa, greater than or equal to 95 MPa, greater than or equal to 100 MPa, or more. In one or more embodiments, the articles may have a $CS_k$ of less than or equal to 150 MPa, less than or equal to 140 MPa, less than or equal to 130 MPa, less than or equal to 120 MPa, less than or equal to 115 MPa, or less. The $CS_k$ of the articles may be in a range formed from any combination of these minimum and maximum values.

In one or more embodiments, the stress profiles of the glass-based articles may be characterized by the trapezoidal area of the spike region. The trapezoidal area of the spike region ($TA_{sp}$) may be calculated according to the following formula:

$$TA_{sp} = 0.5*(CS+CS_k)*DOL_{sp}$$

wherein CS is the peak compressive stress, $CS_k$ is the compressive stress at the knee, and $DOL_{sp}$ is the depth of the spike. In one or more embodiments, the stress profiles described herein may be characterized by a $TA_{sp}$ value of greater than or equal to 4000 MPa*µm, greater than or equal to 4400 MPa*µm, greater than or equal to 4700 MPa*µm, greater than or equal to 5000 MPa*µm, greater than or equal to 5300 MPa*µm, greater than or equal to 5500 MPa*µm, greater than or equal to 5700 MPa*µm, greater than or equal to 5800 MPa*µm, or any sub-ranges formed from these values.

Figure 3:
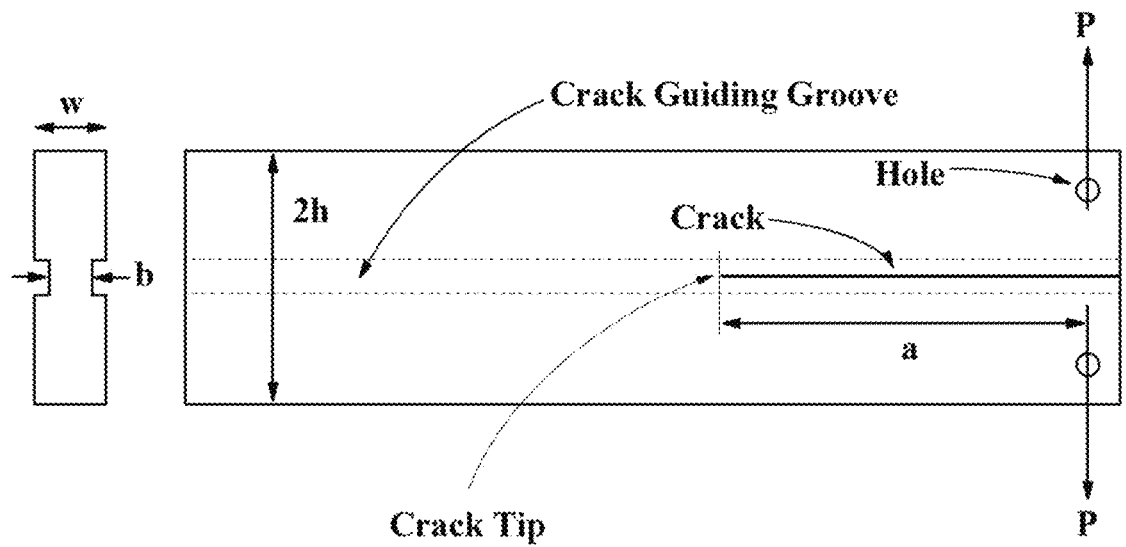
FIG. 3 is a schematic representation of a sample utilized to determine the fracture toughness $K_{IC}$ and a cross-section thereof.

As utilized herein, the $K_{IC}$ fracture toughness is measured by the double cantilever beam (DCB) method. The $K_{IC}$ values were measured on glass-based substrates before being ion exchanged to form the glass-based articles. The DCB specimen geometry is shown in FIG. 3 with parameters being the crack length a, applied load P, cross-sectional dimensions w and 2 h, and the thickness of the crack-guiding groove b. The samples were cut into rectangles of width 2 h=1.25 cm and a thickness ranging from, w=0.3 mm to 1 mm, with the overall length of the sample, which is not a critical dimension, varying from 5 cm to 10 cm. A hole was drilled on both ends with a diamond drill to provide a means of attaching the sample to a sample holder and to the load. A crack "guiding groove" was cut down the length of the sample on both flat faces using a wafer dicing saw with a diamond blade, leaving a "web" of material, approximately half the total plate thickness (dimension b in FIG. 1), with a height of 180 µm corresponding to the blade thickness. The high precision dimensional tolerances of the dicing saw allow for minimal sample-to-sample variation. The dicing saw was also used to cut an initial crack where a=15 mm. As a consequence of this final operation a very thin wedge of material was created near the crack tip (due to the blade curvature) allowing for easier crack initiation in the sample. The samples were mounted in a metal sample holder with a steel wire in the bottom hole of the sample. The samples were also supported on the opposite end to keep the samples level under low loading conditions. A spring in series with a load cell (FUTEK, LSB200) was hooked to the upper hole which was then extended, to gradually apply load, using rope and a high precision slide. The crack was monitored using a microscope having a 5 µm resolution attached to a digital camera and a computer. The applied stress intensity, $K_P$, was calculated using the following equation (III):

$$K_P = \left[\frac{P \cdot a}{(w \cdot b)^{0.5} h^{1.5}}\right]\left[3.47 + 2.32\frac{h}{a}\right]$$

For each sample, a crack was first initiated at the tip of the web, and then the starter crack was carefully sub-critically grown until the ratio of dimensions a/h was greater than 1.5, as per equation (III) to accurately calculate stress intensity. At this point the crack length, a, was measured and recorded using a traveling microscope with 5 µm resolution. A drop of toluene was then placed into the crack groove and wicked along the length of groove by capillary forces, pinning the crack from moving until the fracture toughness is reached. The load was then increased until sample fracture occurred, and the critical stress intensity $K_{IC}$ calculated from the failure load and sample dimensions, with $K_P$ being equivalent to $K_{IC}$ due to the measurement method.

Glass-Based Substrates

Examples of glasses that may be used as substrates may include alkali-alumino silicate glass compositions or alkali-containing aluminoborosilicate glass compositions, though other glass compositions are contemplated. Specific examples of glass-based substrates that may be used include but are not limited to an alkali-alumino silicate glass, an alkali-containing borosilicate glass, an alkali-alumino borosilicate glass, an alkali-containing lithium alumino silicate glass, or an alkali-containing phosphate glass. The glass-based substrates have base compositions that may be characterized as ion exchangeable. As used herein, "ion exchangeable" means that a substrate comprising the composition is capable of exchanging cations located at or near the surface of the substrate with cations of the same valence that are either larger or smaller in size.

In one or more embodiments, glass-based substrates may include a lithium-containing aluminosilicate.

In embodiments, the glass-based substrates may be formed from any composition capable of forming the stress profiles. In some embodiments, the glass-based substrates may be formed from the glass compositions described in U.S. Provisional Application No. 62/591,953 titled "Glasses with Low Excess Modifier Content," filed Nov. 29, 2017, the entirety of which is incorporated herein by reference. In some embodiments, the glass articles may be formed from the glass compositions described in U.S. Provisional Application No. 62/591,958 titled "Ion-Exchangeable Mixed Alkali Aluminosilicate Glasses," filed Nov. 29, 2017, the entirety of which is incorporated herein by reference.

The glass-based substrates may be characterized by the manner in which it may be formed. For instance, the glass-based substrates may be characterized as float-formable (i.e., formed by a float process), down-drawable and, in particular, fusion-formable or slot-drawable (i.e., formed by a down draw process such as a fusion draw process or a slot draw process).

Some embodiments of the glass-based substrates described herein may be formed by a down-draw process. Down-draw processes produce glass-based substrates having a uniform thickness that possess relatively pristine surfaces. Because the average flexural strength of the glass article is controlled by the amount and size of surface flaws, a pristine surface that has had minimal contact has a higher initial strength. In addition, down drawn glass articles have a very flat, smooth surface that can be used in its final application without costly grinding and polishing.

Some embodiments of the glass-based substrates may be described as fusion-formable (i.e., formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

Some embodiments of the glass-based substrates described herein may be formed by a slot draw process. The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous glass article and into an annealing region.

In one or more embodiments, the glass-based substrates described herein may exhibit an amorphous microstructure and may be substantially free of crystals or crystallites. In other words, the glass-base substrates articles exclude glass-ceramic materials in some embodiments.

Ion Exchange (IOX) Treatment

Chemical strengthening of glass substrates having base compositions is done by placing the ion-exchangeable glass substrates in a molten bath containing cations (e.g., K+, Na+, Ag+, etc) that diffuse into the glass while the smaller alkali ions (e.g., Na+, Li+) of the glass diffuse out into the molten bath. The replacement of the smaller cations by larger ones creates compressive stresses near the top surface of glass. Tensile stresses are generated in the interior of the glass to balance the near-surface compressive stresses.

With respect to ion exchange processes, they may independently be a thermal-diffusion process or an electro-diffusion process. Non-limiting examples of ion exchange processes in which glass is immersed in multiple ion exchange baths, with washing and/or annealing steps between immersions, are described in U.S. Pat. No. 8,561,429, by Douglas C. Allan et al., issued on Oct. 22, 2013, entitled "Glass with Compressive Surface for Consumer Applications," and claiming priority from U.S. Provisional Patent Application No. 61/079,995, filed Jul. 11, 2008, in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass is strengthened by ion exchange in a first bath is diluted with an effluent ion, followed by immersion in a second bath having a smaller concentration of the effluent ion than the first bath. The contents of U.S. Pat. Nos. 8,561,429 and 8,312,739 are incorporated herein by reference in their entireties.

After an ion exchange process is performed, it should be understood that a composition at the surface of a glass article may be different than the composition of the as-formed glass article (i.e., the glass article before it undergoes an ion exchange process). This results from one type of alkali metal ion in the as-formed glass, such as, for example $Li^+$ or $Na^+$, being replaced with larger alkali metal ions, such as, for example $Na^+$ or $K^+$, respectively. However, the glass composition at or near the center of the depth of the glass article will, in embodiments, still have the composition of the as-formed glass article.

End Products

Figure 4A:
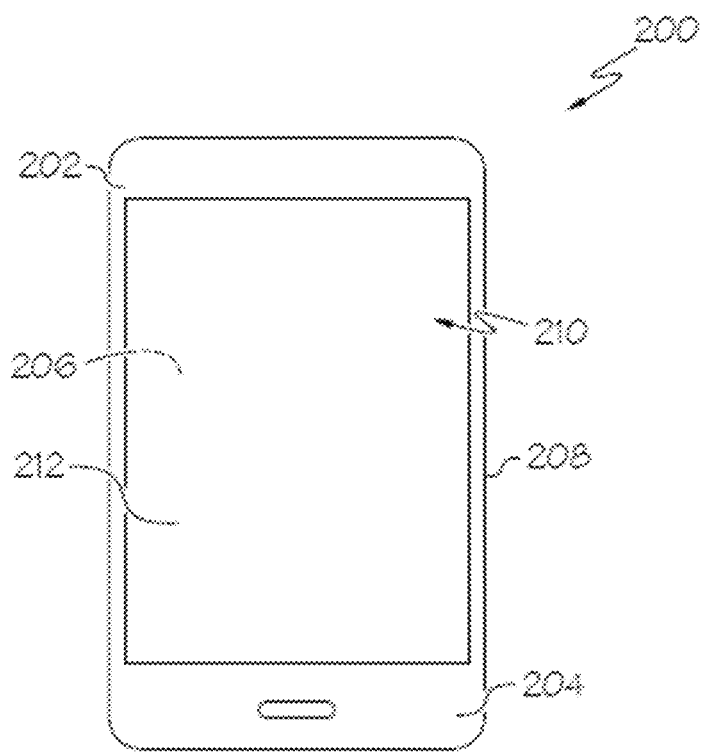
FIG. 4A is a plan view of an exemplary electronic device incorporating any of the glass articles disclosed herein.
Figure 4B:
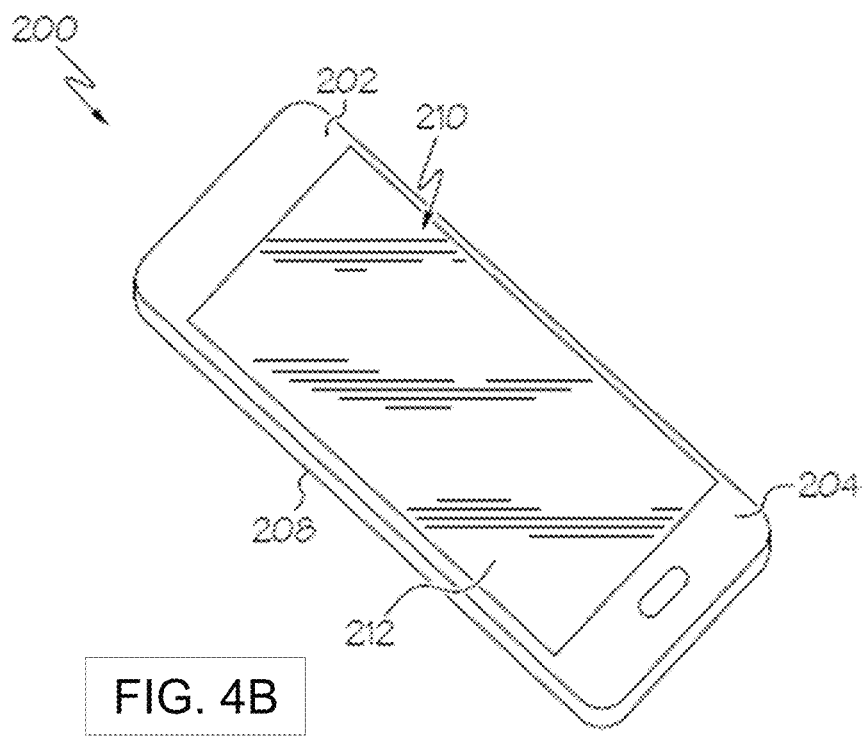
FIG. 4B is a perspective view of the exemplary electronic device of FIG. 4A.

The glass-based articles disclosed herein may be incorporated into another article such as an article with a display (or display articles) (e.g., consumer electronics, including mobile phones, tablets, computers, navigation systems, and the like), architectural articles, transportation articles (e.g., automobiles, trains, aircraft, sea craft, etc.), appliance articles, or any article that requires some transparency, scratch-resistance, abrasion resistance or a combination thereof. An exemplary article incorporating any of the glass articles disclosed herein is shown in FIGS. 4A and 4B. Specifically, FIGS. 4A and 4B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, the cover substrate 212 may include any of the glass articles disclosed herein.

EXAMPLES

Embodiments will be further clarified by the following examples. It should be understood that these examples are not limiting to the embodiments described above.

Glass sheets were formed having a lithium-alumino silicate glass composition according to Composition A or Composition B. Composition A as formed and analyzed included: 63.70 mol % $SiO_2$, 0.39 mol % $B_2O_3$, 16.18 mol % $Al_2O_3$, 8.10 mol % $Na_2O$, 0.53 mol % $K_2O$, 8.04 mol % $Li_2O$, 0.33 mol % MgO, 0.01 mol % $TiO_2$, 0.02 mol % $Fe_2O_3$, 0.05 mol % $SnO_2$, and 2.64 mol % $P_2O_5$. Composition B as formed and analyzed included: 63.60 mol % $SiO_2$, 15.67 mol % $Al_2O_3$, 10.81 mol % $Na_2O$, 6.24 mol % $Li_2O$, 1.16 mol % ZnO, 0.04 mol % $SnO_2$, and 2.48 mol % $P_2O_5$.

Examples 1-29

Glass Articles Based on Composition A

Glass articles were formed from Composition A and ion exchanged according to the conditions described in Table 1 below.

TABLE 1

| Example | t, mm | 3D Y/N | Step1 NaNO$_3$/KNO$_3$/LiNO$_3$ by weight | Step 1 °C. | Step 1 time, hours | Step 2 NaNO$_3$/KNO$_3$/LiNO$_3$ by weight | Step 2 °C. | Step 2 time, hours |
|---|---|---|---|---|---|---|---|---|
| 1 | 0.5 | 3D Y | 38/62/0 | 390 | 2 | — | — | — |
| 2 | 0.5 | 3D Y | 38/62/0 | 390 | 2 | 1/99/0 | 370 | 0.33 |
| 3 | 0.5 | 3D Y | 38/62/0 | 390 | 2 | 5/95/0 | 380 | 0.33 |
| 4 | 0.5 | 3D Y | 38/62/0 | 390 | 2 | 6/94/0 | 380 | 0.33 |
| 5 | 0.5 | 2D, N | 38/62/0 | 390 | 1.16 | — | — | — |
| 6 | 0.5 | N | 38/62/0 | 390 | 1.16 | 6/94/0 | 380 | 0.5 |
| 7 | 0.5 | N | 38/62/0 | 390 | 1.16 | 6/94/0 | 380 | 0.5 |
| 8 | 0.5 | N | 50/50/0 | 380 | 1.93 | — | — | — |
| 9 | 0.5 | N | 50/50/0 | 380 | 1.93 | 6/94/0 | 370 | 0.55 |
| 10 | 0.6 | N | 50/50/0 | 390 | 2 | — | — | — |
| 11 | 0.6 | N | 50/50/0 | 390 | 2 | 6/94/0 | 380 | 0.4 |
| 12 | 0.6 | 3D Y | 50/50/0 | 390 | 2.23 | 6/94/0 | 380 | 0.5 |
| 13 | 0.7 | N | 50/50/0 | 390 | 1.5 | — | — | — |
| 14 | 0.7 | N | 50/50/0 | 380 | 2.13 | — | — | — |
| 15 | 0.7 | N | 50/50/0 | 390 | 1.5 | 6/94/0 | 380 | 0.5 |
| 16 | 0.7 | N | 50/50/0 | 380 | 2.13 | 6/94/0 | 380 | 0.5 |
| 17 | 0.8 | N | 75/25/0.9 | 390 | 4 | — | — | — |
| 18 | 0.8 | N | 75/25/0.9 | 390 | 4 | 2/98/0 | 380 | 0.5 |
| 19 | 0.8 | N | 75/25/0.9 | 390 | 4 | 2/98/0.5 | 380 | 0.5 |
| 20 | 0.8 | N | 75/25/0.2 | 390 | 3.75 | — | — | — |
| 21 | 0.8 | N | 75/25/0.2 | 390 | 3.75 | 4/96/0.3 | 380 | 0.42 |
| 22 | 0.8 | N | 75/25/0 | 390 | 3.5 | 4/96/0.3 | 380 | 0.5 |
| 23 | 0.8 | N | 75/25/0.3 | 390 | 3.75 | 0.5/99.5/0 | 380 | 0.33 |
| 24 | 0.8 | N | 38/62/0 | 380 | 4.1 | — | — | — |
| 25 | 0.8 | N | 38/62/0 | 380 | 4.1 | 0.5/99.5/0 | 380 | 0.33 |
| 26 | 0.8 | N | 12/88/0 | 380 | 1.55 | — | — | — |
| 27 | 0.8 | N | 12/88/0 | 380 | 2.55 | — | — | — |
| 28 | 0.8 | N | 15/85/0 | 380 | 2.9 | — | — | — |
| 29 | 0.8 | N | 75/25/0.3 | 390 | 3.75 | 0.5/99.5/0 | 380 | 0.33 |

The glass articles formed according to Table 1 were analyzed for peak compressive stress (CS$_{max}$), depth of layer of spike (DOL$_{sp}$), compressive stress at the knee (CS$_k$), depth of compression (DOC), and peak tension (PT). The results are in Table 2. In the examples, CS$_{max}$ and DOL$_{sp}$ were measured by a surface stress meter (FSM). CS$_k$ was measured by a method according to U.S. Ser. No. 16/015,776, filed Jun. 22, 2018 to the assignee, which is incorporated herein by reference. Stress profile and DOC were measured by a Refracted near-field (RNF) method. PT and stress retention were measured by a scattered light polariscope (SCALP) technique. In Table 2, possible variation in CS values can be ±25 MPa and DOL variation can be about ±0.2 μm, due to precision limitations of the metrology.

TABLE 2

| Example | CS$_{max}$ MPa | DOL$_{sp}$ microns | CS$_k$ MPa | DOC μm | PT MPa |
|---|---|---|---|---|---|
| 1 | 581 | 8.95 | 170-180 | 97 | 91.1 |
| 2 | 1100 | 8.25 | 108 | 99 | 85.9 |
| 3 | 890 | 8.9 | 142 | 98 | 88.8 |
| 4 | 877 | 8.9 | 159 | 98 | 88.3 |
| 5 | 613 | 7.8 | 176 | 98 | 84.4 |
| 6 | 853 | 8.3 | 108 | 99 | 79.8 |
| 7 | 857 | 8.1 | 122.7 | 98.5 | 80.5 |
| 8 | 552 | 8.64 | 167 | 98 | 91.8 |
| 9 | 851 | 8.36 | 116 | 99.7 | 84.6 |
| 10 | 565 | 9.06 | 185-190 | 115.2 | 90 |
| 11 | 903 | 8.36 | 135 | 119 | 88.6 |
| 12 | 911 | 8.2 | | | |
| 13 | 585 | 8.6 | 202 | 128 | 82 |
| 14 | 580 | 8.95 | | | 85 |
| 15 | 904 | 8.4 | 149 | 136.6 | 82 |
| 16 | 911 | 8.5 | 145 | | 85 |
| 17 | 373 | 11.6 | 164 | | 83-85 |
| 18 | 1035 | 7.9 | 166 | 154 | 85.3 |
| 19 | 848 | 8.3 | 95 | 170 | 78.6 |
| 20 | 440 | 11.6 | 221 | | 89.3 |
| 21 | 839 | 8.7 | 130 | 163 | 83.4 |
| 22 | 853 | 8.5 | 129 | 165 | 84.9 |
| 23 | 1152 | 7.7 | 140-150 | | 85.1 |
| 24 | 615 | 11.9 | 194 | | |
| 25 | 1146 | 10.7 | 133 | 158 | 84.3 |
| 26 | 796 | 8.6 | 140-150 | | 56.3 |
| 27 | 792 | 11.1 | 140 | 149 | 66 |
| 28 | 760 | 11.6 | 151 | 153 | 72.8 |
| 29 | 1137 | 7.7 | 169 | 159 | 91 |

The stress profiles and DOCs of Table 2 were used to calculate the following, which hare summarized in Table 3: absolute value of the slope at DOC (MPa/μm), absolute value of the stress integral of the outer compression region (MPa*mm), absolute value of the stress integral of the tension zone (MPa*mm), percentage of the depth of compression with respect to thickness (DOC/t), and compressive stress integral with respect to thickness (CS integral/t) (MPa).

TABLE 3

| Example | abs. value slope at DOC MPa/μm | abs. value stress integral outer compression region MPa*mm | abs. value stress integral tension zone MPa*mm | DOC/t | CS integral/t MPa |
|---|---|---|---|---|---|
| 1 | 1.15 | 8.85 | 17.7 | 0.194 | 17.70 |
| 2 | 1.08 | 8.46 | 16.9 | 0.198 | 16.92 |
| 3 | 0.95-1.1 | 8.435 | 16.9 | 0.196 | 16.87 |
| 4 | — | 8.59 | 17.2 | 0.196 | 17.18 |
| 5 | 1.11 | 8.32 | 16.6 | 0.196 | 16.64 |
| 6 | 0.93 | 7.58 | 15.2 | 0.198 | 15.16 |
| 7 | 0.95-1.1 | 8.3 | 16.6 | 0.197 | 16.60 |
| 8 | 1.22 | 9.19 | 18.4 | 0.196 | 18.38 |
| 9 | 1.05 | 8.2 | 16.4 | 0.199 | 16.40 |
| 10 | 1.06 | 11.05 | 22.1 | 0.192 | 18.42 |
| 11 | 1.06 | 10.81 | 21.6 | 0.198 | 18.02 |
| 12 | | | | | |
| 13 | 0.95 | 12.4 | 24.8 | 0.183 | 17.71 |
| 14 | | 12.75 | 25.5 | | 18.21 |
| 15 | 0.84 | 11.6 | 23.2 | 0.195 | 16.57 |
| 16 | | 12.3 | 24.6 | | 17.57 |
| 17 | | | | | |
| 18 | | | | 0.193 | |
| 19 | 0.65 | 11.7 | 23.4 | 0.213 | 14.63 |
| 20 | | | | | |
| 21 | 0.75 | 13.48 | 27 | 0.204 | 16.85 |
| 22 | | | | 0.206 | |
| 23 | | | | | |
| 24 | | | | | |
| 25 | 0.67 | 13.5 | 27 | 0.198 | 16.88 |
| 26 | | | | | |
| 27 | 0.68 | 12.1 | 24.2 | 0.186 | 15.13 |
| 28 | 0.7 | 12.6 | 25.2 | 0.191 | 15.75 |
| 29 | 0.75 | 14.62 | 29.2 | 0.199 | 18.28 |

Figure 5:
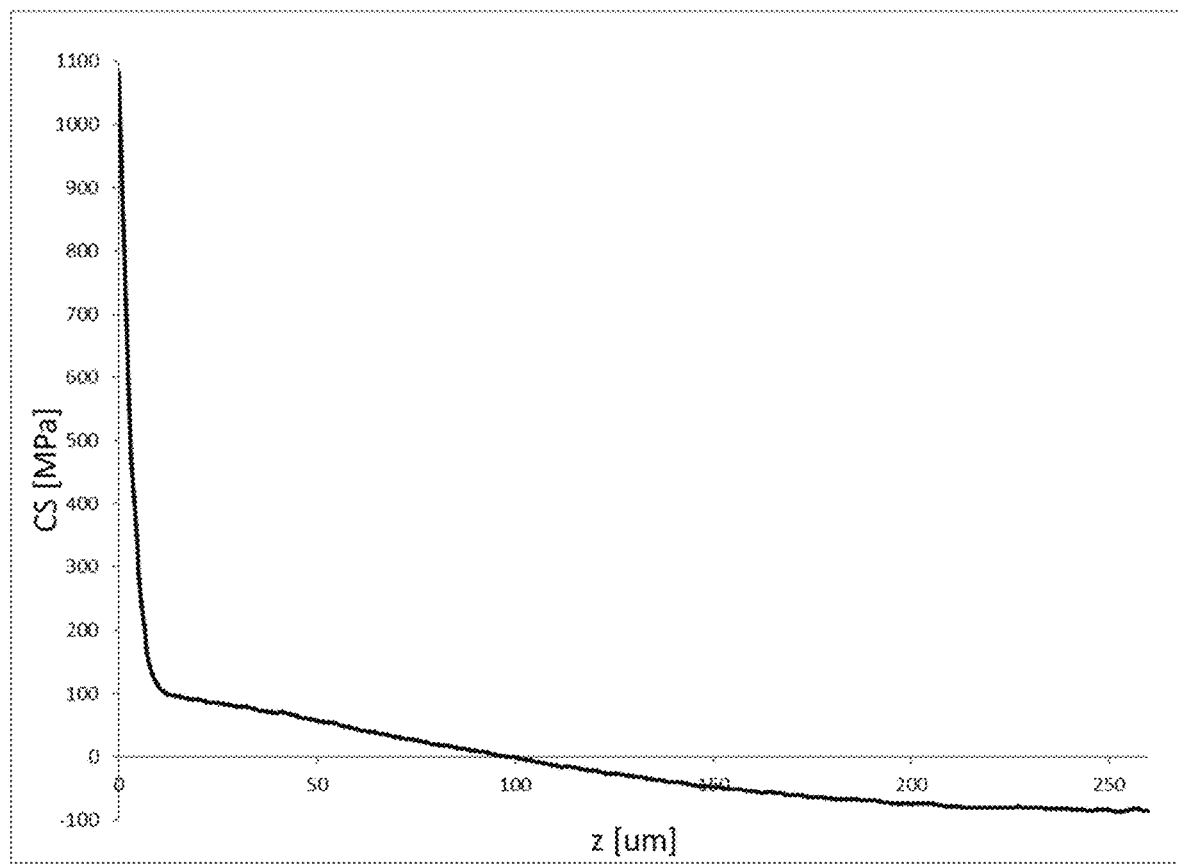
FIG. 5 is a plot of stress as a function of depth after a two-step ion exchange, according to some embodiments.

An exemplary stress profile for Example 2 is shown in FIG. 5. The stress profile in FIG. 5 is the first half of a 0.5 mm thick chemically strengthened glass article. The stress profile of FIG. 5 was obtained by a two-step ion exchange process after a heat treatment of a glass sheet of Composition A at a temperature of 580° C. for 15 minutes to form the glass sheet into a 3-dimensional shape (3D forming). The first step of the ion exchange process was immersion of the sample in a salt bath including approximately 38 wt % $NaNO_3$ and approximately 62 wt % $KNO_3$ 390° C. for 2 hours. The second step of the ion exchange process was immersion in a salt bath including approximately 1 wt % $NaNO_3$ and approximately 99 wt % $KNO_3$ at 370° C. for 20 minutes. The resulting stress profile, as shown in FIG. 5, had a $CS_{max}$ of 1100 MPa, a knee stress $CS_k$ of 108 MPa, a $DOL_{sp}$ of 8.25 μm, and a DOC of 99 μm which represents 0.198t.

The stress profile after the first ion exchange step (Example 1) had a $CS_{max}$ of 581 MPa occurring at the surface, a $DOL_{sp}$ at 8.95 μm, a $CS_k$ in the range from greater than or equal to 170 MPa to less than or equal to 180 MPa, a DOC at 97 μm equating to 0.194t, and a PT of 91.1 MPa. The stress integral over the tension region was 17.7 MPa*mm, and each of the two compressive stress regions had a depth integral of the stress that was about half of that by absolute value. The absolute value of the slope of the stress profile at the DOC was 1.15 MPa/micron.

In another example, a glass sheet with the same thermal history and same first-step ion exchange as Example 1 was subjected to a second-step ion exchange in a bath including 6 wt % $NaNO_3$ and approximately 94 wt % $KNO_3$ at 380° C. for 20 minutes in accordance with Example 4. The resulting stress profile after the second step had a peak CS of 877 MPa occurring on the surface, a $DOL_{sp}$ at 8.9 μm, a $CS_k$ at 159 MPa, a PT of 88.3 MPa, and a DOC at 98 μm equivalent to 0.196t.

In another example, a glass sheet with the same thermal history and same first-step ion exchange as Example 1 was subjected to a second-step ion exchange in a bath including 5 wt % $NaNO_3$ and approximately 95 wt % $KNO_3$, with immersion at 380° C. for 20 minutes in accordance with Example 3. The resulting stress profile included a $CS_{max}$ at the surface of 890 MPa, a $DOL_{sp}$ at 8.9 μm, and a $CS_k$ of 142 MPa. The peak tension PT and the DOC were about 88.8 MPa, and 98 μm, respectively.

Figure 6:
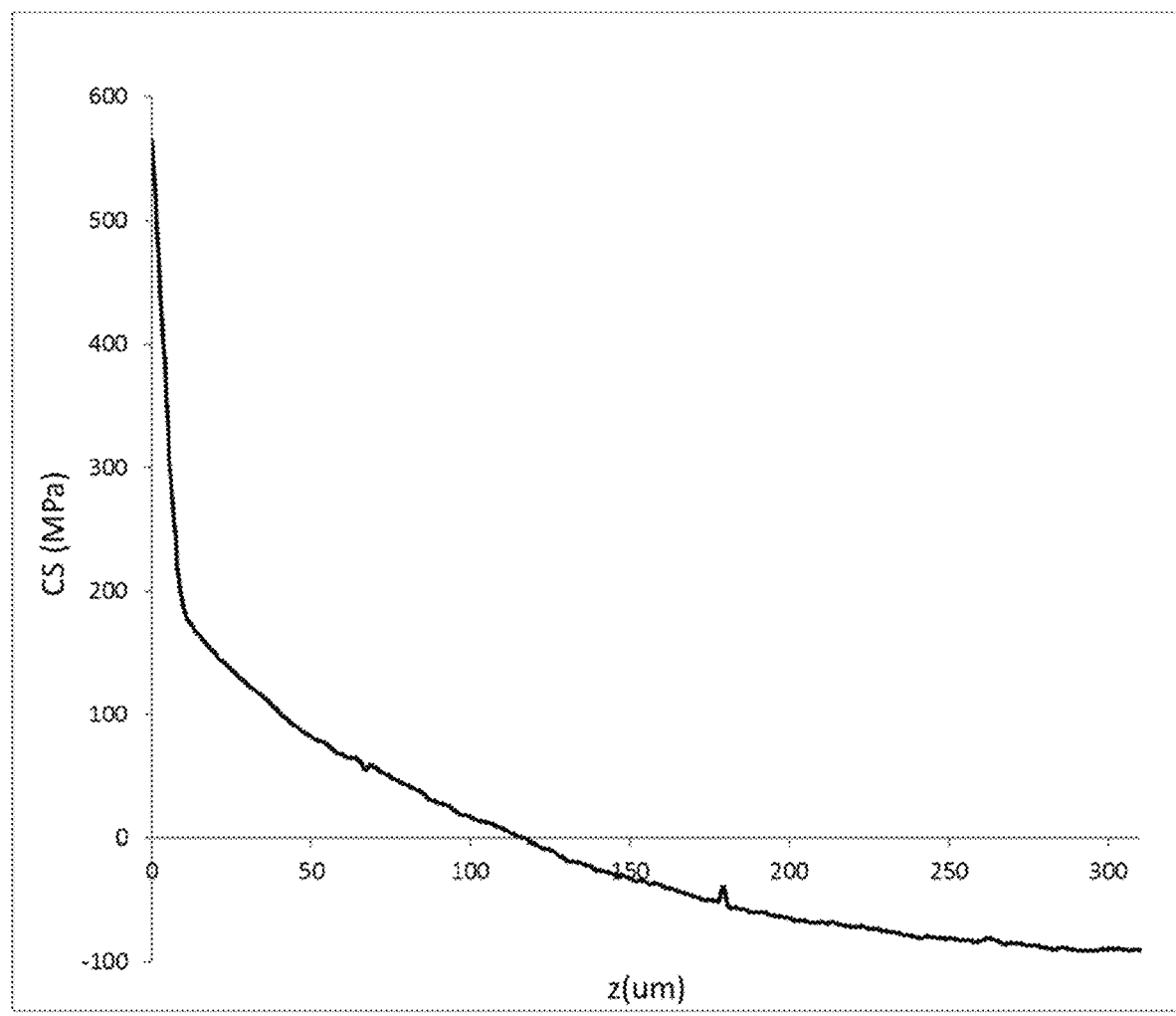
FIG. 6 is a plot of stress as a function of depth after a one-step ion exchange, according to some embodiments.

An exemplary stress profile is shown in FIG. 6. The stress profile in FIG. 6 was formed in a 0.6 mm thick sheet of glass (Composition A) with fusion-draw thermal history. The glass sheet was ion exchanged at 390° C. for 2 hours in a bath including approximately 50 wt % $NaNO_3$ and 50 wt % $KNO_3$ in accordance with Example 10. The resulting stress profile exhibited a peak CS of 565 MPa at the surface, a $DOL_{sp}$ at 9.06 μm, a $CS_k$ in the range of from 185 to 190 MPa, a DOC at 115.2 μm, a DOC/t of 0.192, and PT of 90 MPa. The integral under the entire tension zone was about 22.1 MPa*mm. The compression regions had a stress-depth integral of about 11.05 MPa*mm by absolute value. The absolute value of slope of the stress profile at the DOC was 1.06 MPa/μm.

Figure 7:
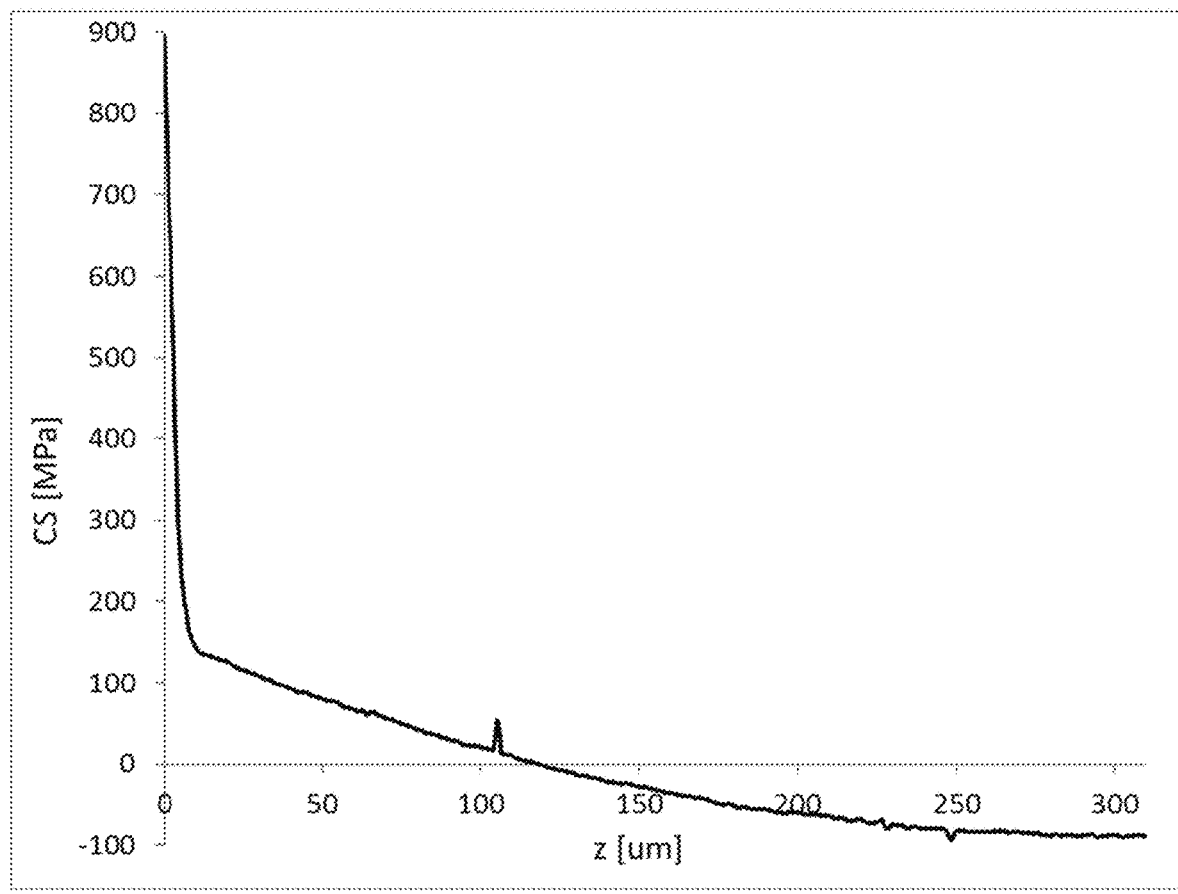
FIG. 7 is a plot of stress as a function of depth after a two-step ion exchange, according to some embodiments.

An exemplary stress profile is shown in FIG. 7 in accordance with Example 11. The stress profile in FIG. 7 was formed in a 0.6 mm thick sheet of glass (Composition A). The stress profile was obtained through a two-step ion exchange. The first ion exchange step was immersion in a bath at 390° C. for 2 hours, the bath included approximately 50 wt % $NaNO_3$ and 50 wt % $KNO_3$. The stress profile after the first ion exchange step was similar to the profile shown in FIG. 6. The second ion exchange step was immersion in a bath at 380° C. for 0.4 hours, the bath included approximately 6 wt % NaNO₃ and 94 wt % KNO₃. The resulting stress profile had a surface CS of 903 MPa, a $DOL_{sp}$ at 8.36 μm, a DOC at 119 μm, a DOC/t of 0.198, a $CS_k$ of 135 MPa, and a PT of 88.6 MPa. The absolute value of the slope of the stress profile at the DOC was 1.06 MPa/μm. The absolute value of the stress integral over the tension region was 21.6 MPa*mm, while the absolute value of the stress integral for each of the two compression regions was 10.81 MPa*mm.

Figure 9:
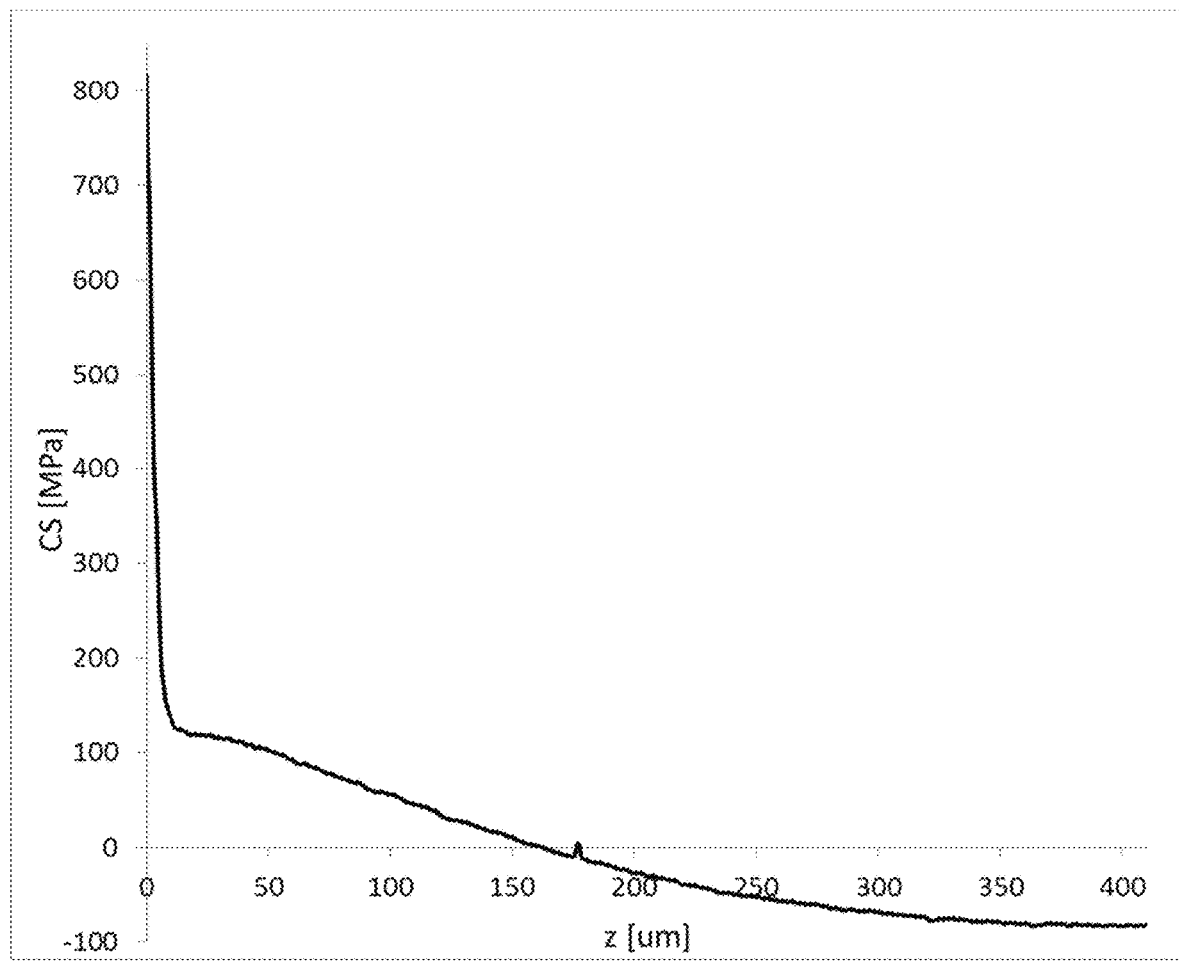
FIG. 9 is a plot of stress as a function of depth after a two-step ion exchange, according to some embodiments.

An exemplary stress profile is shown in FIG. 9. The stress profile in FIG. 9 was produced in a 0.8 mm thick sheet of glass with Composition A. The glass sheet was subjected to a two-step ion exchange treatment as detailed for Example 21 in Table 1. The resulting stress profile, as shown in FIG. 9, had a peak CS of 839 MPa, a $DOL_{sp}$ of 8.7 μm, a DOC of 163 μm, a DOC/t of 0.204, a PT of 83.4 MPa, and a $CS_k$ of 130 MPa. The stress profile slope at the DOC was 0.75 MPa/μm, and the CS integral in the compression region was 13.48 MPa·mm. The CS integral normalized to the thickness was 16.85 MPa. The compressive stress in the depth region from 16 μm to 32 μm (0.02 t to 0.040 changed gradually from 120 MPa to 114 MPa, with an average slope absolute value of about 0.19 MPa/μm.

Figure 10:
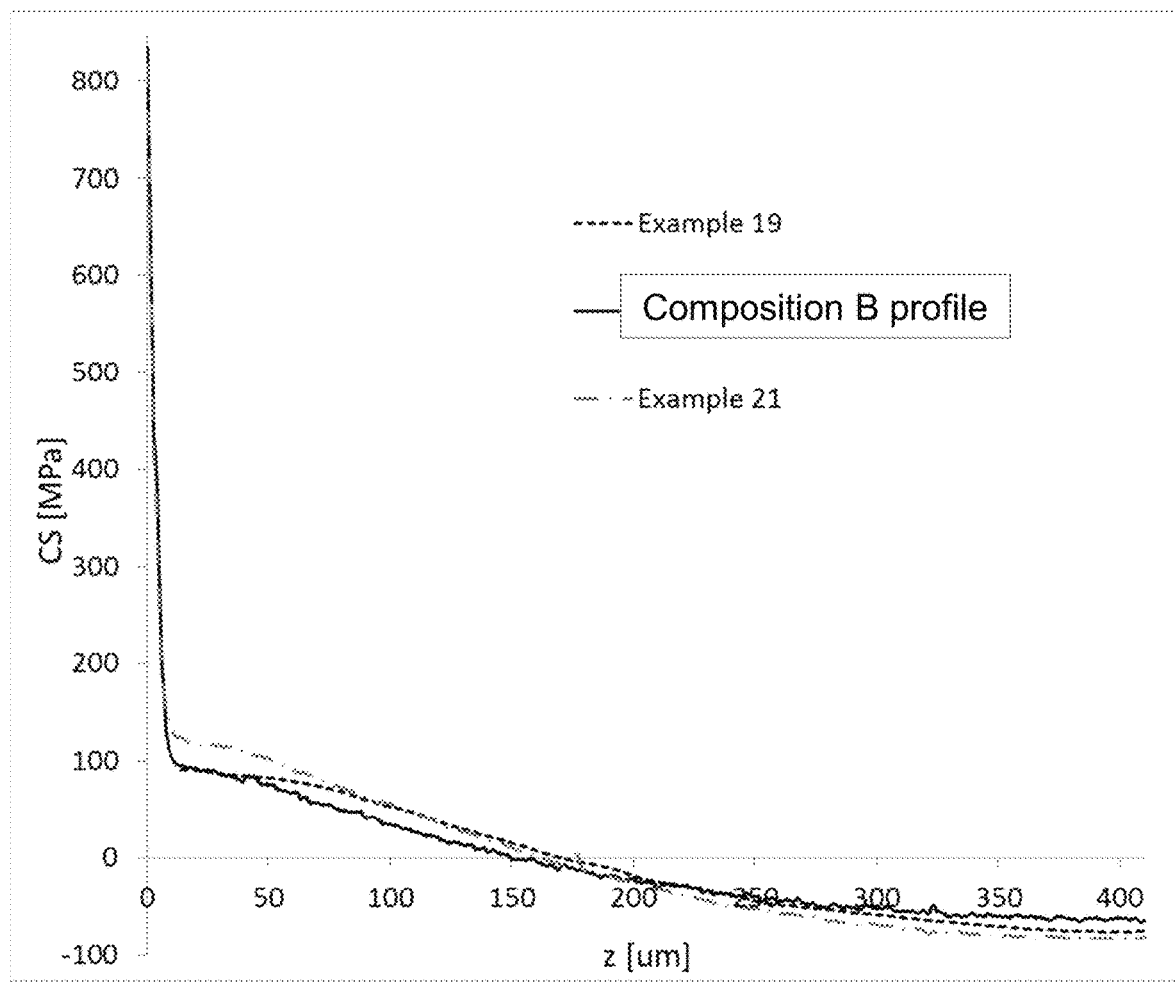
FIG. 10 is a plot of stress as a function of depth after a two-step ion exchange according to some embodiments and a comparative stress profile as a function of depth.

An exemplary stress profile is shown in FIG. 10. The stress profile in FIG. 10 was produced in a 0.8 mm thick sheet of glass with Composition A. The glass sheet was subjected to an ion exchange treatment as detailed for Example 19 in Table 1. FIG. 10 also includes the stress profile for Example 21 and a stress profile produced in a glass sheet with Composition B. The three stress profiles shown in FIG. 10 are substantially identical within the spike region (approximately the first 10 μm). The stress profile of Example 19 features a peak CS of 848 MPa at the surface, a $DOL_{sp}$ of 8.3 μm, a PT of 78.6 MPa, and a DOC of 170 μm equal to 0.213t. The stress profile of Example 19 matches the CS of the Composition B profile in the first 30 μm, but then at larger depths from 30 μm to 225 μm (from about 0.04 t to about 0.280 is above the prior-art profile in terms of CS as a function of depth. The difference was greatest in the depth range from 80 μm to 120 μm. The stress profile of Example 19 had a peak negative second derivative of CS occurring at a depth of about 63 μm (0.08 t) with an absolute value of $10^{-2}$ MPa/μm².

Figure 11:
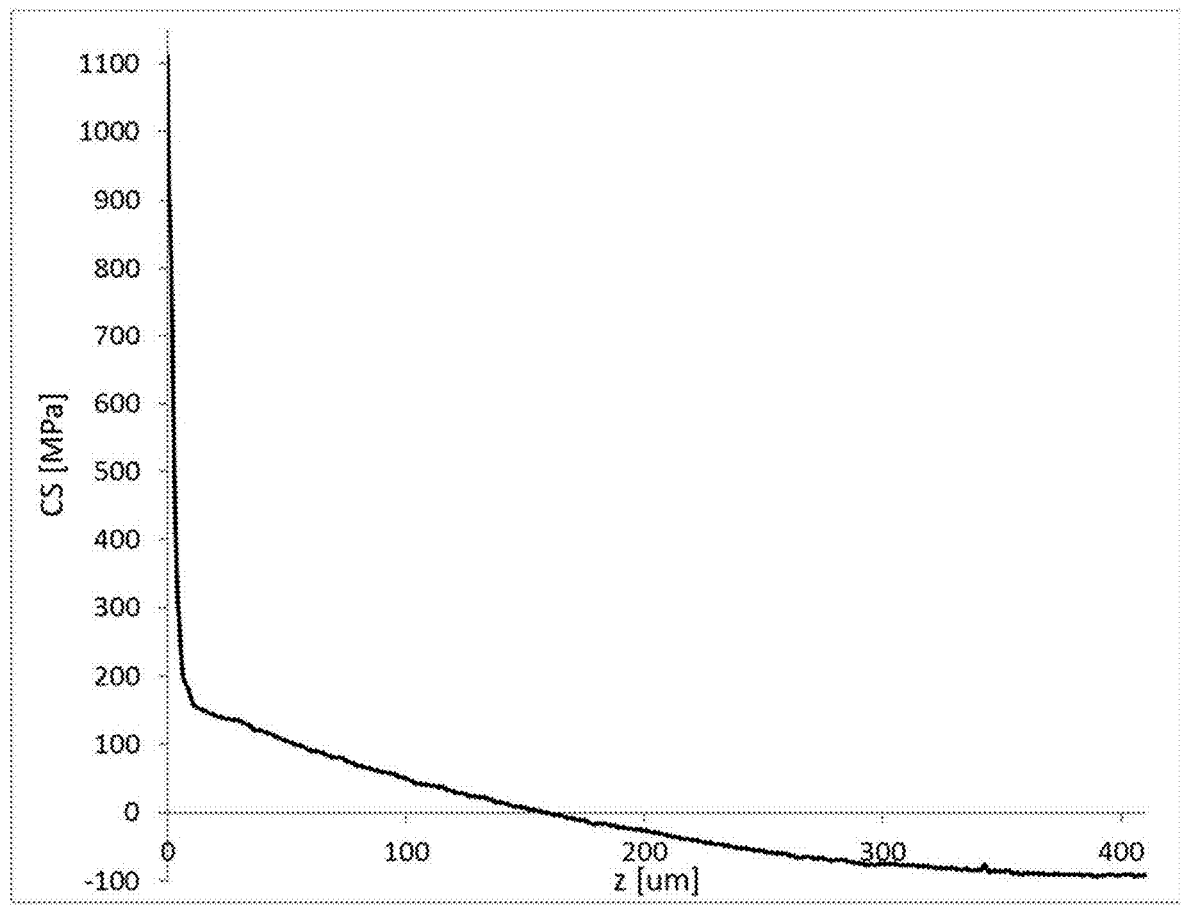
FIG. 11 is a plot of stress as a function of depth after a two-step ion exchange, according to some embodiments.

An exemplary stress profile is shown in FIG. 11. The stress profile in FIG. 11 was produced according to the details of Example 29 in Table 1. The resulting stress profile had a peak CS of 1137 MPa, a DOC of 159 μm, a DOC/t of 0.199, a $CS_k$ of 169 MPa, a PT of 91 MPa, and a $DOL_{sp}$ of 7.7 μm. The stress profile also features a stress slope at the DOC of 0.75 MPa/μm, a CS integral over the compressive region of 14.62 MPa·mm, which corresponds to 18.28 MPa when normalized to the thickness. The stress profile was obtained after a first ion exchange step at 390° C. for 3.75 hours in a bath having a 75:25:0.3 ratio of NaNO₃, KNO₃, and LiNO₃ by weight. The second ion exchange step was a 20 minute immersion in a bath having about 0.5 wt % NaNO₃ and 99.5 wt % KNO₃, without any addition of LiNO₃. Stress profiles with a lower PT (80-86 MPa), a lower CS (950-1100 MPa), and a lower $CS_k$ (120-160 MPa) may be obtained with slight increases of LiNO₃ content (0.1%-0.2% by weight) or by extending the time of the second ion exchange step to 35 minutes or longer, or by slight decrease of NaNO₃ (from 0.5 wt % to 0.3-0.4 wt %) and an increase of LiNO₃ in the second step (from 0 to 0.1-0.2 wt %). The substitution of LiNO₃ for NaNO₃ can be used to reduce PT and $CS_k$, while maintaining the peak CS around 1100 MPa.

Figure 12:
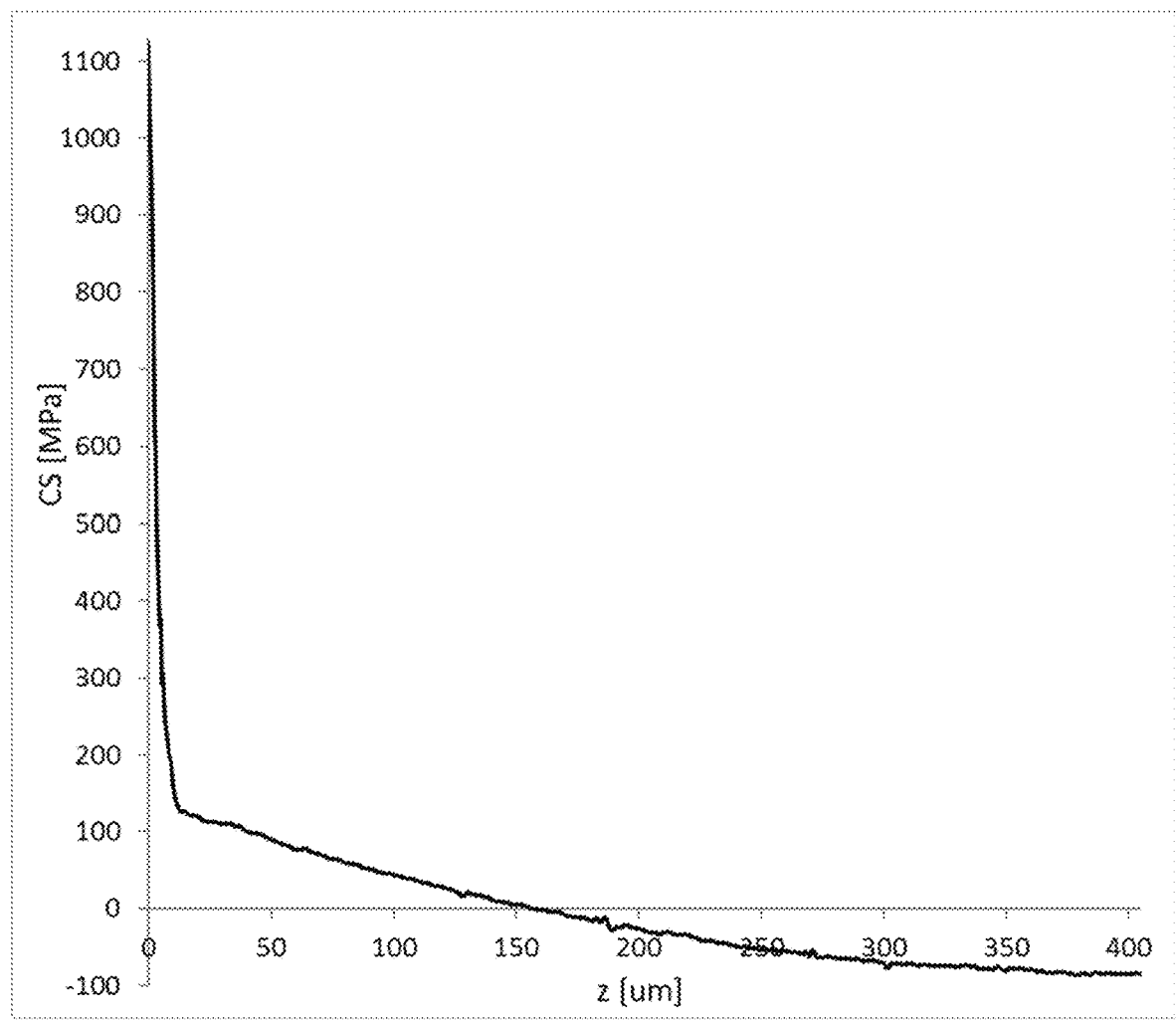
FIG. 12 is a plot of stress as a function of depth after a two-step ion exchange, according to some embodiments.

An exemplary stress profile is shown in FIG. 12. The stress profile in FIG. 12 was produced according to the details of Example 25 in Table 1. The resulting stress profile featured a combination of a peak CS of 1146 MPa, a $DOL_{sp}$ at 10.8 μm, a $CS_k$ of 133 MPa, a PT of 84.4 MPa, and a DOC of 158 μm equal to DOC/t of 0.198. The CS integral over the compressive region was 13.5 MPa·mm, which normalized to the thickness equates to 16.9 MPa. The slope at the DOC was 0.67 MPa/μm. The high $DOL_{sp}$ in combination with high CS helps to prevent high-stress fractures in designs that are prone to generate significant localized stress during a drop event. Additionally, the combination of high peak CS and high $DOL_{sp}$ with a relatively high $CS_k$ and DOC is particularly valuable for such circumstances.

Example 30

Glass Article Based on Composition B

Figure 8:
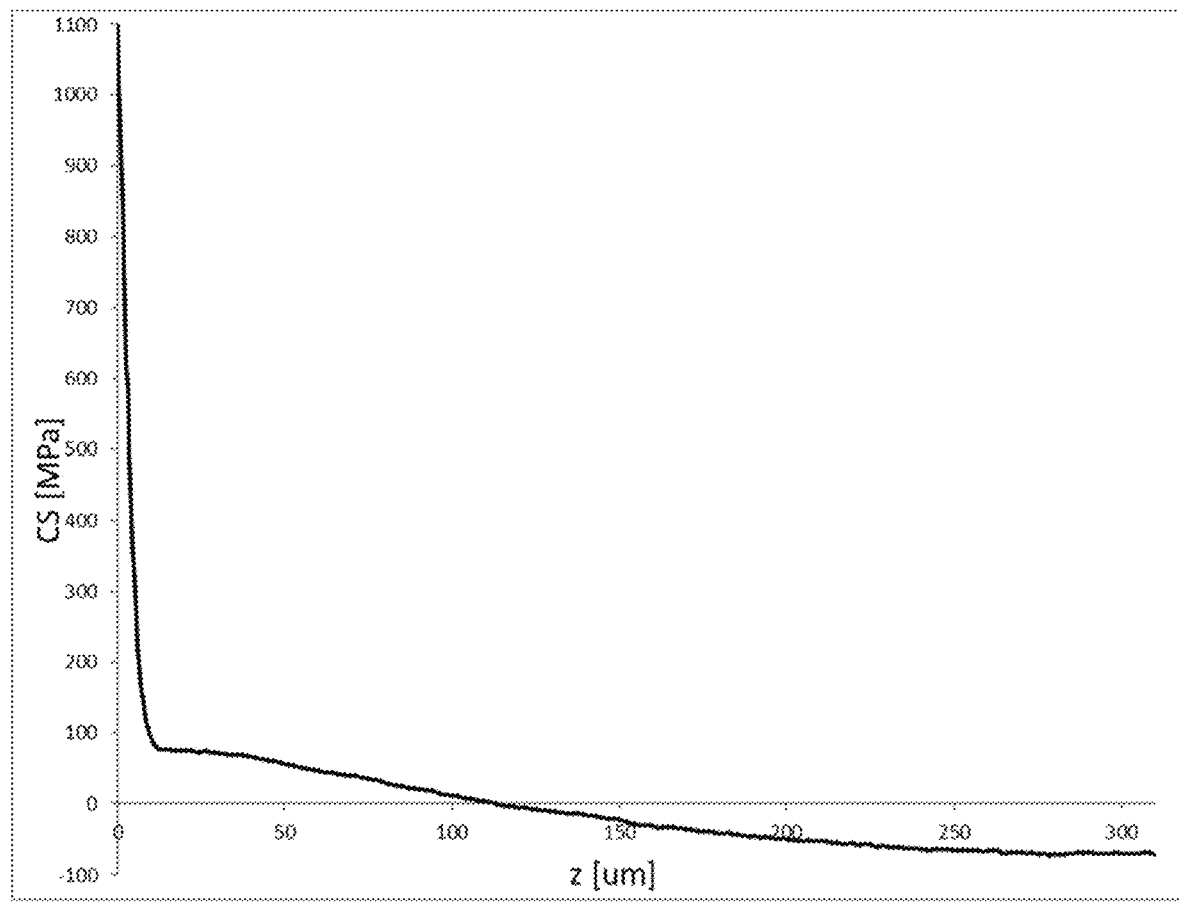
FIG. 8 is a plot of stress as a function of depth after a two-step ion exchange.

An exemplary stress profile is shown in FIG. 8. The stress profile in FIG. 8 was produced in a 0.6 mm thick sheet of glass with Composition B. The glass sheet was heat treated at a temperature of 580° C. for 15 minutes to form the glass sheet into a 3-dimensional shape (3D forming). The glass sheet was then subjected to a two-step ion exchange treatment. The first step of the ion exchange process was immersion of the sample in a salt bath including approximately 38 wt % NaNO₃ and approximately 62 wt % KNO₃ at 380° C. for 2 hours. The second step of the ion exchange process was immersion in a salt bath including approximately 1 wt % NaNO₃ and approximately 99 wt % KNO₃ at 370° C. for 20 minutes. The resulting stress profile, as shown in FIG. 8, had a peak CS of 1125 MPa, a $DOL_{sp}$ of 9.1 μm, and a DOC of 113 μm, a PT of 70.4 MPa at approximately the mid-thickness of the glass article. The compressive stress in the depth region from 13 μm to 30 μm changes gradually from 76 MPa to 71 MPa, and changed only about 2 MPa in the range from 13 μm to 23 μm (correlating to an average slope of about 0.2 MPa/μm). By way of comparison, the stress profile in FIG. 5 for Composition A exhibited a stress value that was over 20 MPa greater in this region, despite having a lower glass article thickness.

Example 31

Modeling

Figure 13:
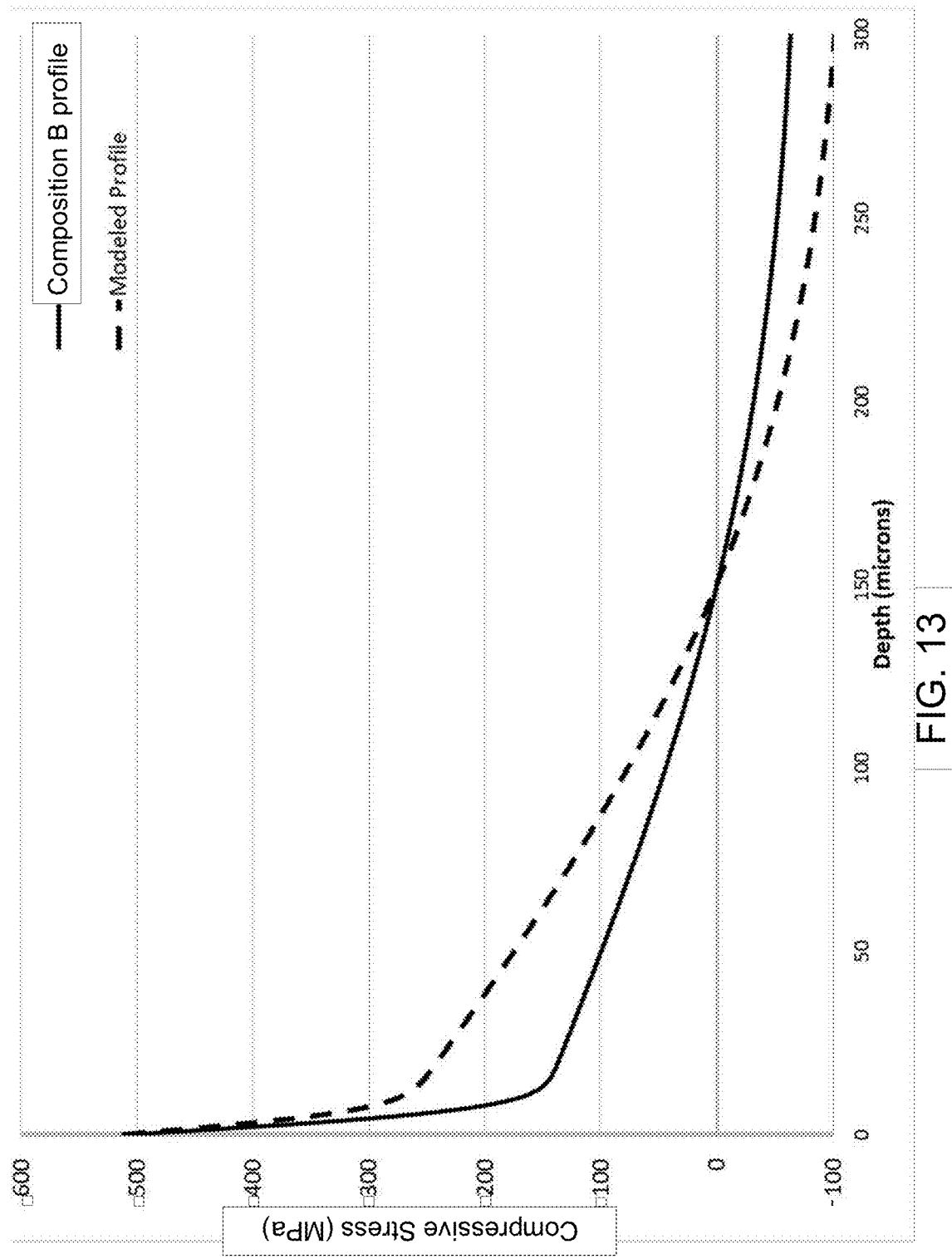
FIG. 13 is a plot of modeled stress profiles of compressive stress (MPa) versus depth (microns) for a standard glass article and a for the glass article with increased knee stress according to some embodiments.
Figure 14:
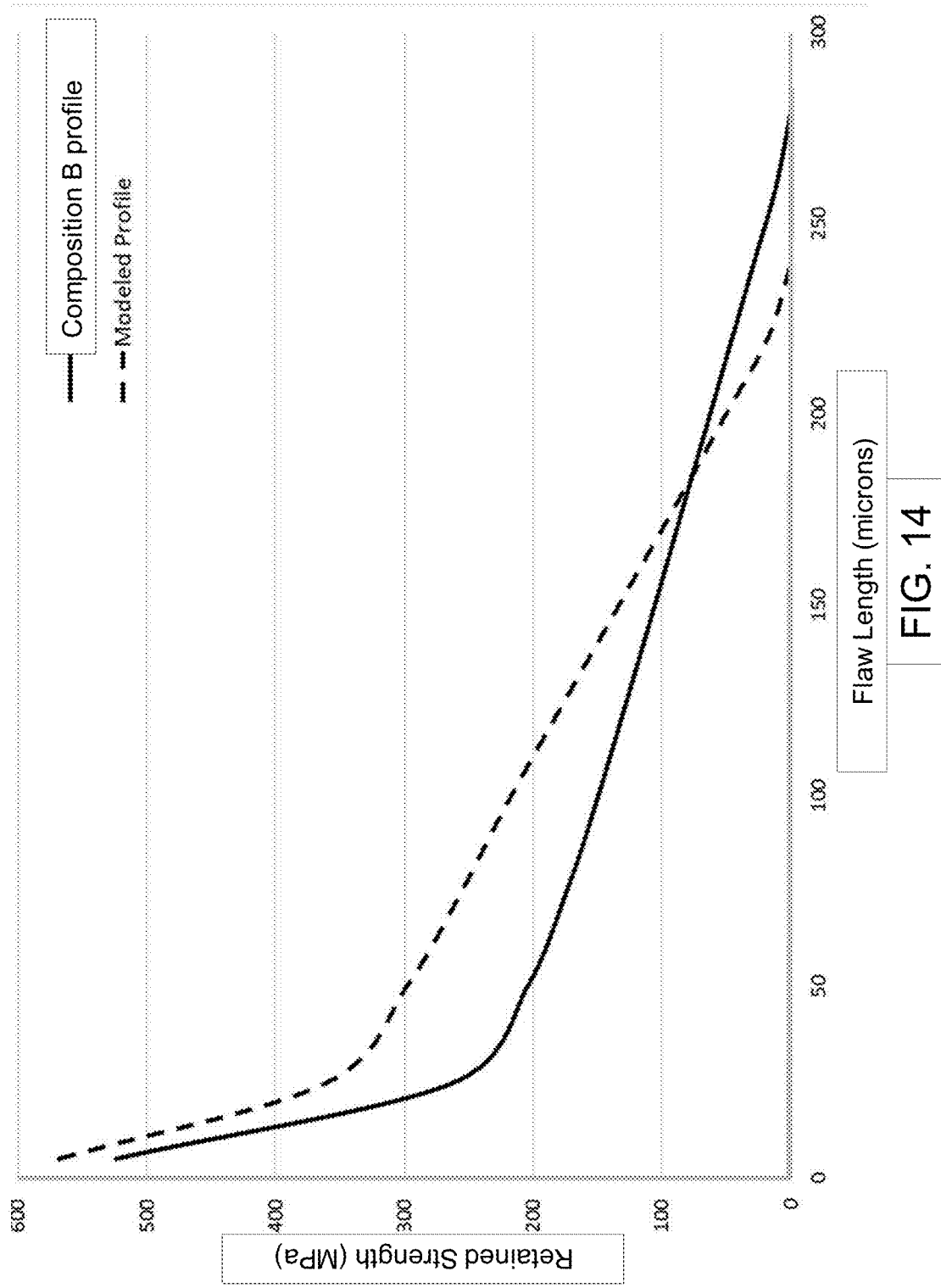
FIG. 14 is a plot of retained strength (MPa) versus flaw length (microns) for the stress profiles in the glass articles of FIG. 13 after modeling of a failure mode.

Effect of knee stress $CS_k$ on retained strength of glass articles was analyzed. FIG. 13 provides stress profiles that were diffusion modeled using a two-dimensional (2D) plane strain ion exchange (IOX) model, which is based on finite difference modeling for a glass article of Composition B with an increased $CS_k$ (260 MPa) and a standard glass article of Composition B of lower $CS_k$ (150 MPa), both at a thickness of 0.8 mm. FIG. 13 shows compressive stress (MPa) versus depth (microns) of the article as-strengthened by simulated ion-exchange. Retained strength refers to the maximum bending stress that can be applied to the glass article in the presence of a crack of at a certain depth before the stress intensity factor at the crack tip reaches the fracture toughness of the material and the crack propagates catastrophically. The retained strength plots provide insight regarding the potential drop performance of a device. FIG. 14 provides a graph of retained strength (MPa) versus flaw length (microns) resulting after a simulated failure mode of simultaneous dropping onto a rough surface and introduction of sharp contact damage modeled by finite element fracture mechanic modeling. In FIG. 14, it is shown that for flaws and/or cracks of about 180 microns or less in length, the higher $CS_k$ profile has a larger area under the curve, which indicates the higher $CS_k$ profile could handle more bending stress than the standard glass article for lengths of flaws and/or cracks of about 180 microns or less.

The inflection point of the retained strength plot of FIG. 14 occurs for flaws that are approximately 20 microns beyond the depth of the inflection point in the compressive stress profile of FIG. 13. The magnitude of increase in compression at the knee corresponds almost one-to-one to the increase in retained strength for flaws in the region of the approximately 30 microns. Higher knee stress corresponds to higher retained strength up to the crossover point of the plots (~180 microns). Without intending to be bound by theory, it is thought that the higher knee stress plot has lower strength for the longest flaws because of the more rapid increase in tension beyond the depth of compression. It is noted that failures are rarely observed for applied stresses in the region where the standard Composition B profile had increased retained strength over the high knee stress profile. The higher knee stress profile has higher strength, which decreases until the crossover point is reached.

Example 32

Testing and Modeling

Figure 15:
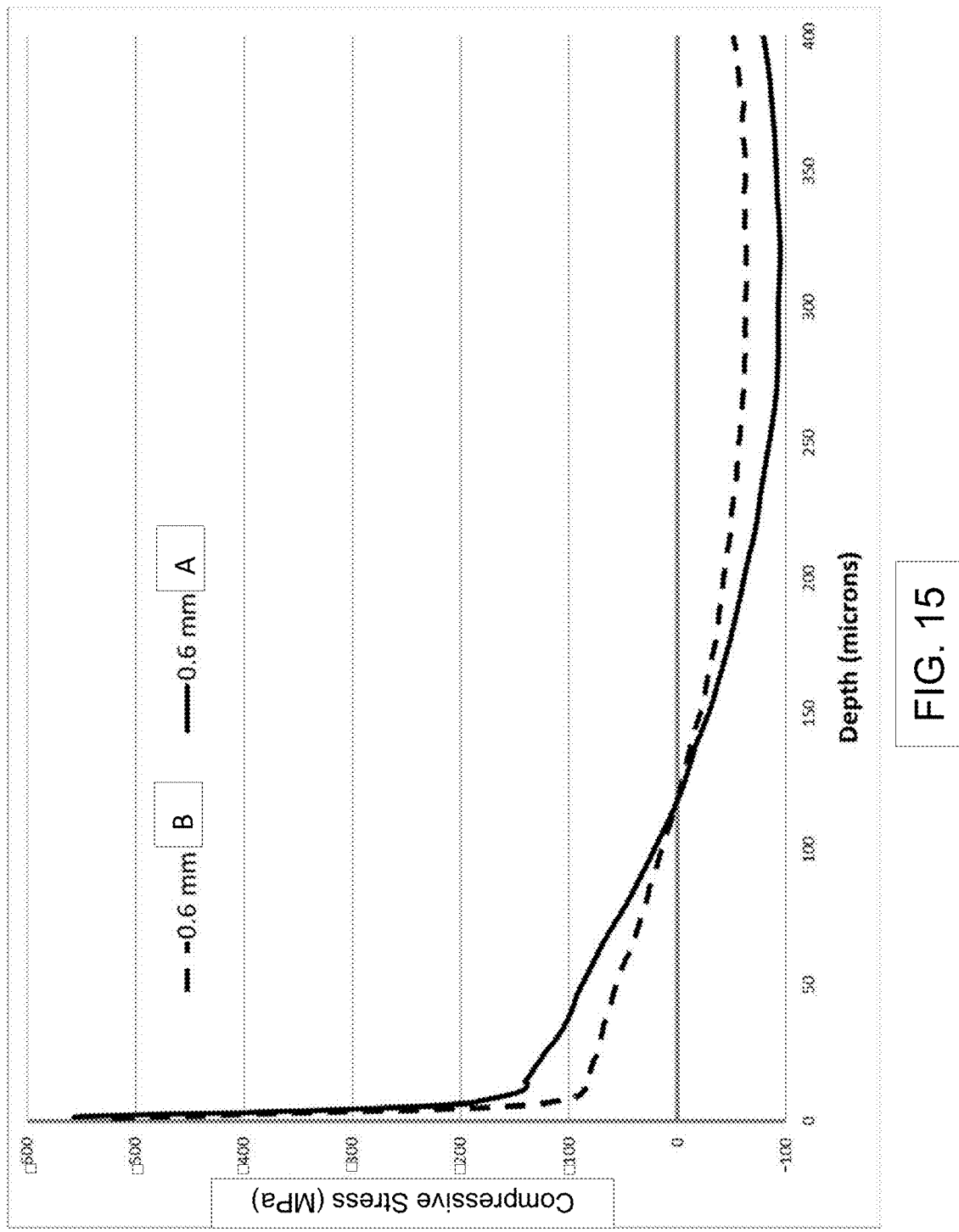
FIG. 15 is a plot of the compressive stress profiles for glass articles with different compositions and a thickness of 0.6 mm.
Figure 16:
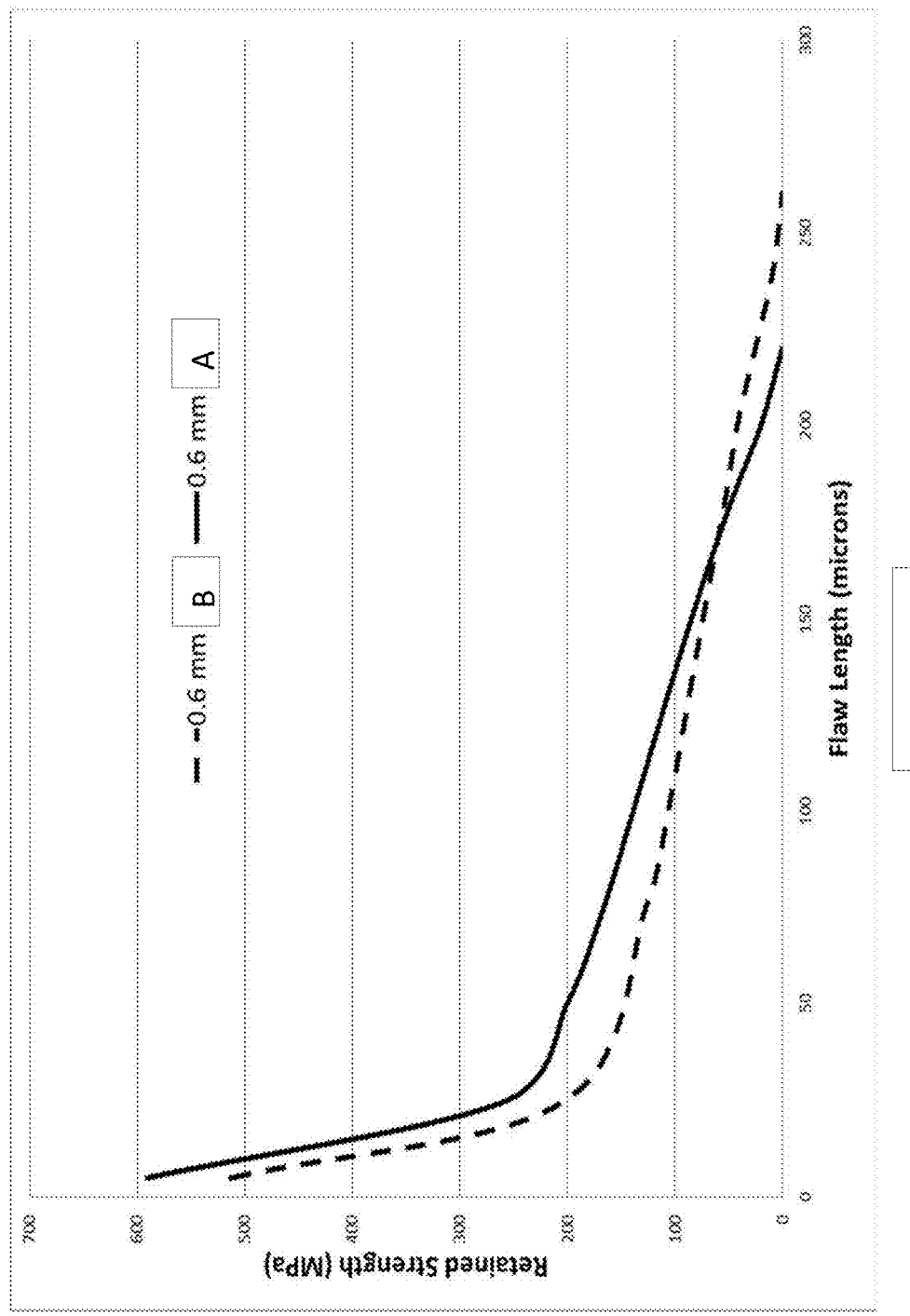
FIG. 16 is a plot of the retained strength profiles for the glass articles of FIG. 15.

Stress profiles as described herein were formed in a glass sheet of Composition A, and a glass sheet of Composition B, each having a thickness of 0.6 mm. The measured stress profiles of compressive stress (MPa) versus depth (microns) are shown in FIG. 15, and the associated retained strength is shown in FIG. 16 generated in accordance with Example 31. Compositions A and B presented the same depth of compression (DOC) before which Composition A had higher compressive stress and after which Composition B had higher compressive stress. Composition A showed higher retained strength for flaw lengths up to about 180 microns. A review of Examples 31 and 32 indicates that for profiles having the same DOC, retained strength crossover is approximately constant independent of knee stress.

Example 33

Testing and Modeling

Figure 17:
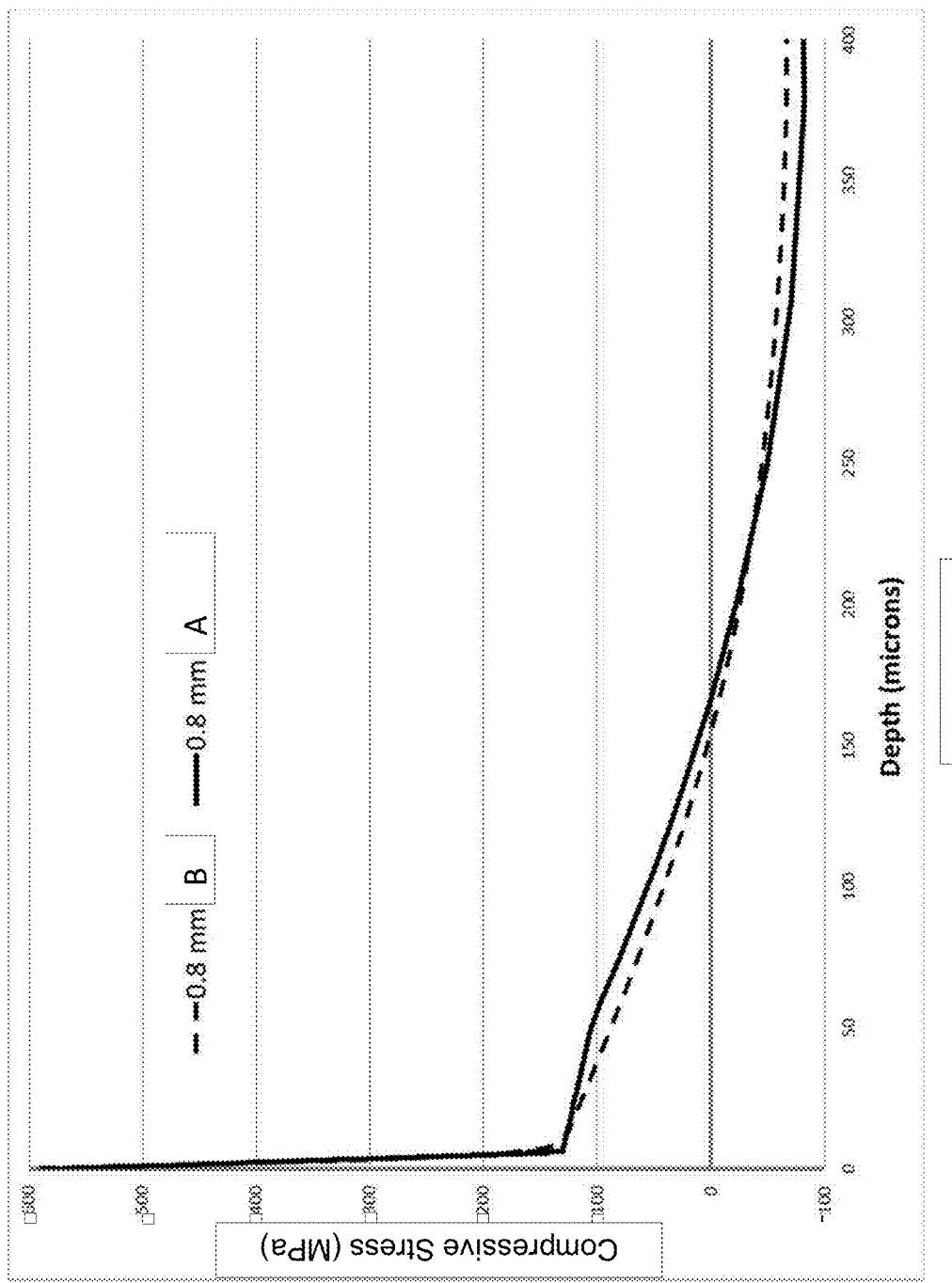
FIG. 17 is a plot of the compressive stress profiles for glass articles with different compositions and a thickness of 0.8 mm.
Figure 18:
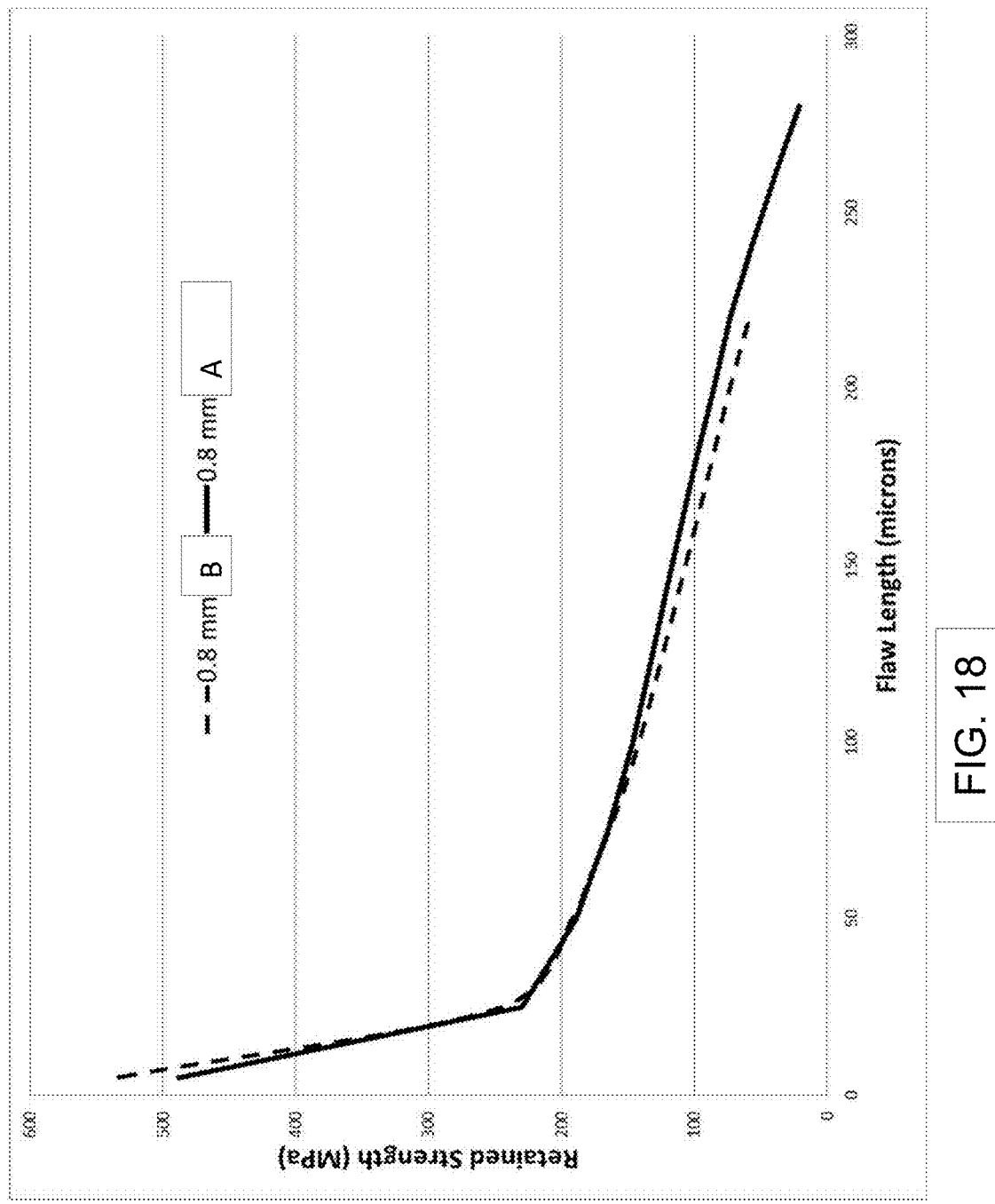
FIG. 18 is a plot of the retained strength profiles versus flaw length for the glass articles of FIG. 17.

Stress profiles as described herein were formed in a glass sheet of Composition A, and a glass sheet of Composition B, each having a thickness of 0.8 mm. The measured stress profiles of compressive stress (MPa) versus depth (microns) are shown in FIG. 17, and the associated retained strength is shown in FIG. 18 generated in accordance with Example 30. It can be seen in FIG. 17 that the composition A has higher compressive stress up to the neutral stress point. The retained strength plot, shown in FIG. 18, reflects this. The strength of composition A is better throughout the profile.

Example 34

Testing and Modeling

Figure 19:
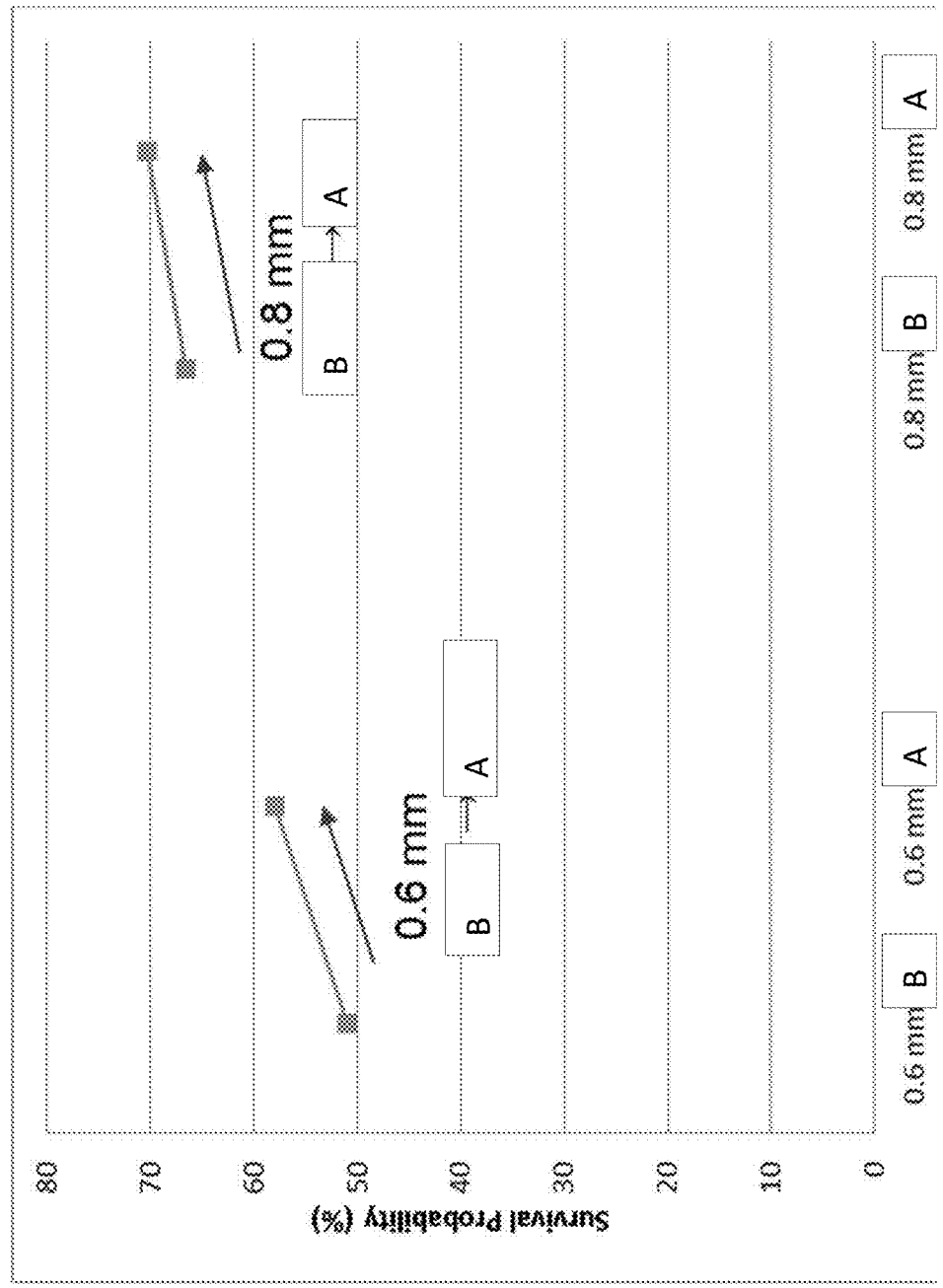
FIG. 19 is a plot of the survival probability for glass articles with a variety of compositions and thicknesses.

The survival probability for the stress profiles shown in FIGS. 15 and 17 was determined and is shown in FIG. 19. Failure probabilities were generated based on fracture mechanics modeling and an understanding of failures based on field returns. FIG. 19 shows that for both thicknesses 0.6 mm and 0.6 mm, the differences in compressive stress (per FIGS. 15 and 17), even if not very large, indicate that a cumulative effect will result in improved performance of composition A in the field based on understanding of field failures.

Examples 35-57

Glass Articles Based on Composition A

Glass articles were formed from Composition A and ion exchanged according to the conditions described in Table 4 below.

TABLE 4

| Example | t, mm | 3D Y/N | Step1 $NaNO_3/KNO_3/LiNO_3$ by weight | Step 1 ° C. | Step 1 time, hours | Step 2 $NaNO_3/KNO_3/LiNO_3$ by weight | Step 2 ° C. | Step 2 time, hours |
|---|---|---|---|---|---|---|---|---|
| 35 | 0.78 | N | 75/24.8/0.2 | 390 | 225 | 4/95.7/0.3 | 380 | 25 |
| 36 | 0.78 | N | 75/24.8/0.2 | 390 | 225 | 3/97/0 | 380 | 35 |
| 37 | 0.78 | N | 75/24.8/0.2 | 390 | 225 | 3/97/0 | 380 | 40 |
| 38 | 0.55 | Y | 38/62/0 | 390 | 127 | 6/94/0 | 380 | 28 |
| 39 | 0.77 | N | 75/24.8/0.2 | 390 | 225 | 4/95.7/0.3 | 380 | 25 |
| 40 | 0.67 | N | 50/50/0 | 390 | 125 | 6/94/0 | 380 | 30 |
| 41 | 0.57 | N | 38/62/0 | 390 | 95 | 6/94/0 | 380 | 22 |
| 42 | 0.67 | Y | 38/62/0 | 390 | 101 | 6/94/0 | 380 | 30 |
| 43 | 0.57 | Y | 50/50/0 | 390 | 134 | 6/94/0 | 380 | 30 |
| 44 | 0.6 | Y | 50/50/0 | 390 | 134 | 6/94/0 | 380 | 30 |
| 45 | 0.6 | Y | 50/50/0 | 385 | 160 | 6/94/0 | 380 | 30 |
| 46 | 0.5 | Y | 38/62/0 | 390 | 120 | 6/94/0 | 380 | 20 |
| 47 | 0.5 | Y | 38/62/0 | 390 | 105 | 6/94/0 | 380 | 20 |
| 48 | 0.5 | Y | 37/63/0 | 385 | 115 | 6/94/0 | 375 | 20 |
| 49 | 0.55 | N | 38/62/0 | 380 | 87 | 6/94/0 | 370 | 33 |
| 50 | 0.55 | Y | 38/62/0 | 390 | 127 | 6/94/0 | 380 | 20 |
| 51 | 0.6 | Y | 50/50/0 | 390 | 134 | 1/99/0 | 375 | 20 |
| 52 | 0.5 | Y | 37/63/0 | 385 | 115 | 1/99/0 | 375 | 20 |
| 53 | 0.75 | N | 75/24.8/0.2 | 390 | 225 | 4/95.7/0.3 | 380 | 25 |
| 54 | 0.56-0.58 | Y | 50/50/0 | 390 | 134 | 6/94/0 | 380 | 30 |
| 55 | 0.7 | N | 50/50/0 | 390 | 125 | 6/94/0 | 380 | 20 |
| 56 | 0.7 | N | 50/50/0 | 390 | 125 | 6/94/0 | 380 | 20 |
| 57 | 0.7 | N | 50/50/0 | 390 | 125 | 6/94/0 | 380 | 20 |

The glass articles formed according to Table 4 were analyzed for peak compressive stress ($CS_{max}$), depth of layer of spike ($DOL_{sp}$), compressive stress at the knee ($CS_k$), depth of compression (DOC), and peak tension (PT). The results are in Table 5. In the examples, $CS_{max}$ and $DOL_{sp}$ were measured by a surface stress meter (FSM). $CS_k$ was measured by a method according to U.S. Ser. No. 16/015,776, filed Jun. 22, 2018 to the assignee, which is incorporated herein by reference. Stress profile and DOC were measured by a Refracted near-field (RNF) method. PT and stress retention were measured by a scattered light polariscope (SCALP) technique. In Table 5, possible variation in CS values can be ±25 MPa and DOL variation can be about ±0.2 μm, due to precision limitations of the metrology.

TABLE 5

| Example | $CS_{max}$ MPa | $DOL_{sp}$ microns | $CS_k$ MPa | DOC μm | PT MPa |
|---|---|---|---|---|---|
| 35 | 859.2 | 8.3 | 136.0 | 166.4 | 84.2 |
| 36 | 800.0 | 8.3 | 150.6 | 160.1 | 84.1 |
| 37 | 700-750 | 8.3 | 150.6 | 160.1 | 84.1 |
| 38 | 875.9 | 9.0 | 133.5 | 109.8 | 90.5 |
| 39 | 859.2 | 8.3 | 136.0 | 166.4 | 84.2 |
| 40 | 874.3 | 8.8 | 139.4 | 140.3 | 84.1 |
| 41 | 908.9 | 8.5 | 146.3 | 118.5 | 88.6 |
| 42 | | | | | |
| 43 | 908.9 | 8.5 | 146.3 | 118.5 | 88.6 |
| 44 | 908.9 | 8.5 | 146.3 | 118.5 | 88.6 |
| 45 | 908.9 | 8.5 | 146.3 | 118.5 | 88.6 |
| 46 | 883.9 | 9.0 | 135.6 | 98.4 | 89.3 |
| 47 | 887.1 | 9.1 | 120.6 | 100.4 | 87.3 |
| 48 | 887.1 | 9.1 | 120.6 | 100.4 | 87.3 |
| 49 | 875.9 | 9.0 | 133.5 | 109.8 | 90.5 |
| 50 | 875.9 | 9.0 | 133.5 | 109.8 | 90.5 |
| 51 | | | | | |
| 52 | 1106.2 | 9.1 | 115.0 | 95.6 | 90.8 |
| 53 | 859.2 | 8.3 | 136.0 | 166.4 | 84.2 |
| 54 | 875.9 | 9.0 | 133.5 | 109.8 | 90.5 |
| 55 | 904.2 | 8.4 | 149.4 | 136.6 | 81.4 |
| 56 | 904.2 | 8.4 | 149.4 | 136.6 | 81.4 |
| 57 | 904.2 | 8.4 | 149.4 | 136.6 | 81.4 |

Examples 58-62

Glass Articles With Increased $DOL_{sp}$

Glass articles with a thickness of 0.5 mm were formed from Composition A or B and ion exchanged according to the conditions described in Table 5 below.

TABLE 5

| | | Step 1 | | | Step 2 | | |
|---|---|---|---|---|---|---|---|
| Example | Glass Composition | NaNO₃/KNO₃ (wt %) | Temperature (° C.) | Time (min) | NaNO₃/KNO₃ (wt %) | Temperature (° C.) | Time (min) |
| 58 | B | 36/64 | 380 | 130 | 5 | 370 | 26 |
| 59 | B | 30/70 | 380 | 150 | 1/99 | 370 | 20-25 |
| 60 | A | 38/62 | 390 | 105 | 6/94 | 380 | 20 |
| 61 | A | 38/62 | 385 | 120 | 1/99 | 370 | 20 |
| 62 | A | 25/75 | 400 | 93 | 1/99 | 380 | 23 |

The characteristics imparted by the ion exchange treatment are reported in Table 6 below.

TABLE 6

| Example | $CS_{max}$ (MPa) | $DOL_{sp}$ (μm) | $CS_k$ (MPa) | PT (MPa) | DOC (μm) |
|---|---|---|---|---|---|
| 58 | 804 | 8.4 | 94 | 67 | 94 |
| 59 | 1050 | 10.6 | 45 | 58 | 88 |
| 60 | 884 | 9 | 136 | 89.3 | 98.4 |
| 61 | 1100 | 9 | 100-110 | 83 | 96-100 |
| 62 | 1080 | 11 | 85-95 | 83 | 96 |

Figure 20:
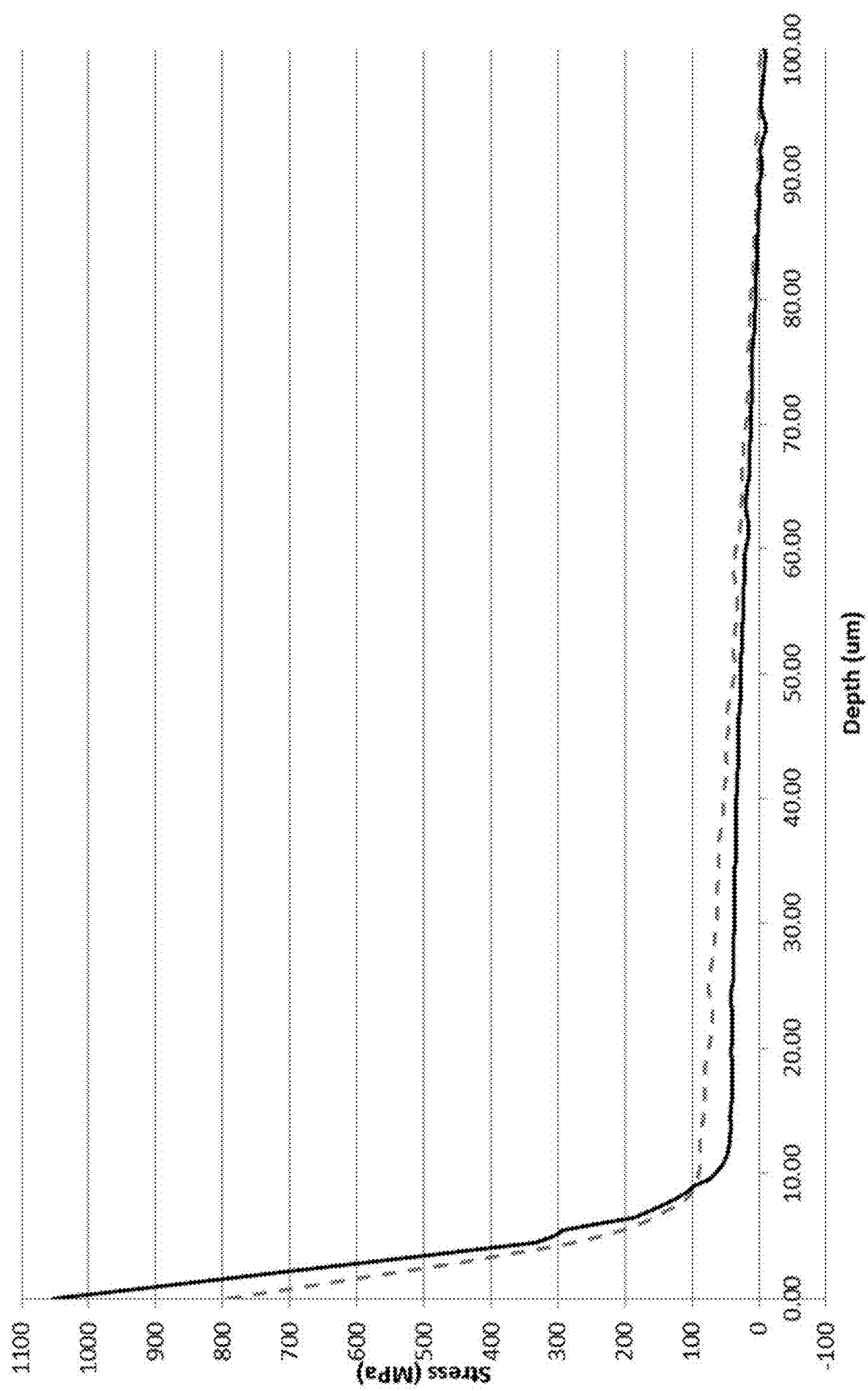
FIG. 20 is a plot of the compressive stress profiles for glass articles with different compositions and a thickness of 0.5 mm.

The measured stress profiles of Examples 58 (dashed line) and 59 (solid line) are shown in FIG. 20. As shown in FIG. 20, the stress profile of Example 58 includes higher compressive stress between the $DOL_{sp}$ and the DOC when compared to Example 59. It was observed that Example 59 exhibited improved fracture resistance in multi-orientation drops onto rough granite than Example 58. This result indicates that the larger compressive stress area of the spike region in Example 59 contributes to increased multi-orientation rough surface drop performance. For comparison purposes, the area of the spike for Example 59 by the trapezoidal method of numerical integration was about 2925 MPa*μm to a depth of 4 μm, about 3269 MPa*μm to a depth of 5 μm, about 3555 MPa*μm to a depth of 6 μm, about 3747 MPa*μm to a depth of 7 μm, and about 3905 MPa*μm to a depth of 8 μm, while the area of the spike for Example 58 was between 4 μm and 10 μm lower at each of these depths. Stated differently, Example 58 generally had a spike area at least about 15% lower than Example 59 at equivalent depths, with a spike area at least 24% lower than Example 59 up to depths of 4 μm or 5 μm. Example 58 was characterized by a trapezoidal area of the spike ($TA_{sp}$), calculated as described above, of 3772 MPa*μm and Example 59 had a $TA_{sp}$ of 5803 MPa*μm. Thus, the alternative spike area measurement approach also indicates a correlation between spike area and multi-orientation drop performance. Additionally, the benefit associated with increased spike area is present even where the portions of the stress profile beyond the spike region exhibit decreased compressive stress values, as shown by comparing the stress profiles of Examples 58 and 59 in FIG. 20.

Example 59 exhibits a compressive stress integral of about 6073 MPa*μm, producing an average compressive stress in the compressive stress region of 69 MPa, as calculated by dividing the compressive stress integral by the DOC. The absolute value of the slope of the stress profile at the DOC for Example 59 was about 0.6 MPa/μm, and the product of the absolute value of the stress slope at the DOC and the thickness was about 300 MPa for Example 59.

Figure 21:
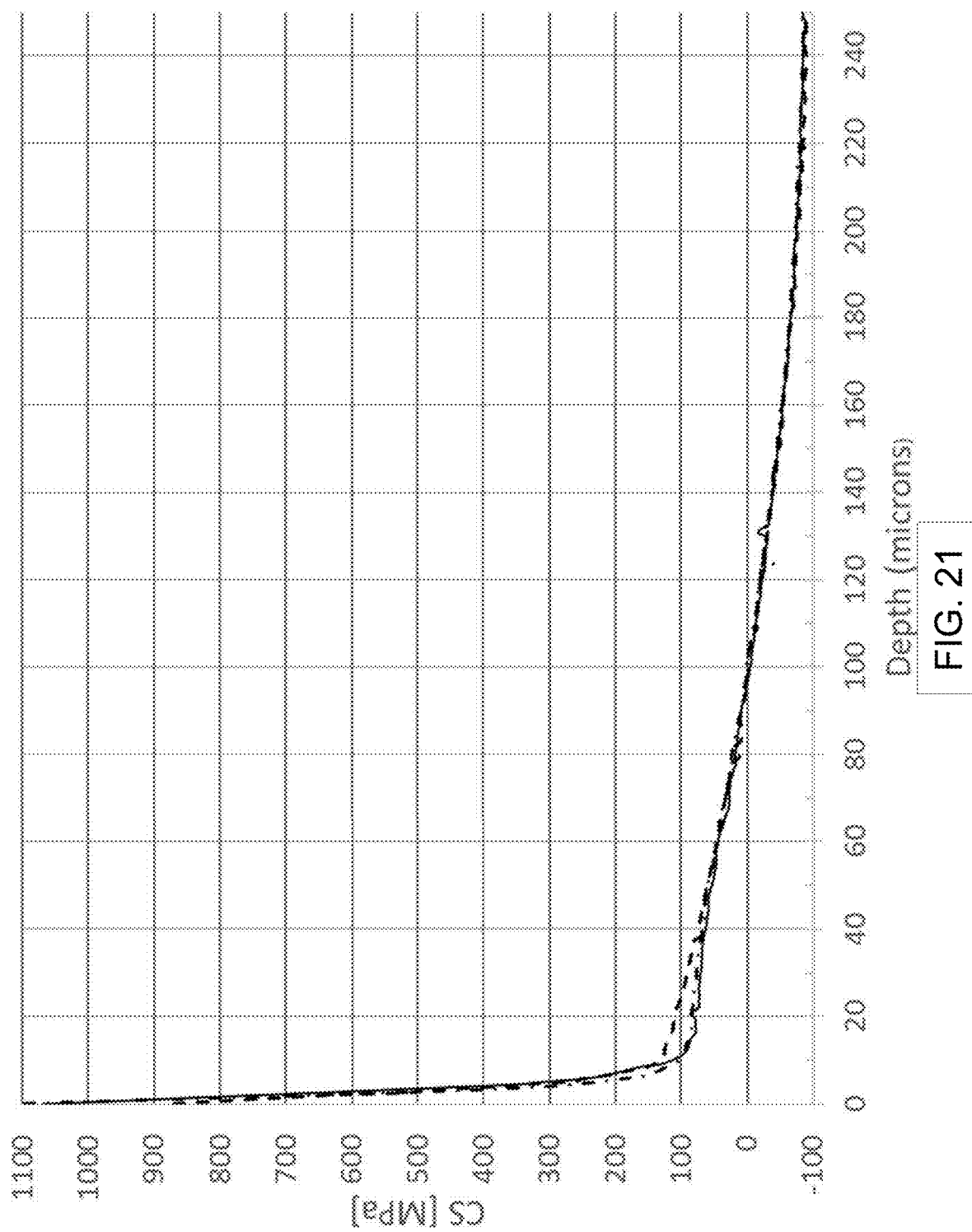
FIG. 21 is a plot of the compressive stress profiles for glass articles with different compositions and a thickness of 0.5 mm.
Figure 22:
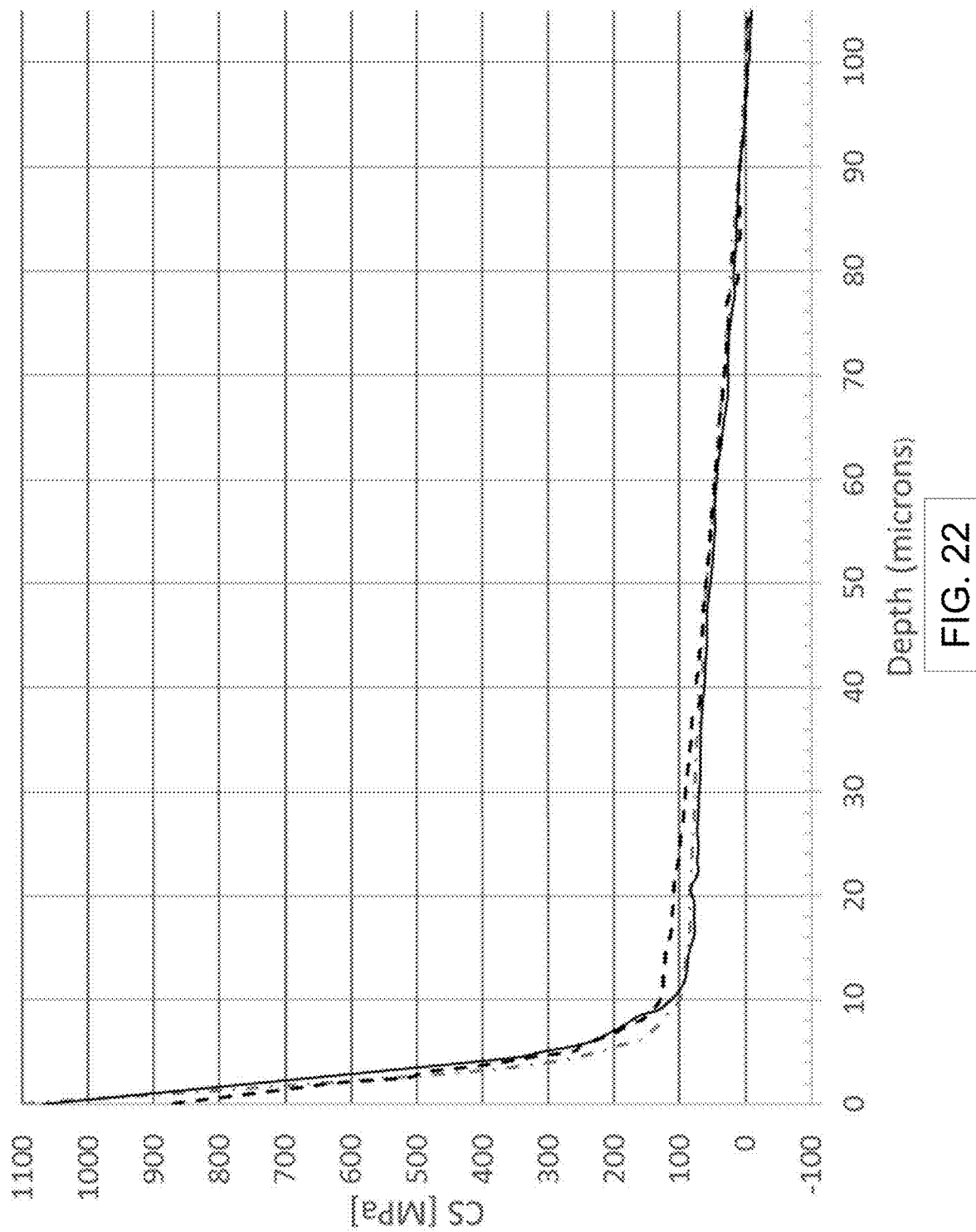
FIG. 22 is a plot of the compressive stress profiles of FIG. 21 to the depth of compression (DOC) of the articles.

The stress profile for Examples 60 (dashed line), 61 (dashed dot line), and 62 (solid line) are shown in FIG. 21 from the surface to the mid-thickness of the articles. The stress profile for Examples 60 (dashed line), 61 (dashed dot line), and 62 (solid line) are shown in FIG. 22 from the surface to the DOC. As a general descriptor, if Example 60 is considered a baseline, Example 61 has an increased maximum compressive stress, and Example 62 exhibits an increased maximum compressive stress and $DOL_{sp}$. Examples 60-62 all exhibited performance in multi-orientation drop testing on rough granite that was equivalent or better than Examples 58 and 59, with Example 62 demonstrating the best performance, with Example 60 exhibiting the least fracture resistance of Examples 60-62 in these tests.

The absolute value of the slope of the stress profile at the DOC for Example 62 was between about 1.2 MPa/μm and about 1.4 MPa/μm, and the product of the absolute value of the stress slope at the DOC and the thickness was between about 600 MPa and about 700 MPa for Example 62.

All compositional components, relationships, and ratios described in this specification are provided in mol % unless otherwise stated. All ranges disclosed in this specification include any and all ranges and subranges encompassed by the broadly disclosed ranges whether or not explicitly stated before or after a range is disclosed.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass-based article, comprising:
   a glass-based substrate comprising opposing first and second surfaces defining a substrate thickness (t), wherein t is greater than or equal to 0.4 mm and less than or equal to 1.3 mm; and
   a stress profile comprising:
      a depth of compression (DOC) that is greater than or equal to 0.15t;
      a stress slope at DOC that is 1.5 MPa/micron or less;
      an absolute value of stress integral in one compression zone that is in the range of from 4 MPa*mm to 20 MPa*mm;
      a compressive stress at a knee ($CS_k$) of greater than or equal to 165 MPa; and
      the DOC is located at a depth of greater than 150 microns.

2. The glass-based article of claim 1, comprising a peak compressive stress (CS) greater than or equal to 1000 MPa.

3. The glass-based article of claim 1, comprising a compressive stress at a knee ($CS_k$) greater than or equal to 170 MPa.

4. The glass-based article of claim 1, wherein the DOC is located at a depth of 160 microns or deeper.

5. The glass-based article of claim 1, wherein a central composition at the center of the glass-based article comprises lithium and a $Li_2O/Na_2O$ molar ratio of greater than or equal to 0.65 and less than or equal to 1.2.

6. The glass-based article of claim 1, wherein t is greater than or equal to 0.5 mm and less than or equal to 0.8 mm.

7. The glass-based article of claim 1, wherein a spike depth of layer ($DOL_{sp}$) is greater than or equal to 7 micrometers and less than or equal to 11 micrometers.

8. A consumer electronic product comprising:
   a housing comprising a front surface, a back surface, and side surfaces;
   electrical components provided at least partially within the housing, the electrical components comprising at least a controller, a memory, and a display, the display being provided at or adjacent the front surface of the housing; and
   a cover disposed over the display;
   wherein at least a portion of at least one of the housing and the cover comprises the glass-based article of one of claim 1.

* * * * *